US012752487B2

(12) United States Patent
Förster-Romswinckel et al.

(10) Patent No.: US 12,752,487 B2
(45) Date of Patent: Oct. 6, 2026

(54) ATTACHMENT MECHANISMS FOR MODULAR BUILD PLATFORMS

(71) Applicants: Cubicure GmbH, Vienna (AT); Align Technology, Inc., San Jose, CA (US)

(72) Inventors: Thomas Förster-Romswinckel, Pixendorf (AT); Robert Gmeiner, Vienna (AT); Otmar Martl, Linz (AT); Oliver Kesel, Pixendorf (AT); Bernhard Busetti, Vienna (AT); Markus Kury, Vienna (AT); Michael Christopher Cole, San Jose, CA (US); Peter Dorfinger, Woodside, CA (US); Shawn Stromenger, Milpitas, CA (US); Viswanath Meenakshisundaram, Santa Clara, CA (US); Lance Robert Pickens, Campbell, CA (US); Mario Pavic, Vienna (AT); Kaimir Bekavac, Felixdorf (AT)

(73) Assignee: Align Technology, Inc., San Jose, CA (US)

( * ) Notice: Subject to any disclaimer, the term of this patent is extended or adjusted under 35 U.S.C. 154(b) by 25 days.

(21) Appl. No.: 19/065,842

(22) Filed: Feb. 27, 2025

(65) Prior Publication Data

US 2025/0276378 A1 Sep. 4, 2025

Related U.S. Application Data

(60) Provisional application No. 63/559,529, filed on Feb. 29, 2024.

(51) Int. Cl.
*B29C 64/245* (2017.01)
*B22F 12/30* (2021.01)
(Continued)

(52) U.S. Cl.
CPC ............ *B29C 64/245* (2017.08); *B22F 12/30* (2021.01); *B22F 12/33* (2021.01); *B29C 64/124* (2017.08);
(Continued)

(58) Field of Classification Search
CPC ............................... B29C 64/245; B22F 12/30
See application file for complete search history.

(56) References Cited

U.S. PATENT DOCUMENTS 5,820,368 A 10/1998 Wolk
5,975,893 A 11/1999 Chishti et al.
(Continued)

FOREIGN PATENT DOCUMENTS

CN 109795113 B 6/2021
DE 29907262 U1 7/1999
(Continued)

*Primary Examiner* — Benjamin A Schiffman
(74) *Attorney, Agent, or Firm* — FORTEM IP LLP

(57) ABSTRACT

Systems, methods, and devices for additive manufacturing are provided. In some embodiments, an assembly for supporting 3D objects during an additive manufacturing process is provided. The assembly can include a plurality of build platforms, each build platform configured to support one or more 3D objects during the additive manufacturing process. The assembly can also include a carrier configured to support the plurality of build platforms. The assembly can further include an attachment mechanism configured to releasably couple the plurality of build platforms to the carrier during the additive manufacturing process such that the plurality of build platforms collectively form a build plane having a vertical deviation no greater than 500 μm.

20 Claims, 38 Drawing Sheets

(51) Int. Cl.

| | |
|---|---|
| ***B22F 12/33*** | (2021.01) |
| ***B29C 64/124*** | (2017.01) |
| ***B29C 64/171*** | (2017.01) |
| ***B33Y 10/00*** | (2015.01) |
| ***B33Y 30/00*** | (2015.01) |
| *B29C 64/295* | (2017.01) |
| *B29C 64/35* | (2017.01) |

(52) U.S. Cl.

CPC ............ *B29C 64/171* (2017.08); *B33Y 30/00* (2014.12); *B29C 64/295* (2017.08); *B29C 64/35* (2017.08); *B33Y 10/00* (2014.12)

(56) References Cited

U.S. PATENT DOCUMENTS 6,183,248 B1 2/2001 Chishti et al.
6,309,215 B1 10/2001 Phan et al.
6,386,864 B1 5/2002 Kuo
6,450,807 B1 9/2002 Chishti et al.
6,454,565 B2 9/2002 Phan et al.
6,471,511 B1 10/2002 Chishti et al.
6,524,101 B1 2/2003 Phan et al.
6,572,372 B1 6/2003 Phan et al.
6,607,382 B1 8/2003 Kuo et al.
6,705,863 B2 3/2004 Phan et al.
6,749,414 B1 6/2004 Hanson et al.
6,783,604 B2 8/2004 Tricca
6,790,035 B2 9/2004 Tricca et al.
6,814,574 B2 11/2004 Abolfathi et al.
6,830,450 B2 12/2004 Knopp et al.
6,947,038 B1 9/2005 Anh et al.
7,074,039 B2 7/2006 Kopelman et al.
7,104,792 B2 9/2006 Taub et al.
7,121,825 B2 10/2006 Chishti et al.
7,160,107 B2 1/2007 Kopelman et al.
7,192,273 B2 3/2007 McSurdy, Jr.
7,347,688 B2 3/2008 Kopelman et al.
7,354,270 B2 4/2008 Abolfathi et al.
7,448,514 B2 11/2008 Wen
7,481,121 B1 1/2009 Cao
7,543,511 B2 6/2009 Kimura et al.
7,600,999 B2 10/2009 Knopp
7,658,610 B2 2/2010 Knopp
7,766,658 B2 8/2010 Tricca et al.
7,771,195 B2 8/2010 Knopp et al.
7,871,269 B2 1/2011 Wu et al.
7,878,801 B2 2/2011 Abolfathi et al.
7,883,334 B2 2/2011 Li et al.
7,892,474 B2 2/2011 Shkolnik et al.
7,914,283 B2 3/2011 Kuo
7,947,508 B2 5/2011 Tricca et al.
8,152,518 B2 4/2012 Kuo
8,153,183 B2 * 4/2012 Skubic .................. B33Y 30/00 700/110
8,172,569 B2 5/2012 Matty et al.
8,235,715 B2 8/2012 Kuo
8,292,617 B2 10/2012 Brandt et al.
8,337,199 B2 12/2012 Wen
8,401,686 B2 3/2013 Moss et al.
8,517,726 B2 8/2013 Kakavand et al.
8,562,337 B2 10/2013 Kuo et al.
8,641,414 B2 2/2014 Borovinskih et al.
8,684,729 B2 4/2014 Wen
8,708,697 B2 4/2014 Li et al.
8,758,009 B2 6/2014 Chen et al.
8,899,977 B2 12/2014 Cao et al.
8,936,463 B2 1/2015 Mason et al.
8,936,464 B2 1/2015 Kopelman
9,022,781 B2 5/2015 Kuo et al.
9,119,691 B2 9/2015 Namiranian et al.
9,161,823 B2 10/2015 Morton et al.
9,241,774 B2 1/2016 Li et al.
9,326,831 B2 5/2016 Cheang
9,433,476 B2 9/2016 Khardekar et al.
9,655,691 B2 5/2017 Li et al.
9,675,427 B2 6/2017 Kopelman
9,700,385 B2 7/2017 Webber
9,738,034 B2 * 8/2017 Gruber .................... B29C 64/40
9,844,424 B2 12/2017 Wu et al.
10,045,835 B2 8/2018 Boronkay et al.
10,111,730 B2 10/2018 Webber et al.
10,144,181 B2 * 12/2018 DeSimone ............ B29C 64/129
10,150,244 B2 12/2018 Sato et al.
10,162,264 B2 12/2018 McLeod et al.
10,162,624 B1 12/2018 Moturu et al.
10,213,277 B2 2/2019 Webber et al.
10,272,664 B2 * 4/2019 Hays .................. G03G 15/1625
10,299,894 B2 5/2019 Tanugula et al.
D865,180 S 10/2019 Bauer et al.
10,463,452 B2 11/2019 Matov et al.
10,495,973 B2 * 12/2019 Cole ......................... C08F 2/44
10,517,701 B2 12/2019 Boronkay
10,537,406 B2 1/2020 Wu et al.
10,537,463 B2 1/2020 Kopelman
10,548,700 B2 2/2020 Fernie
10,555,792 B2 2/2020 Kopelman et al.
10,588,776 B2 3/2020 Cam et al.
10,737,439 B2 * 8/2020 Ebert ...................... B29C 64/20
10,743,964 B2 8/2020 Wu et al.
10,758,323 B2 9/2020 Kopelman
10,806,546 B2 10/2020 Sirovskiy et al.
10,813,720 B2 10/2020 Grove et al.
10,881,487 B2 1/2021 Cam et al.
10,912,629 B2 2/2021 Tanugula et al.
10,993,783 B2 5/2021 Wu et al.
11,026,768 B2 6/2021 Moss et al.
11,026,831 B2 6/2021 Kuo
11,045,283 B2 6/2021 Riley et al.
11,103,330 B2 8/2021 Webber et al.
11,154,382 B2 10/2021 Kopelman et al.
11,166,788 B2 11/2021 Webber
11,259,896 B2 3/2022 Matov et al.
11,273,011 B2 3/2022 Shanjani et al.
11,318,667 B2 5/2022 Mojdeh et al.
11,331,166 B2 5/2022 Morton et al.
11,344,385 B2 5/2022 Morton et al.
11,370,173 B2 6/2022 Kelly et al.
11,390,027 B2 7/2022 Lobovsky et al.
11,440,263 B2 9/2022 Gmeiner et al.
11,465,351 B2 * 10/2022 Chae ..................... B29C 64/232
11,471,253 B2 10/2022 Venkatasanthanam et al.
11,497,586 B2 11/2022 Kopelman
11,504,214 B2 11/2022 Wu et al.
11,518,098 B2 * 12/2022 McFarlane ......... A61C 13/0019
11,534,268 B2 12/2022 Li et al.
11,554,000 B2 1/2023 Webber
11,564,777 B2 1/2023 Kopelman et al.
11,571,278 B2 2/2023 Kopelman et al.
11,571,279 B2 2/2023 Wang et al.
11,576,752 B2 2/2023 Morton et al.
11,583,378 B2 2/2023 Corey et al.
11,596,502 B2 3/2023 Webber et al.
11,622,836 B2 4/2023 Shojaei et al.
11,638,627 B2 5/2023 Corey et al.
11,642,194 B2 5/2023 Boronkay et al.
11,642,837 B2 * 5/2023 Gmeiner ............... B29C 64/129 264/401
11,660,814 B2 * 5/2023 Van Esbroeck ......... B29C 64/35 264/401
11,666,415 B2 6/2023 Wang et al.
11,701,203 B2 7/2023 Makarenkova et al.
11,723,748 B2 8/2023 Li et al.
11,779,437 B2 10/2023 Cam et al.
11,793,606 B2 10/2023 Cam et al.
11,931,222 B2 3/2024 Webber et al.
11,937,991 B2 3/2024 Webber et al.
11,969,311 B2 4/2024 Webber et al.
11,980,523 B2 5/2024 Morton et al.
11,993,005 B1 * 5/2024 Garmshausen ....... B29C 64/135
12,016,748 B2 6/2024 Nishimuta et al.
12,059,843 B2 * 8/2024 Märklin ................. B33Y 50/02
12,076,208 B2 9/2024 Sato et al.
12,144,704 B2 11/2024 Cam et al.

(56) References Cited

U.S. PATENT DOCUMENTS

| | | | | |
|---|---|---|---|---|
| 12,202,192 | B2 * | 1/2025 | Gmeiner | B33Y 80/00 |
| 12,214,550 | B2 * | 2/2025 | Mansouri | B33Y 30/00 |
| 12,215,223 | B2 * | 2/2025 | Cole | B33Y 70/00 |
| 12,226,280 | B2 | 2/2025 | Kopelman et al. | |
| 12,274,597 | B2 | 4/2025 | Kopelman et al. | |
| 12,600,094 | B2 * | 4/2026 | Cole | B29C 64/245 |
| 2002/0192617 | A1 | 12/2002 | Phan et al. | |
| 2004/0166462 | A1 | 8/2004 | Phan et al. | |
| 2004/0166463 | A1 | 8/2004 | Wen et al. | |
| 2005/0014105 | A1 | 1/2005 | Abolfathi et al. | |
| 2005/0186524 | A1 | 8/2005 | Abolfathi et al. | |
| 2005/0244768 | A1 | 11/2005 | Taub et al. | |
| 2006/0019218 | A1 | 1/2006 | Kuo | |
| 2006/0078841 | A1 | 4/2006 | DeSimone et al. | |
| 2006/0115782 | A1 | 6/2006 | Li et al. | |
| 2006/0199142 | A1 | 9/2006 | Liu et al. | |
| 2006/0234179 | A1 | 10/2006 | Wen et al. | |
| 2008/0118882 | A1 | 5/2008 | Su | |
| 2008/0160473 | A1 | 7/2008 | Li et al. | |
| 2008/0286716 | A1 | 11/2008 | Sherwood | |
| 2008/0286717 | A1 | 11/2008 | Sherwood | |
| 2009/0280450 | A1 | 11/2009 | Kuo | |
| 2010/0055635 | A1 | 3/2010 | Kakavand | |
| 2010/0129763 | A1 | 5/2010 | Kuo | |
| 2011/0269092 | A1 | 11/2011 | Kuo et al. | |
| 2014/0061974 | A1 | 3/2014 | Tyler | |
| 2014/0067334 | A1 | 3/2014 | Kuo | |
| 2014/0265034 | A1 | 9/2014 | Dudley | |
| 2015/0097315 | A1 | 4/2015 | DeSimone et al. | |
| 2017/0165916 | A1 | 6/2017 | El-Siblani | |
| 2018/0000570 | A1 | 1/2018 | Sun et al. | |
| 2018/0134029 | A1 | 5/2018 | Myerberg et al. | |
| 2018/0141268 | A1 | 5/2018 | Holt | |
| 2018/0263730 | A1 | 9/2018 | Sirovskiy et al. | |
| 2019/0090995 | A1 | 3/2019 | Ruppert et al. | |
| 2019/0105839 | A1 | 4/2019 | Hicks et al. | |
| 2020/0023581 | A1 | 1/2020 | Markwalder et al. | |
| 2020/0188062 | A1 | 6/2020 | Kopelman et al. | |
| 2020/0238615 | A1 | 7/2020 | Staal et al. | |
| 2020/0290275 | A1 | 9/2020 | Dubelman et al. | |
| 2021/0146619 | A1 | 5/2021 | Shusteff et al. | |
| 2021/0178639 | A1 | 6/2021 | Lukacs et al. | |
| 2021/0187859 | A1 | 6/2021 | Gmeiner et al. | |
| 2021/0259809 | A1 | 8/2021 | O'Leary et al. | |
| 2021/0395420 | A1 * | 12/2021 | Frank | C08J 3/243 |
| 2022/0110717 | A1 | 4/2022 | Chavez et al. | |
| 2022/0110718 | A1 | 4/2022 | Chavez et al. | |
| 2022/0110719 | A1 | 4/2022 | Chavez et al. | |
| 2022/0203616 | A1 | 6/2022 | Korten et al. | |
| 2022/0227051 | A1 | 7/2022 | Regehly | |
| 2022/0258420 | A1 | 8/2022 | Märklin | |
| 2022/0313393 | A1 | 10/2022 | Lim et al. | |
| 2022/0370654 | A1 | 11/2022 | Ting et al. | |
| 2022/0387141 | A1 | 12/2022 | Nishimuta et al. | |
| 2023/0190411 | A1 | 6/2023 | Chiu et al. | |
| 2023/0190413 | A1 | 6/2023 | Matvienko et al. | |
| 2023/0210636 | A1 | 7/2023 | Kopelman et al. | |
| 2023/0210637 | A1 | 7/2023 | Wu et al. | |
| 2023/0294354 | A1 | 9/2023 | Gmeiner et al. | |
| 2023/0311410 | A1 | 10/2023 | Korten et al. | |
| 2023/0339181 | A1 * | 10/2023 | Habibi | B33Y 10/00 |
| 2023/0363861 | A1 | 11/2023 | Qin et al. | |
| 2024/0018288 | A1 | 1/2024 | Durban et al. | |
| 2024/0033053 | A1 | 2/2024 | Garrubba et al. | |
| 2024/0100775 | A1 | 3/2024 | Förster-Romswinckel et al. | |
| 2024/0140065 | A1 | 5/2024 | Choudhary et al. | |
| 2025/0065564 | A1 * | 2/2025 | Maccagnan | B29C 64/295 |
| 2025/0276378 | A1 * | 9/2025 | Förster-Romswinckel | B29C 64/171 |

FOREIGN PATENT DOCUMENTS

| | | | | |
|---|---|---|---|---|
| DE | 102018116314 | A1 | 1/2020 | |
| EP | 2956823 | B1 | 6/2016 | |
| EP | 3418033 | A1 | 12/2018 | |
| WO | 2015075094 | A1 | 5/2015 | |
| WO | 2016078838 | A1 | 5/2016 | |
| WO | 2017051029 | A1 | 3/2017 | |
| WO | 2017115076 | A1 | 7/2017 | |
| WO | 2018032022 | A1 | 2/2018 | |
| WO | 2018170422 | A1 | 9/2018 | |
| WO | 2018226164 | A2 | 12/2018 | |
| WO | 2019006409 | A1 | 1/2019 | |
| WO | 2020070639 | A1 | 4/2020 | |
| WO | 2020245456 | A1 | 12/2020 | |
| WO | 2021040898 | A1 | 3/2021 | |
| WO | 2021087061 | A2 | 5/2021 | |
| WO | 2021130654 | A1 | 7/2021 | |
| WO | 2021130657 | A1 | 7/2021 | |
| WO | 2021130661 | A1 | 7/2021 | |
| WO | 2022011456 | A1 | 1/2022 | |
| WO | 2024064832 | A2 | 3/2024 | |
| WO | WO-2025059492 | A1 * | 3/2025 | B29C 33/308 |
| WO | 2025184387 | | 9/2025 | |

* cited by examiner

ATTACHMENT MECHANISMS FOR MODULAR BUILD PLATFORMS

CROSS-REFERENCE TO RELATED APPLICATION(S)

The present application claims the benefit of priority to U.S. Provisional Application No. 63/559,529, filed Feb. 29, 2024, the disclosure of which is incorporated by reference herein in its entirety.

TECHNICAL FIELD

The present technology generally relates to manufacturing, and in particular, to attachment mechanisms for modular build platforms.

BACKGROUND

Additive manufacturing encompasses a variety of technologies that involve building up three-dimensional (3D) objects from multiple layers of material. Lithography-based additive manufacturing techniques generally involve curing a photoreactive resin by selectively exposing the resin to electromagnetic radiation, thereby forming a solid layer of cured material. This process can be repeated to build up a 3D object in a layer-by-layer manner. 3D objects that have been printed using lithography-based additive manufacturing techniques are typically subjected to finishing and post-processing steps. Usually, the printed objects are removed from the 3D printer together with the build platform onto which the objects are adhered, and the build platform serves as an aid for supporting and manipulating the objects during the finishing and post-processing steps. Although increasing the size of the build platform can increase the throughput of the additive manufacturing process by allowing more objects to be printed simultaneously, it may be challenging to use larger build platforms to support the objects during finishing and post-processing.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

I. Overview of Technology

Figure 1:
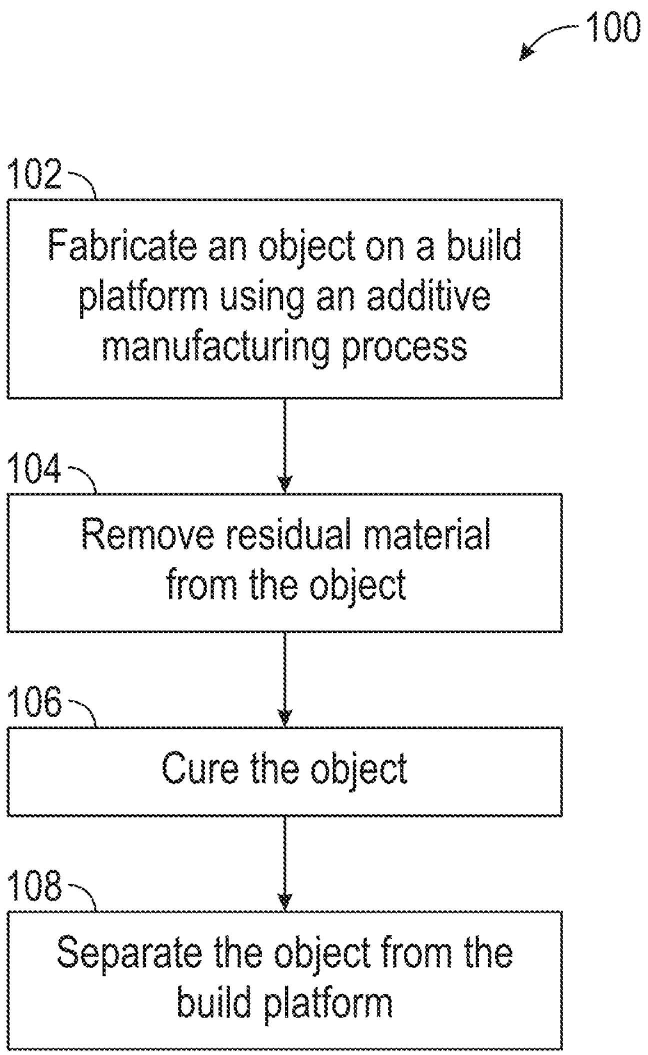
FIG. 1 is a flow diagram providing a general overview of a method for fabricating and post-processing an additively manufactured object, in accordance with embodiments of the present technology.

The present technology relates to systems, devices, and methods for additive manufacturing of 3D objects, such as dental appliances. In some embodiments, for example, an assembly for supporting 3D objects during an additive manufacturing process is provided. The assembly (which may also be referred to herein as a "build substrate") can include a plurality of build platforms, each build platform configured to support one or more 3D objects during the additive manufacturing process. The assembly can also include a carrier configured to support the plurality of build platforms, and an attachment mechanism configured to releasably couple the plurality of build platforms to the carrier during the additive manufacturing process. In some embodiments, the build platforms are coupled to the carrier such that the plurality of build platforms collectively form a flat build plane, e.g., a build plane having a vertical deviation no greater than 500 μm, or a vertical deviation within a range from 0 μm to 1 mm, 500 μm to 1 mm, etc.

The present technology can provide various advantages compared to conventional additive manufacturing techniques. For instance, the use of modular build platforms that can be individually coupled and decoupled from a carrier allows multiple build platforms to be assembled to form a single build substrate with a larger build plane for printing, which may be advantageous for producing a larger number of objects in a single printing operation and/or may be needed to accommodate certain types of additive manufacturing systems and processes. The build platforms can be attached to the carrier in a manner that ensures that the resulting build plane is sufficiently flat to avoid vertical deviations that could detrimentally affect adhesion of the printed objects to the build platforms, cause the printer to become misaligned with the build platforms, and/or reduce the accuracy of the printed objects. Moreover, the build platforms can be designed to accommodate excess material (e.g., resin) that may accumulate on the build platform and/or carrier during printing without disrupting the flat build plane.

After the additive manufacturing process, the build platforms can subsequently be removed from the carrier along with their respective objects, and may serve as a support for handling the objects during post-processing operations. The individual build platforms can be sufficiently small to be placed within post-processing devices (e.g., centrifuges, solvent baths, post-curing ovens) that are not capable of accommodating larger build platforms. The modular nature of the build platforms also allows for replacement of individual build platforms if a particular build platform becomes damaged or fouled, and also allows the type, geometry, and/or arrangement of the build platforms to be customized to accommodate different sizes, shapes, and/or arrangements of objects to be printed.

In some embodiments, 3D objects that have been printed via a lithography-based additive manufacturing method may be subjected to finishing and/or post-processing steps, such as removing uncured resin adhering to the object, removing support structures from the 3D printed objects, removing the 3D printed objects from the build platform (e.g., via a blade or other removal mechanism), and/or post-curing 3D objects via energy (e.g., UV light or heat-induced curing), in order to reach the objects' final specifications. Usually, the printed objects are removed from the additive manufacturing system together with the build platform onto which the objects are adhered. The build platform can be used as a carrier for supporting, handling, and/or manipulating the objects during the finishing and/or post-processing steps. However, it may be challenging to use larger build platforms as a carrier for the 3D printed objects during finishing and post-processing steps.

Therefore, it is an object of the present technology to improve lithography-based additive manufacturing methods so as to facilitate finishing and postprocessing steps in cases where a relatively large build platform is used. In some embodiments, the present technology provides a method of producing a plurality of 3D objects by lithography-based additive manufacturing. Further, the present technology can provide a 3D printer for carrying out this method.

The present technology in a first aspect thereof provides a method of producing a plurality of 3D objects by lithography-based additive manufacturing, comprising:

- providing a 3D printer comprising a carrier and a plurality of build platforms releasably fixed on the carrier, each build platform defining a build plane for building at least one 3D object thereon, the 3D printer further comprising a light engine for selectively curing layers of a light-polymerizable resin on the build platforms;
- building a plurality of 3D objects with the 3D printer, wherein at least one of said plurality of 3D objects is built on each build platform;
- removing the build platforms with said at least one 3D object placed thereon from the 3D printer; and
- subjecting the 3D objects, while being arranged on their respective build platform, to at least one post-processing step after the build platforms have been separated from the carrier.

Thus, this present technology is based on the idea to divide a large build platform into a plurality of smaller build platforms that are releasably fixed on a carrier. Due to their smaller size, each build platform can be easier to handle, and the individual build platforms can be handled separately from each other for subjecting the objects thereon to post-processing steps. Further, using a plurality of smaller build platforms instead of a single platform allows an even larger building area than in conventional approaches. Using a plurality of smaller build platforms can also provide a modular system, in which the size, arrangement and/or number of build platforms may be adapted to the requirements of the specific print job.

The build platforms may be removed from the 3D printer together with the carrier or after having been separated from the carrier. If the build platforms are removed from the 3D printer while still fixed to the carrier, the build platforms can be separated from the carrier before subjecting the 3D objects to the at least one post-processing step. In any case, for carrying out the at least one post-processing step, the build platforms may have been removed and be separated from the carrier. Removing the build platforms from the carrier may be undertaken manually or automatically. In the automatic embodiment, the 3D printer may comprise releasing means for releasing a holding force, such as, e.g., a magnetic or mechanical holding force.

Each build platform from the plurality of build platforms carries at least one 3D object. In some embodiments, a plurality of 3D objects is built on each build platform, such as five or more, 10 or more, or 20 or more objects.

The carrier may hold at least two build platforms. In some embodiments, a larger number of build platforms is releasably fixed on the carrier, such as three, four, or more build platforms, 20 or more build platforms, or 50 or more build platforms.

In some embodiments, the plurality of build platforms are arranged on the carrier to cover an area of at least 2000 $cm^2$, such as at least 2500 $cm^2$. In some instances, a single build platform having a size of, e.g., 100 cm×30 cm, or 150 cm×50 cm, does not easily fit in, e.g., centrifuges, solvent cleaning devices, or UV or thermal furnaces. Therefore, the segmentation of a large build platform into smaller segments that are easier to handle can be a straightforward way to facilitate the subsequent post-processing steps after printing is finished.

The build platforms may all have the same size and be arranged in a regular grid. Alternatively, the build platforms may have different sizes and shapes. The build platforms may be made of any kind of material that has a sufficient stiffness so as to be inherently stable to support the 3D objects printed thereon and to be handled during the post-processing steps. Suitable materials include metal, ceramic, glass, wood, or paper. For example, a simple sheet metal plate may be used as a build platform. Suitable metals are, for example, aluminum or steel. Further, the build platforms may have different surface finishes or a rough pattern, which can promote the adhesion of the 3D object onto the build platform.

In some embodiments, the build platforms may have recesses, such as holes, drills, hollows, or gaps, which can promote resin to flow through or in said recesses. In some cases, the resin flowing through said recesses can be collected below the build platforms to be reused in a later printing job.

In some embodiments, the build platforms may be cooled. In other embodiments, the build platforms may be heated. The build platforms may be heated to a surface temperature at the build plane of 20° C. to 200° C., such as 30° C. to 90° C.

The build platforms can be releasably fixable on the carrier so that, on the one hand, their position on the carrier can reliably be kept stable during the printing process, and that, on the other hand, they may easily be detached from the carrier upon completion of the printing process. The build platforms may be releasably fixed to the carrier by means of mechanical clamping, electromagnetic forces, magnetic forces, vacuum, and/or a form-fit engagement. By being releasably fixable to the carrier, the build platforms can constitute exchangeable parts that may be reused for a plurality of production cycles.

In some embodiments, the build platforms are arranged and fixable on the carrier so as to provide a build plane that is common to all build platforms.

Due to the modular system provided by the use of a plurality of exchangeable build platforms, the build platforms may advantageously be adapted to the footprint of the one or the plurality of 3D objects to be printed onto the respective build platform.

In some embodiments, prefabricated elements can be fixed on and/or attached to one or more build platforms. Said fixed or attached prefabricated elements can then be manipulated by printing, e.g., on their surfaces.

The method of the present technology may be carried out by stereolithography manufacturing principles, e.g., by using 3D printers comprising a light engine for selectively curing layers of a light-polymerizable resin on the plurality of build platforms.

As used herein, “light” may include any electromagnetic radiation that is able to induce polymerization of a light-polymerizable resin. The term “light” needs not be restricted to visible light, e.g., the portion of the spectrum that can be perceived by the human eye. The radiation may have a wavelength in the range of 10 nm to 10,000 nm, such as 100 nm to 500 nm.

The term “light-polymerizable resin” may refer to a material that conforms into a hardened polymeric material through a curing process. A light-polymerizable resin may include, but is not limited to, a mixture of monomers, oligomers, and photoinitiators. A light-polymerizable resin may also be referred to as an uncured photopolymer.

Typically, a light-polymerizable resin may include (e.g., consist of) optionally at least one (reactive) oligomer, optionally at least one (reactive) diluent, at least one photoinitiator, optionally additives, and/or optionally fillers. Reactive groups may be unsaturated chemical bonds or cyclic chemical structures. Examples of reactive groups include alkenes, alkynes, vinyl compounds, (meth)acrylates, acrylamides, allyl compounds, norbornene, vinyl ethers, vinyl esters, epoxides, oxetanes, maleimides, thiols, and so forth. Oligomers may be optionally reactive group-functionalized and may comprise all kinds of polymerisates, polycondensation and polyaddition products, e.g., epoxies, polyesters, polyurethanes, copolymers, homopolymers, polyamides, polycarbonates, polythioethers, polythioesters, silicones, and many more. Reactive diluents may be monofunctional or multifunctional low molecular weight reactive monomers that serve as a reactive solvent in order to adjust process viscosity of the photoreactive resins and mechanical properties of the final photopolymer. Additives may include defoamers, wetting agents, leveling agents, flame retardants, UV stabilizers, UV absorbers, IR absorbers, thermal stabilizers, and/or thermal initiators. Examples for fillers may include metals, metallic alloys, ceramics, glass, polymers, natural fabrics, salts, and many more. Photoinitiators may form reactive species when exposed to radiation of certain wavelength(s) that trigger off the polymerization. Typical reactive species include radicals, cations, anions, or activated catalytic species. Photoinitiators can also act in combination with catalysts, coinitiators, and/or sensitizers.

“Curing” the light-polymerizable resin may be a process, wherein the light-polymerizable resin is polymerized or cross-linked as a result of being irradiated by light.

As used herein, a “light engine” may be a device that is able to generate dynamic light information according to a predetermined pattern. As an example, liquid crystal displays, digital light processing, other active mask projection systems, and/or laser-scanner based systems may be used to selectively project light information on the surface of the light-polymerizable resin.

According to some embodiments of the present technology, the post-processing step is selected from removing uncured resin (e.g., by centrifuging the 3D object), washing the 3D object with fluids, removing solvents from the 3D object, subjecting the 3D object to pressurized air, drying the 3D object, removing support structures from the 3D object, removing the 3D object from the build platform, post-curing the 3D object by means of UV light, and/or heat-curing and/or microwave-curing the 3D object. In some embodiments, dual cure systems utilize at least one subsequent activation step (e.g., heat or microwave) after 3D printing to trigger off a second reaction to reach the final desired material properties.

In order to facilitate the separation of the 3D object from the build platform after the post-processing step, an interface layer may each be arranged on the build platforms, on top of which the 3D objects are built, wherein the at least one post-processing step comprises destabilizing, eliminating, or removing the interface layer, thereby causing the 3D object to be detached from the build platform. Removing or destabilizing the interface layer may comprise subjecting the interface layer to a physical and/or chemical process that causes the interface layer to disintegrate or lose its stability, such as by means of dissolving, etching, melting, or other chemical or physical means.

As to the nature of the interface layer, any material may be used that differs from the cured light-polymerizable resin in at least one physical and/or chemical property, such as the melting point, the solubility, the boiling point, etc. In some embodiments, the interface layer is made from a material that is polymerizable and, in its polymerized and prepolymerized state, can be dissolved or swollen in a solvent. Such a material may therefore include (e.g., consist of) at least one polymerizable group, such as acrylates, methacrylates, acrylamides, vinyl ethers, vinyl esters, maleimides, cyclic ethers, isocyanates, amines, or other polymerizable unsaturated or saturated groups, and may optionally further comprise at least one hydrophilic or oleophilic group. The polymerized material may be dissolvable or swellable in a solvent, such as water, alcohol, oil, or other organic solvents. Such materials, for example, may comprise hydroxyl, carbonyl, and/or carboxyl groups, and/or derivatives with other electronegative hetero atoms, amines, ionic liquids and salts, for example, hydroxyethylacrylate (HEA), hydroxyethylmethacrylate (HEMA), 2-(2-ethoxyethoxy)ethyl acrylate (EOEOEA), acryloyl morpholine (ACMO), polyethylene glycol derivates, polyethers, hydroxy ethylene, or lauryl acrylates. The interface layer may be applied by a spray coating.

Alternatively, a film may each be arranged on the build platforms and the 3D objects are built on top of the film, and wherein the at least one post-processing step comprises peeling the film off from the build platform, thereby detaching the 3D object from the build platform.

In order to integrate prefabricated elements into the 3D printed object, some embodiments provide that, before printing the 3D object, a prefabricated element is placed and/or mounted onto the build platform or into a recess of the build platform and at least one of the layers of light-polymerizable resin is bonded to the prefabricated element during the printing of the 3D object. The prefabricated element can be made of a material that is different from the light-polymerizable resin. In this way multi-material combinations are possible. Further, a combination of parts may be realized that cannot be printed in the same process.

In accordance with lithography-based additive manufacturing methods, the 3D object can be built on the building platform layer-by-layer to obtain a stack of structured layers, wherein each structured layer is obtained by the steps of:

- providing an unstructured layer of light-polymerizable resin; and
- selectively projecting light onto the unstructured layer according to a desired pattern, thereby curing the light-polymerizable resin to obtain the structured layer that is structured according to the pattern.

The use of a plurality of smaller build platforms instead of a single, larger platform is particularly useful in a 3D printing method disclosed in International Publication Nos. WO 2021/130654, WO 2021/130657, and WO 2021/130661, which may be characterized by a significantly larger build area than in conventional embodiments. Therefore, some embodiments of the present technology provide that at least one of the light engine and the carrier is driven for relative movement to one another while selectively curing a layer of the light-polymerizable resin, so that an exposure field of the light engine sweeps across said plurality of build platforms.

In some embodiments, the light engine is configured for the dynamic patterning of light in the exposure field of said light engine, wherein pattern data is fed to the light engine so that a light pattern is scrolled in the exposure field at a rate that corresponds to the relative movement speed of the light engine and the carrier.

According to a second aspect, the present technology provides a 3D printer for carrying out a method according to the first aspect of the present technology, comprising a carrier and a plurality of build platforms releasably fixed on the carrier, each build platform defining a build plane for building at least one 3D object thereon, the 3D printer further comprising a light engine for selectively curing layers of a light-polymerizable resin on the build platforms.

In some embodiments, fixing means are provided for fixing the position and/or orientation of the build platforms on the carrier, the fixing means being selected from mechanical clamping means, electromagnetic holding means, magnetic holding means, vacuum means, and form-fit engagement means.

In some embodiments, the carrier comprises means for collecting excess resin that might drop through the gaps between neighboring build platforms. The excess resin may be collected in a suitable vessel, wherein the collected material may be recycled for being reused in another printing process.

In some embodiments, the build platforms and/or the carrier may be equipped with machine-readable identification means, such as RFID chips or engraved patterns readable by a camera system, in order that the individual build platforms can be automatically identified.

In some embodiments, at least one of the light engine and the carrier is driven for relative movement to one another while selectively curing a layer of the light-polymerizable resin, for an exposure field of the light engine to sweep across said plurality of build platforms.

According to some embodiments, the printer may comprise means for applying an unstructured layer of light-polymerizable resin onto the build platform or on the partially built object, wherein the light engine is designed for the patterning of light onto the unstructured layer of light-polymerizable resin, the light engine being adapted to cure the light-polymerizable resin to obtain the structured layer that is structured according to the pattern.

In some embodiments, the light engine is designed for the dynamic patterning of light in the exposure field of said light engine, wherein pattern data is fed to the light engine so that a light pattern is scrolled in the exposure field at a rate that corresponds to the relative movement speed of the light engine and the carrier.

The present technology may be used for manufacturing various types of 3D objects. Examples for applications of 3D printed objects include electronics, electric and electromechanic components, connectors, housings, automobile and aerospace sectors, electric mobility, communication technology, computer technology, military technology, medical devices, medical technology, consumer goods, sports industry, energy industry, printed electronics, and dental and orthodontic applications. Orthodontic applications comprise, without limitations, aligners, retainers, brackets and wires, whitening trays, mouth trays and guards, aligners for drug delivery, aligners for the detection of substances, night guards, anti-bruxing or anti-grinding devices, tongue thrust devices, palatal expanders, oral appliance therapy for treatment of malocclusion, sleep apnea, anti-snoring devices, attachment templates, mandibular advancement devices, prefabricated attachment templates, etc., each of which includes the methods and processes for these purposes.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," "lower," "left," "right," etc., can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

II. Modular Build Platforms for Additive Manufacturing

A. Additive Manufacturing Technology

FIG. 1 is a flow diagram providing a general overview of a method 100 for fabricating and post-processing an additively manufactured object, in accordance with embodiments of the present technology. The method 100 can be used to produce many different types of additively manufactured objects, such as orthodontic appliances (e.g., aligners, palatal expanders, retainers, attachment placement devices, attachments), restorative objects (e.g., crowns, veneers, implants), and/or other dental appliances and devices (e.g., oral sleep apnea appliances, mouth guards). Additional examples of dental appliances and associated methods that are applicable to the present technology are described in Section III below.

The method 100 begins at block 102 with fabricating an object on a build platform using an additive manufacturing process. Additive manufacturing (also referred to herein as "3D printing") includes a variety of technologies which fabricate 3D objects directly from digital models through an additive process. In some embodiments, additive manufacturing includes depositing a precursor material onto a build platform. The build platform can be one of a plurality of modular build platforms that are releasably coupled to a carrier, as described in Section II.B below. The precursor material can be cured, polymerized, melted, sintered, fused, and/or otherwise solidified to form a portion of the object and/or to combine the portion with previously formed portions of the object. In some embodiments, the additive manufacturing techniques provided herein build up the object geometry in a layer-by-layer fashion, with successive layers being formed in discrete build steps. Alternatively or in combination, the additive manufacturing techniques described herein can allow for continuous build-up of an object geometry.

The additive manufacturing process can implement any suitable technique known to those of skill in the art. Examples of additive manufacturing techniques include, but are not limited to, the following: (1) vat photopolymerization, in which an object is constructed from a vat or other bulk source of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) material extrusion, in which material is drawn though a nozzle, heated, and deposited layer-by-layer, such as fused deposition modeling (FDM) and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding. Optionally, an additive manufacturing process can use a combination of two or more additive manufacturing techniques.

For example, the additively manufactured object can be fabricated using a vat photopolymerization process in which light is used to selectively cure a vat or other bulk source of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the material source, light source, and build platform.

As another example, the additively manufactured object can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° C. to 120° C., from 90° C. to 120° C., from 100° C. to 120° C., from 105° C. to 115° C., or from 105° C. to 110° C. The heating can lower the viscosity of the photopolymerizable material before and/or during curing, and/or increase reactivity of the photopolymerizable material. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Patent Publication Nos. 2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous 3D path in order to form the object. Such methods are described in U.S. Pat. No. 10,162,624 and U.S. Patent Publication No. 2014/0061974, the disclosure of which is incorporated herein by reference in its entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Pat. No. 10,162,264 and U.S. Patent Publication No. 2014/0265034, the disclosures of which are incorporated herein by reference in their entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting holographic light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Publication No. 2021/0146619, U.S. Patent Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

In yet another example, the additively manufactured object can be fabricated using a powder bed fusion process (e.g., selective laser sintering) involving using a laser beam to selectively fuse a layer of powdered material according to a desired cross-sectional shape in order to build up the object geometry. As another example, the additively manufactured object can be fabricated using a material extrusion process (e.g., fused deposition modeling) involving selectively depositing a thin filament of material (e.g., thermoplastic polymer) in a layer-by-layer manner in order to form an object. In yet another example, the additively manufactured object can be fabricated using a material jetting process involving jetting or extruding one or more materials onto a build surface in order to form successive layers of the object geometry.

The additively manufactured object can be made of any suitable material or combination of materials. As discussed above, in some embodiments, the additively manufactured object is made partially or entirely out of a polymeric material, such as a curable polymeric resin. The resin can be composed of one or more monomer components that are initially in a liquid state. The resin can be in the liquid state at room temperature (e.g., 20° C.) or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/087061, the disclosures of each of which are incorporated herein by reference in their entirety.

Optionally, the additively manufactured object can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after curing (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the additively manufactured object can be formed from multiple materials in a plurality of sequential manufacturing steps. For instance, a first portion of the object can be formed from a first material in accordance with any of the fabrication methods herein, then a second portion of the object can be formed from a second material in accordance with any of the fabrication methods herein, and so on, until the entirety of the object has been formed.

After the additively manufactured object is fabricated, the object can undergo one or more additional process steps, also referred to herein as "post-processing." As described in detail below with respect to blocks 104-108, post-processing can include removing residual material from the object, curing the object, and/or separating the object from the build platform.

For example, at block 104, the method 100 continues with removing residual material from the object. The residual material can include excess precursor material (e.g., uncured resin) and/or other unwanted material (e.g., debris) that remains on or within the object after the additive manufacturing process. The residual material can be removed in many different ways, such as by exposing the object to a solvent (e.g., via spraying, immersion), heating or cooling the object, applying a vacuum to the object, blowing a pressurized gas onto the object, applying mechanical forces to the object (e.g., vibration, agitation, centrifugation, tumbling, brushing), and/or other suitable techniques. Optionally, the residual material can be collected and/or processed for reuse.

At block 106, the method 100 can optionally include curing the object. This additional curing step (also known as "post-curing") can be used in situations where the object is still in a partially cured "green" state after fabrication. For example, the energy used to fabricate the object in block 102 may only partially polymerize the precursor material forming the object. Accordingly, the post-curing step may be needed to fully cure (e.g., fully polymerize) the object to its final, usable state. Post-curing can provide various benefits, such as improving the mechanical properties (e.g., stiffness, strength) and/or temperature stability of the object. Post-curing can be performed by heating the object, applying radiation (e.g., UV, visible, microwave) to the object, or suitable combinations thereof. In other embodiments, however, the post-curing process of block 106 is optional and can be omitted.

At block 108, the method 100 can include separating the object from the build platform. The build platform can mechanically support the object during the additive manufacturing and/or the post-processing steps described herein. In some embodiments, the build platform is coupled to a carrier during additive manufacturing, and is removed from the carrier during post-processing. Additional details and examples of build platforms that may be used in the method 100 are described in Section II.B below.

The method 100 illustrated in FIG. 1 can be modified in many different ways. For example, although the above steps of the method 100 are described with respect to a single object, the method 100 can be used to sequentially or concurrently fabricate and post-process any suitable number of objects, such as tens, hundreds, or thousands of additively manufactured objects. As another example, the ordering of the processes shown in FIG. 1 can be varied (e.g., the process of block 108 can be performed before and/or concurrently with the processes of blocks 104 and/or 106). Some of the processes of the method 100 can be omitted, such as the process of block 106.

Additionally, the method 100 can include processes not shown in FIG. 1, such as cleaning the object (e.g., washing), annealing, trimming the object to remove structures that are not intended to be present in the final product (e.g., residual parts of the support structures), and/or packaging the object for shipment. Optionally, the method 100 can include modifying at least one surface of the object. The surface modifications can be applied to some or all of the surfaces of the object (e.g., the exterior and/or interior surfaces) to alter one or more surface characteristics, such as the surface finish (e.g., roughness, waviness, lay), porosity, visual appearance (e.g., gloss, transparency, visibility of print lines), hydrophobicity, and/or chemical reactivity. In some embodiments, the surface modifications include removing material from the object, e.g., by polishing, abrading, blasting, etc. Alternatively or in combination, the surface modifications can include applying an additional material to the object. For example, the additional material can be a coating, such as a polymeric coating. The coating can be applied to one or more surfaces of the object for various purposes, including, but not limited to: providing a smooth surface finish, which can be beneficial for aesthetics and/or to improve user comfort if the object is intended to be in contact with the user's body (e.g., an orthodontic appliance worn on the teeth); coloring and/or applying other aesthetic features to the object; improving scratch resistance and/or other mechanical properties; providing antimicrobial properties; and incorporating therapeutic agents into the object for controlled release.

In some embodiments, the present technology utilizes a lithography-based additive manufacturing process. Lithography-based additive manufacturing generally refers to methods in which a curable material (e.g., a photoreactive resin) is selectively exposed to energy (e.g., electromagnetic radiation) and cures upon exposure to the energy, thereby forming a solid layer of cured material. In some embodiments, the very first layer adheres to a build platform and shows sufficient bonding during the manufacturing process to support the rest of the object. Subsequent layers of cured material are repeatedly added upon the already cured layer, thus generating a 3D object. Examples of lithography-based additive manufacturing processes include SLA, DLP, liquid crystal display (LCD) printing, two-photon polymerization (2PP) (also known as two-photon induced polymerization (TPIP)), inkjet printing (e.g., MultiJet printing), volumetric 3D printing, and other suitable radiation-curable technologies, as well as their combinations and/or combinations of other manufacturing approaches. Compared to other additive manufacturing technologies, lithography-based additive manufacturing process can yield geometrically complex, highly resolved objects with exceptional surface finish.

Traditional lithography-based additive manufacturing processes use large photopolymer resin vats, in which a build platform and the layers of the object already printed on the build platform are submerged during the printing process. In these systems, new layers are added on top of each other at the surface of the liquid resin bath. Various light sources are typically used in order to induce photopolymerization of the liquid photopolymer resin layer. As an example, DLP, other active mask projection systems, and/or laser-scanner based systems may be used to selectively project light information on the surface of the photopolymer resin. These printing concepts advantageously allow use of large resin vats and often result in large building areas.

However, generating a thin layer of resin between a submerged structure and the free surface of the liquid resin bath may be limited in accuracy (e.g., regarding the liquid layer thickness) due to a variety of factors, including the viscosity and/or surface tension phenomena of the resin formulation used. Further, feature accuracy is typically limited when large building areas are used, even if laser-scanner based systems are used. Optical limitations of the scanner lens construction, timing limitations of the traditionally used pulse laser sources, and/or large deviation angles of the scanning field may result in accuracy limitations of the whole printing process, and/or accuracy shifts between the center and the edge of the building area. Another issue is the need for significant amounts of photopolymer material before a printing job can be started (e.g., vat filling procedure). As photopolymer resins can become chemically unstable, resin storage and degradation as well as cleaning a large resin vat can become an economical problem and limits the process stability over time.

Some lithography-based approaches use vat-based concepts, where a liquid resin is filled into a transparent material vat. According to these approaches, a layer of the liquid resin is irradiated by selective light information from below, e.g., through the bottom of the material vat, so that the printed components are generated upside-down, sticking to a so-called build platform. These systems present some advantages, such as the possibility of mechanically adjusting the resin layer height by lowering the building platform into the resin vat. By doing so, layers of resin with desired thicknesses (e.g., thin layers of resin) and/or products with features of desired resolutions (e.g., products with high feature resolution have become possible.

Further, with certain process adaptions like heating or thin film coating (see, e.g., European Patent No. EP3284583 and European Patent No. EP3418033, the disclosures of which are incorporated by reference herein in their entirety), highly viscous materials (e.g., resins) can be printed, which may not be capable of processing with any other additive manufacturing technique. Highly viscous materials can lead to advanced mechanical properties of parts printed with stereolithography. Dynamic lithography-based manufacturing technologies have massively increased the available build area and consequently significantly increased the production rate of small, highly resolved objects. These novel technologies are based on a light engine that is driven to travel across a large build platform while depositing a layer of light-polymerizable resin by means of an endless carrier foil and curing said layer. Examples of such technologies are provided in International Publication Nos. WO 2021/130654, WO 2021/130657, and WO 2021/130661, the disclosures of which are incorporated by reference herein in their entirety.

Figure 2:
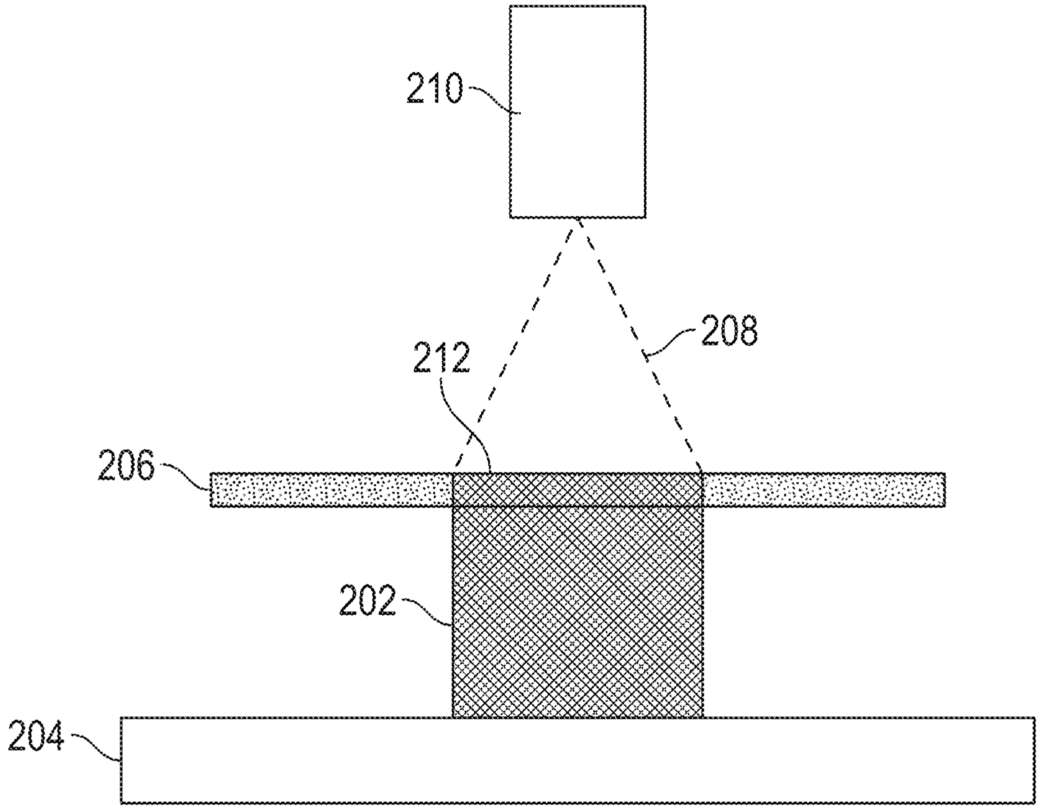
FIG. 2 is a partially schematic diagram providing a general overview of a lithography-based additive manufacturing process, in accordance with embodiments of the present technology.

FIG. 2 is a partially schematic diagram providing a general overview of a lithography-based additive manufacturing process, in accordance with embodiments of the present technology. In the illustrated embodiment, an object 202 is fabricated on a build platform 204 from a series of cured material layers, with each layer having a geometry corresponding to a respective cross-section of the object 202. To fabricate an individual object layer, a layer of curable material 206 (e.g., polymerizable resin) is brought into contact with the build platform 204 (when fabricating the first layer of the object 202) or with the previously formed portion of the object 202 on the build platform 204 (when fabricating subsequent layers of the object 202). In some embodiments, the curable material 206 is formed on and supported by a substrate (not shown), such as a film. Energy 208 (e.g., light) from an energy source 210 (e.g., a laser, projector, or light engine) is then applied to the curable material 206 to form a cured material layer 212 on the build platform 204 or on the object 202. The remaining curable material 206 can then be moved away from the build platform 204 (e.g., by lowering the build platform 204, by moving the build platform 204 laterally, by raising the curable material 206, and/or by moving the curable material 206 laterally), thus leaving the cured material layer 212 in place on the build platform 204 and/or object 202. The fabrication process can then be repeated with a fresh layer of curable material 206 to build up the next layer of the object 202.

The illustrated embodiment shows a "top down" configuration in which the energy source 210 is positioned above and directs the energy 208 down toward the build platform 204, such that the object 202 is formed on the upper surface of the build platform 204. Accordingly, the build platform 204 can be incrementally lowered relative to the energy source 210 as successive layers of the object 202 are formed. In other embodiments, however, the additive manufacturing process of FIG. 2 can be performed using a "bottom up" configuration in which the energy source 210 is positioned below and directs the energy 208 up toward the build platform 204, such that the object 202 is formed on the lower surface of the build platform 204. Accordingly, the build platform 204 can be incrementally raised relative to the energy source 210 as successive layers of the object 202 are formed.

Figure 3:
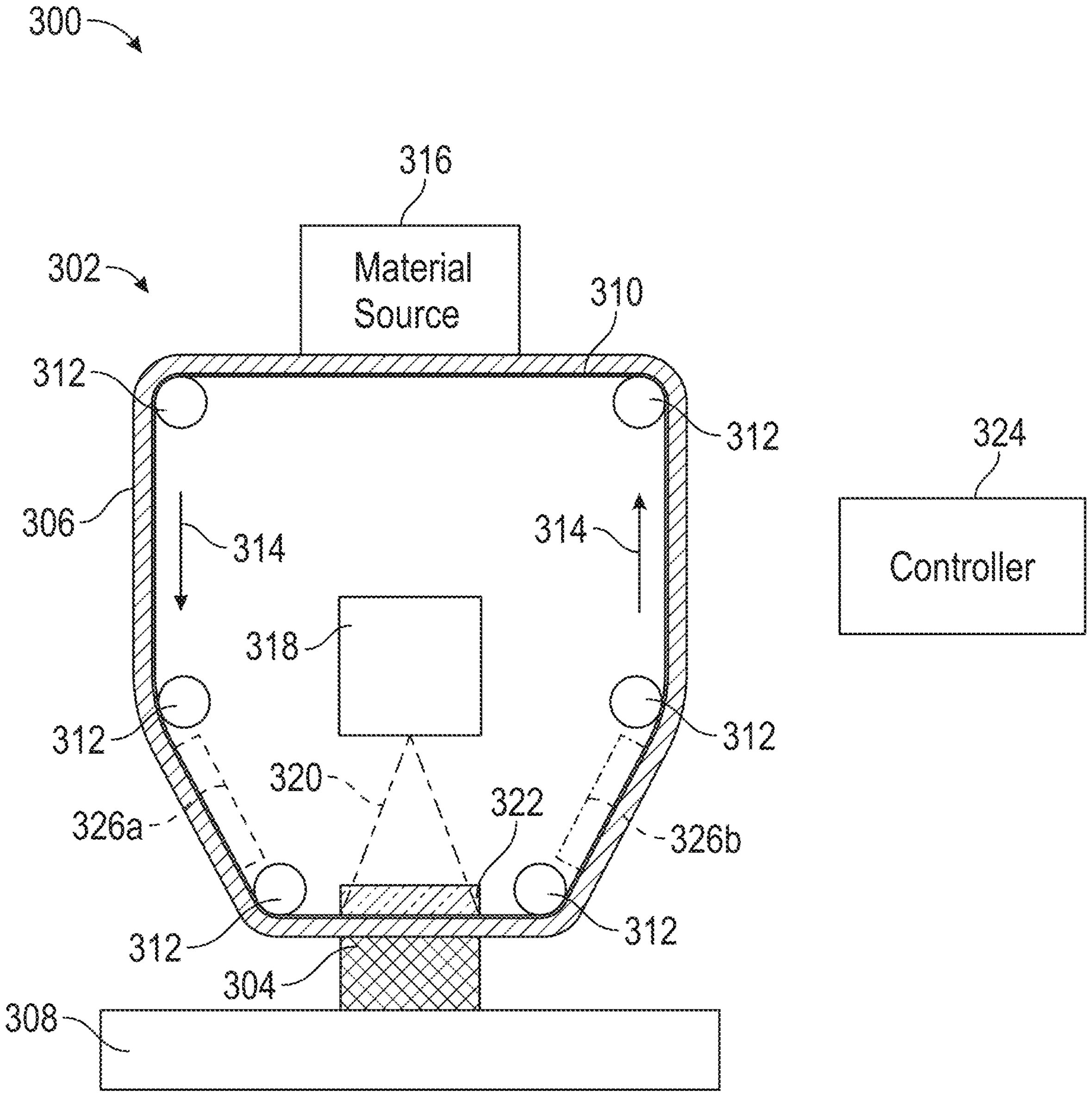
FIG. 3 is a partially schematic diagram of a system for lithography-based additive manufacturing configured in accordance with embodiments of the present technology.

FIG. 3 illustrates a representative example of a system 300 for lithography-based additive manufacturing configured in accordance with embodiments of the present technology. The system 300 can be used to fabricate any embodiment of the objects described herein. For example, the system 300 can be used to produce an object in accordance with block 102 of the method 100 of FIG. 1.

The system 300 includes a printer assembly 302 configured to fabricate an additively manufactured object 304 ("object 304") using any of the additive manufacturing processes described herein, such as a lithography-based additive manufacturing process. The printer assembly 302 is configured to deposit a curable material 306 (e.g., a polymerizable resin or other solidifiable precursor material) on a build platform 308 (e.g., a tray, plate, film, sheet, or other planar substrate) to form the object 304. In the illustrated embodiment, the printer assembly 302 includes a carrier film 310 configured to deliver the curable material 306 to the build platform 308. The carrier film 310 can be a flexible loop of material having an outer surface and an inner surface. The outer surface of the carrier film 310 can adhere to and carry a thin layer of the curable material 306. The inner surface of the carrier film 310 can contact one or more rollers 312 that rotate to move the carrier film 310 in a continuous loop trajectory, e.g., along the direction indicated by arrows 314.

The printer assembly 302 can also include a material source 316 (shown schematically) configured to apply the curable material 306 to the carrier film 310. In the illustrated embodiment, the material source 316 is located at the upper portion of the printer assembly 302. In other embodiments, however, the material source 316 can be at a different location in the printer assembly 302. The material source 316 can include nozzles, ports, vats, reservoirs, etc., that deposit the curable material 306 onto the outer surface of the carrier film 310. The material source 316 can also include one or more blades (e.g., doctor blades, recoater blades) that smooth the deposited curable material 306 into a relatively thin, uniform layer. For example, the curable material 306 can be formed into a layer having a thickness within a range from 200 microns to 300 microns, or any other desired thickness.

The curable material 306 can be conveyed by the carrier film 310 toward the build platform 308. In the illustrated embodiment, the build platform 308 is located below the printer assembly 302. In other embodiments, however, the build platform 308 can be positioned at a different location in the printer assembly 302. The distance between the carrier film 310 and build platform 308 can be adjustable so that the curable material 306 at can be brought into direct contact with the surface of the build platform 308 (when printing the initial layer of the object 304) or with the surface of the object 304 (when printing subsequent layers of the object 304). For example, the build platform 308 can include or be coupled to a motor (not shown) that raises and/or lowers the build platform 308 to the desired height during the manufacturing process. Alternatively or in combination, the printer assembly 302 can include or be coupled to a motor (not shown) that raises and/or lowers the printer assembly 302 relative to the build platform 308.

The printer assembly 302 includes an energy source 318 (e.g., a projector, light engine, laser) that outputs energy 320 (e.g., light, such as UV light) having a wavelength configured to partially or fully cure the curable material 306. The carrier film 310 can be partially or completely transparent to the wavelength of the energy 320 to allow the energy 320 to pass through the carrier film 310 and onto the portion of the curable material 306 above the build platform 308. Optionally, a transparent plate 322 can be disposed between the energy source 318 and the carrier film 310 to guide the carrier film 310 into a specific position (e.g., height) relative to the build platform 308. During operation, the energy 320 can be patterned or scanned in a suitable pattern onto the curable material 306, thus forming a layer of cured material onto the build platform 308 and/or on a previously formed portion of the object 304. The geometry of the cured material can correspond to the desired cross-sectional geometry for the object 304. The parameters for operating the energy source 318 (e.g., energy intensity, energy dosage, exposure time, exposure pattern, exposure wavelength, energy density, power density) can be set based on instructions from a controller 324, as described in further detail below.

In some embodiments, the energy 320 is applied to the curable material 306 while the carrier film 310 moves to circulate the curable material 306 through the exposure zone of the energy source 318. To maintain zero or substantially zero relative velocity between the curable material 306 and the build platform 308, the printer assembly 302 can concurrently move horizontally relative to the build platform 308 opposite the direction of the motion of the carrier film 310 at the exposure zone. The energy 320 output by the energy source 318 can be coordinated with the movement of the carrier film 310 and build platform 308 so that the layer of cured material is formed with the correct geometry. For example, the energy source 318 can be a scrolling light engine (e.g., a scrolling digital light processing engine) that outputs an energy pattern that varies over time to match the motion of the printer assembly 302 and carrier film 310. In other embodiments, however, the printer assembly 302 can be a stationary device that does not move relative to the build platform 308 while the energy 320 is being applied to the curable material 206.

The newly formed layer of cured material can be separated from the carrier film 310 and the remaining curable material 306 at or after the exposure zone. In some embodiments, the separation occurs at least in part due to peel-off forces produced by the carrier film 310 wrapping around the roller 312 immediately downstream of the exposure zone. Peel-off forces can alternatively or additionally be provided by movements of the build platform 308 and/or printer assembly 302 (e.g., raising the printer assembly 302 away from the build platform 308, moving the printer assembly 302 laterally away from the build platform 308); use of a roller, blade, or other mechanism to facilitate separation of the cured material from the carrier film 310; and/or other parameters of the printer assembly such as movement speed of the carrier film 310.

The remaining curable material 306 can be carried by the carrier film 310 away from the build platform 308 and back toward the material source 316. The material source 316 can deposit additional curable material 306 onto the carrier film 310 and/or smooth the curable material 306 to re-form a uniform layer of curable material 306 on the carrier film 310. The curable material 306 can then be recirculated back to the build platform 308 to fabricate an additional layer of the object 304. This process can be repeated to iteratively build up individual object layers on the build platform 308 until the object 304 is complete. The object 304 and build platform 308 can then be removed from the system 300 for post-processing.

In some embodiments, the system 300 is used in a high temperature lithography process utilizing a highly viscous curable material 306 (e.g., a highly viscous resin). Accordingly, the printer assembly 302 can include one or more heat sources (heating plates, infrared lamps, etc.) for heating the curable material 306 to lower the viscosity to a range suitable for additive manufacturing. For example, the printer assembly 302 can include a first heat source 326*a* positioned against the segment of the carrier film 310 before the build platform 308, and a second heat source 326*b* positioned against the segment of the carrier film 310 after the build platform 308. Alternatively or in combination, the printer assembly 302 can include heat sources at other locations.

The system 300 also includes a controller 324 (shown schematically) that is operably coupled to the printer assembly 302 and build platform 308 to control the operation thereof. The controller 324 can be or include a computing device including one or more processors and memory storing instructions for performing the additive manufacturing operations described herein. For example, the controller 324 can receive a digital data set (e.g., a 3D model) representing the object 304 to be fabricated, determine a plurality of object cross-sections to build up the object 304 from the curable material 306, and can transmit instructions to the energy source 318 to output energy 320 to form the object cross-sections. The controller 324 can control the energy application parameters of the energy source 318, such as the energy intensity, energy dosage, exposure time, exposure pattern, energy wavelength, and/or energy type of the energy 320 applied to the curable material 306. Optionally, the controller 324 can also determine and control other operational parameters, such as the positioning of the build platform 308 (e.g., height) relative to the carrier film 310, the movement speed and direction of the carrier film 310, the amount of curable material 306 deposited by the material source 316, the thickness of the material layer on the carrier film 310, and/or the amount of heating applied to the curable material 306.

Although FIG. 3 illustrates a representative example of a system 300 for additive manufacturing, this is not intended to be limiting, and the methods described herein can be implemented using other types of additive manufacturing systems, such as vat-based systems, material jetting systems, binder jetting systems, material extrusion systems, powder bed fusion systems, sheet lamination systems, or directed energy deposition systems.

B. Modular Build Platforms and Associated Systems and Methods

Figure 4:
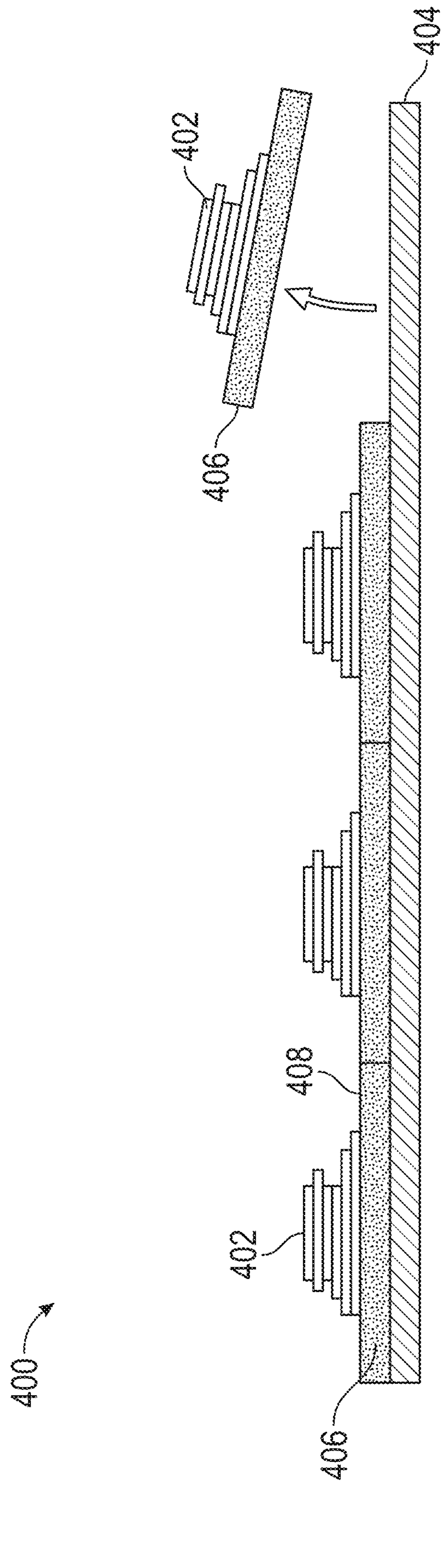
FIG. 4 is a side view of a modular build substrate for additive manufacturing, in accordance with embodiments of the present technology.

FIG. 4 is a side view of a modular build substrate 400 for additive manufacturing, in accordance with embodiments of the present technology. The modular build substrate 400 can be used to support a plurality of objects 402 during additive manufacturing and/or post-processing of the objects 402, such as during any of the processes described in Section II.A above. For example, the modular build substrate 400 can be used during a lithography-based additive manufacturing process for fabricating the objects 402.

The modular build substrate 400 includes a carrier 404 and a plurality of build platforms 406 attached to the carrier 404. The carrier 404 can be a tray, plate, film, sheet, or other generally planar substrate suitable for coupling to and supporting the build platforms 406 during the entire additive manufacturing process. The carrier 404 can be configured to hold any suitable number of build platforms 406, such as two, three, four, five, 10, 20, 50, or more build platforms 406. The build platforms 406 can be arranged on the carrier 404 in a linear array (e.g., a row), a 2D array (e.g., a regular grid), or any other suitable configuration, e.g., as described further below in connection with FIGS. 7A-10B. The arrangement of the build platforms 406 can be varied based on the number and/or geometry of the objects 402 to be fabricated. The build platforms 406 can collectively form a build plane 408 that defines the total area available for printing the objects 402. In some embodiments, the total area of the build plane 408 formed by the build platforms 406 is at least 1000 $cm^2$, 1500 $cm^2$, 2000 $cm^2$, 2500 $cm^2$, 3000 $cm^2$, 3500 $cm^2$, 4000 $cm^2$, 4500 $cm^2$, or 5000 $cm^2$. In some embodiments, the total area of the build plane is larger than 5000 $cm^2$ to accommodate larger objects and/or faster printing speeds. The build plane 408 can have a length greater than or equal to 20 cm, 50 cm, 100 cm, 150 cm, or 200 cm; and/or a width greater than or equal to 10 cm, 20 cm, 30 cm, 40 cm, or 50 cm.

The build platforms 406 can each be a tray, plate, film, sheet, or other generally planar substrate suitable for coupling to and supporting at least one object 402. Each build platform 406 can independently support any suitable number of objects 402, such as one, two, three, four, five, 10, 20, 50, or more objects 402. Each build platform 406 can be made of any suitable material (e.g., metal (such as aluminum or steel), polymer, ceramic (such as alumina-based ceramics), glass, wood, paper) that exhibits sufficient adhesion to the cured material to support the object 402 during the entire additive manufacturing process. In some embodiments, the build platform 406 is made partially or entirely out of a metal to allow for inductive heating of the build platform 406, e.g., in embodiments where the additive manufacturing process is a high temperature lithography process. Aluminum may be advantageous for facilitating thermal homogeneity, while steel may be advantageous for providing enhanced strength. Composite materials are also contemplated, such as two or more materials arranged in layers or other configurations. The composite materials can be or include includes filled systems, such as silica filled plastics or fiber filled plastics. In some embodiments, the build platforms 406 are injection molded, recyclable, and/or compostable. The surface of the build platform 406 that contacts the object 402 can also be configured to promote adhesion. For instance, each build platform 406 can have a smooth, polished surface, a rough surface, a structured or patterned surface, etc., and/or may include various surface finishes. In embodiments where the build platform 406 is made out of a metal, the surface of the build platform 406 may or may not be anodized.

In some embodiments, the material of the build platform 406 is selected to withstand forces that may be applied to the build platform 406 during post-processing. For example, in embodiments where the build platform 406 and object 402 are centrifuged to remove residual curable material, the build platform 406 can be sufficiently stiff to resist forces arising from centrifugation (e.g., the build platform 406 exhibits little or no bending when subjected to centrifugation). Optionally, the lower surface of the build platform 406 can include ridges and/or other reinforcement features formed therein to enhance the stiffness of the build platform 406 while reducing the overall weight of the build platform 406.

The geometry of each build platform 406 can be varied as desired. For instance, each build platform 406 can have any suitable shape, such as rectangular, square, triangular, trapezoidal, oval, circular, or any other polygonal or non-polygonal shape. Some or all of the build platforms 406 can have the same shape, or some or all of the build platforms 406 can have different shapes. Moreover, each build platform 406 can have any suitable size, such as an area within a range from 100 $cm^2$ to 1000 $cm^2$, 100 $cm^2$ to 500 $cm^2$, 100 $cm^2$ to 200 $cm^2$, 200 $cm^2$ to 1000 $cm^2$, 200 $cm^2$ to 500 $cm^2$, or 500 $cm^2$ to 1000 $cm^2$. For example, an individual build platform 406 can have a length and/or width that is less than or equal to 50 cm, 40 cm, 30 cm, 25 cm, 20 cm, 15 cm, or 10 cm. Some or all of the build platforms 406 can have the same size, or some or all of the build platforms 406 can have different sizes.

The build platforms 406 can be releasably coupled to the carrier 404 so that each build platform 406 is independently removable from the carrier 404. The coupling between each build platform 406 and the carrier 404 can be configured to maintain the build platform 406 in a stable position and orientation during the additive manufacturing process, while also allowing for easy detachment of the build platform 406 from the carrier 404 upon completion of the additive manufacturing process and/or in preparation for post-processing of the objects 402. Examples of attachment mechanisms that may be used to releasably couple the build platforms 406 to the carrier 404 include vacuum, mechanical fixation (e.g., interference fit, snap fit, interlocking features, fasteners, form-fitting inserts, clamps, springs, hinged features), electromagnetic fixation, magnetic fixation, and combinations thereof. Additional examples of attachment mechanisms are provided below in connection with FIGS. 14-29.

In some embodiments, when the build platforms 406 are coupled to the carrier 404, the upper surfaces of the build platforms 406 are level with each other to define a flat build plane 408. For example, the maximum difference between the vertical positions of the upper surfaces of the build platforms 406 (also referred to herein as the "vertical deviation of the build plane 408") can be no more than 1 mm, 500 μm, 400 μm, 300 μm, 200 μm, 100 μm, or 50 μm; and/or within a range from 50 μm to 500 μm, or 500 μm to 1 mm. The maximum vertical deviation of the build plane 408 can be less than or equal to the thickness of an individual layer of the object 402 (e.g., the layer thickness can be within a range from 50 μm to 150 μm). In some embodiments, a flat build plane 408 is significant for ensuring proper adhesion of the initial layer(s) of the object 402. A flat build plane 408 can be achieved, for example, via attachment mechanisms that avoid buckling of the build plane 408 when coupled to the carrier 404, e.g., as discussed below in connection with FIGS. 14-29.

The build platforms 406 can be "modular" build platforms 406 in that each build platform 406 can be independently selected, positioned on the carrier 404, and/or removed from the carrier 404. The use of such modular build platforms 406 can provide various advantages, such as providing a larger build plane 408 (e.g., for higher throughput printing) that can be segmented into smaller individual build platforms 406 that are compatible with post-processing devices (e.g., centrifuges, solvent cleaning devices (solvent baths such as ultrasonic solvent baths), UV or thermal furnaces, ovens (such as curing and/or annealing ovens), chillers, laser marking devices, laser cutting devices, ink jetting devices, powder coating devices, dip coating devices, spraying devices, conveyor belts, drying devices (dryers such as air blade dryers)); allowing build platforms 406 to be individually removed and replaced (e.g., if the build platform 406 becomes damaged or fouled); and/or allowing the type, geometry, and/or arrangement of the build platforms 406 to be varied in a modular fashion to accommodate different printing operations (e.g., different sizes, shapes, and/or arrangements of objects 402).

In some embodiments, some or all of the build platforms 406 can include recesses (e.g., cavities, holes, pores, hollows, gaps, grooves), and the curable material can flow through and/or into the recesses. The curable material that flows through and/or into the recesses can be collected below the build platforms 406 for reuse in subsequent printing operations. For instance, the carrier 404 can include or be coupled to a container for collecting the curable material. Moreover, some or all of the build platforms 406 can include features configured to create a gap between the lower surface of the build platforms 406 and the upper surface of the carrier 404, such excess curable material may accumulate within the gap without disrupting the flat build plane 408, e.g., as described further below in connection with FIGS. 13A-13C.

Optionally, the carrier 404 and/or the build platforms 406 can include an identifier. The identifier can be an electronic tag that is coupled to the carrier 404 and/or build platforms 406, such as an RFID chip. Alternatively or in combination, the identifier can be a machine-readable marking (e.g., a camera-readable marking) such as a barcode, QR code, or other pattern that is engraved or otherwise formed in the carrier 404 and/or build platforms 406. The identifier can be used to automatically identify the carrier 404 and/or the individual build platforms 406, thereby allowing the objects 402 on the carrier 404 and/or build platforms 406 to be tracked throughout the manufacturing operation.

Figure 5:
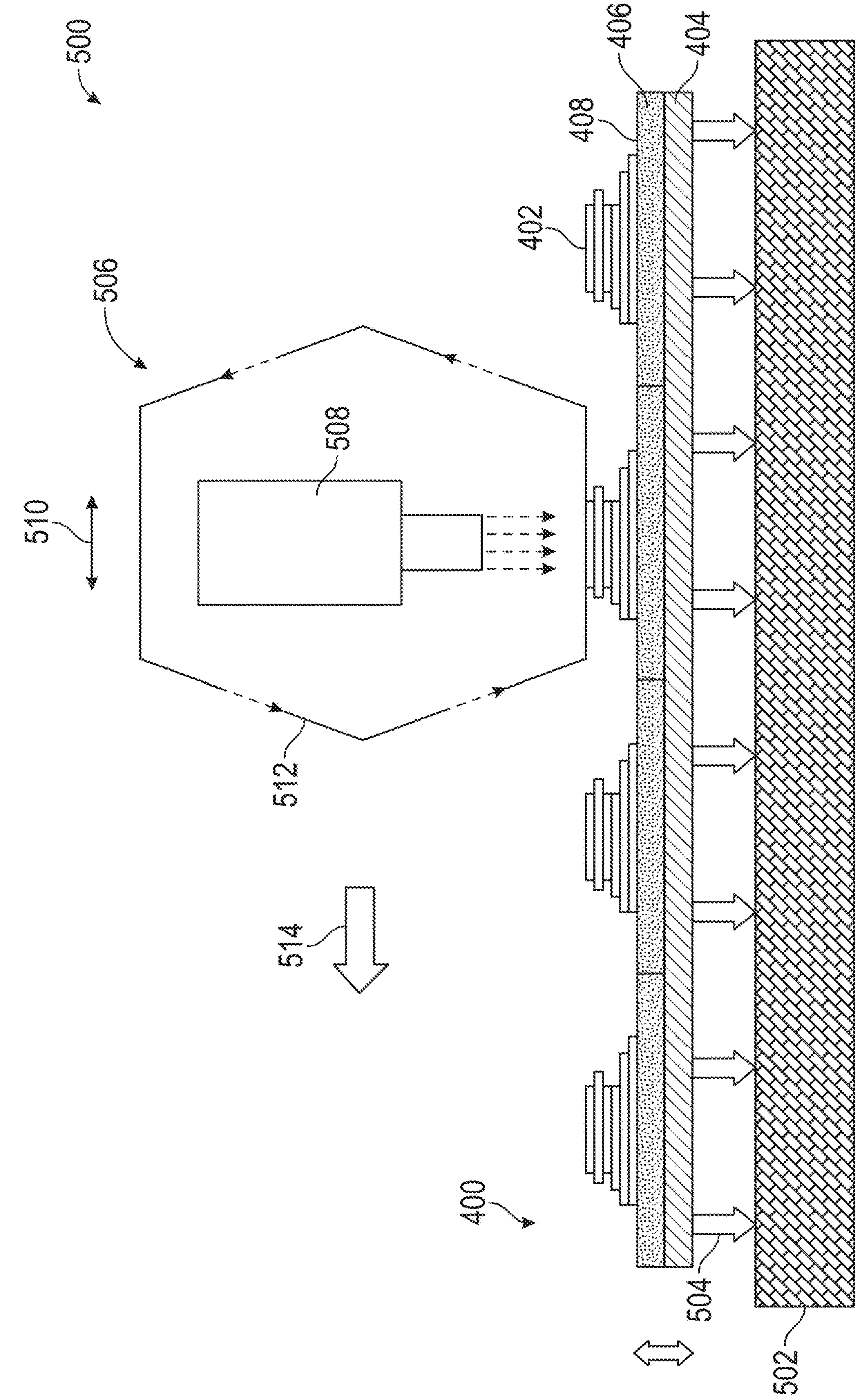
FIG. 5 is a partially schematic diagram of an additive manufacturing system including a modular build substrate, in accordance with embodiments of the present technology.

FIG. 5 is a partially schematic diagram of an additive manufacturing system 500 including the modular build substrate 400, in accordance with embodiments of the present technology. The system 500 can be a 3D printer that is used to fabricate a plurality of 3D objects 402 using any suitable additive manufacturing technique, such as a lithography-based additive manufacturing process in which the objects 402 are fabricated from a curable material in a layer-by-layer manner, as described herein.

In the illustrated embodiment, the modular build substrate 400 is coupled to and held down onto a stationary base 502 (also known as a "base carrier") of the system 500. The base 502 can be a tray, plate, film, sheet, stage, table, or other generally planar substrate suitable for coupling to and supporting the modular build substrate 400 during the additive manufacturing process. As shown in FIG. 5, the carrier 404 of the modular build substrate 400 can be coupled to the base 502 via an attachment mechanism 504 (also known as a "fixing means"). The attachment mechanism 504 can utilize any suitable releasable coupling technique, such as vacuum, mechanical fixation (e.g., interference fit, snap fit, interlocking features, form-fitting inserts, clamps, springs, hinged features), electromagnetic fixation, magnetic fixation, or combinations thereof. In this way, the carrier 404 can be separated from the base 502, thus allowing the entire modular build substrate 400 to be automatically or manually removed from the system 500 after the additive manufacturing process has been completed.

As described herein, the manufacturing cycle for the objects 402 can include additive manufacturing of the objects 402 using the system 500, at least one post-processing operation, and the subsequent removal of the objects 402 from the associated build platform 406. In the illustrated embodiment, the objects 402 are additively manufactured in a layer-by-layer manner by a movable printer assembly 506 (also known as a "print head") including an energy source 508 (e.g., a light engine), which travels over and across the build plane 408 formed by the build platforms 406 (e.g., along the directions indicated by arrows 510). The components and operation of the printer assembly 506 can be identical or generally similar to those of the printer assembly 302 of FIG. 3. For instance, the movable printer assembly 506 can be configured to apply a layer of a curable material (e.g., a light-polymerizable resin) onto an endless movable carrier film 512 (also known as a "carrier foil"), which can move in a circulating loop trajectory around the energy source 508 (e.g., in a counter-clockwise direction as shown in FIG. 5). The carrier film 512 can convey the layer of curable material into an exposure zone of the energy source 508, such that the curable material is exposed and cured while the printer assembly 506 is driven to move across the plurality of build platforms 406 (e.g., along the direction indicated by arrow 514, which represents the printing direction for the illustrated movement direction of the carrier film 512). Accordingly, a layer of cured material corresponding to a cross-section of each object 402 can be formed on the corresponding build platform 406. The modular build substrate 400 can then then be lowered (e.g., via an elevator mechanism, which may be coupled to or part of the base 502—not shown) and/or the movable printer assembly 506 can be raised in preparation for forming the next layer of cured material. This process can be repeated to build up the objects 402 from a plurality of sequential layers of cured material.

After the additive manufacturing process, the build platforms 406 with the respective fabricated objects 402 can be individually removed from the carrier 404. The process of the build platforms 406 from the carrier 404 can be performed outside or inside the system 500. Optionally, the carrier 404 can be removed from the base 502 before removing the build platforms 406 from the carrier 404. Thereafter, the individual build platforms 406 with the respective fabricated objects 402 arranged thereon can be subjected to at least one post-processing operation. For instance, the post-processing operation can include removing residual curable material from the objects object 402, removing solvents from the objects 402, applying pressurized air to the objects 402, drying the objects 402, removing support structures from the objects 402, post-curing the objects 402, and/or performing surface modifications to the objects 402. Some or all of these processes can be performed while the objects 402 remain on their respective build platforms 406. Moreover, because the build platforms 406 can be separated from each other, objects 402 on different build platforms 406 can be processed at different types and/or using different post-processing techniques.

The configuration of the system 500 can be varied in many ways. For instance, the base 502 can be omitted, such that the carrier 404 serves as directly as the stationary base during additive manufacturing. Conversely, the carrier 404 may be omitted, such that the base 502 serves as the component that directly supports the build platforms 406, in which case any of the features described herein as being part of the carrier 404 (e.g., attachment mechanisms) may instead be part of the base 502. The system 500 can include additional components not shown in FIG. 5, such as a controller including one or more processors and memory storing instructions for controlling the operation of the system 500. In some embodiments, the build platforms 406 are cooled (e.g., via one or more cooling devices such as thermoelectric coolers, cold plates, cooled fluids, etc.). For instance, some or all of the build platforms 406 may be cooled to a surface temperature at the build plane 408 within a range from 20° C. to −150° C., or from 20° C. to −20° C. In other embodiments, some or all of the build platforms 406 may be heated (e.g., via one or more heating devices such as thermoelectric heaters, heat sinks, heating plates, heat lamps, heated fluid, inductive heaters, etc.). For instance, some or all of the build platforms 406 may be heated to a surface temperature at the build plane 408 within a range from 20° C. to 250° C., or from 30° C. to 90° C. Accordingly, the system 500 can include cooling and/or heating devices at any suitable location, such as between the build platforms 406 and carrier 404, between the carrier 404 and the base 502, within the build platforms 406, within the carrier 404, within the base 502, etc.

Figure 6:
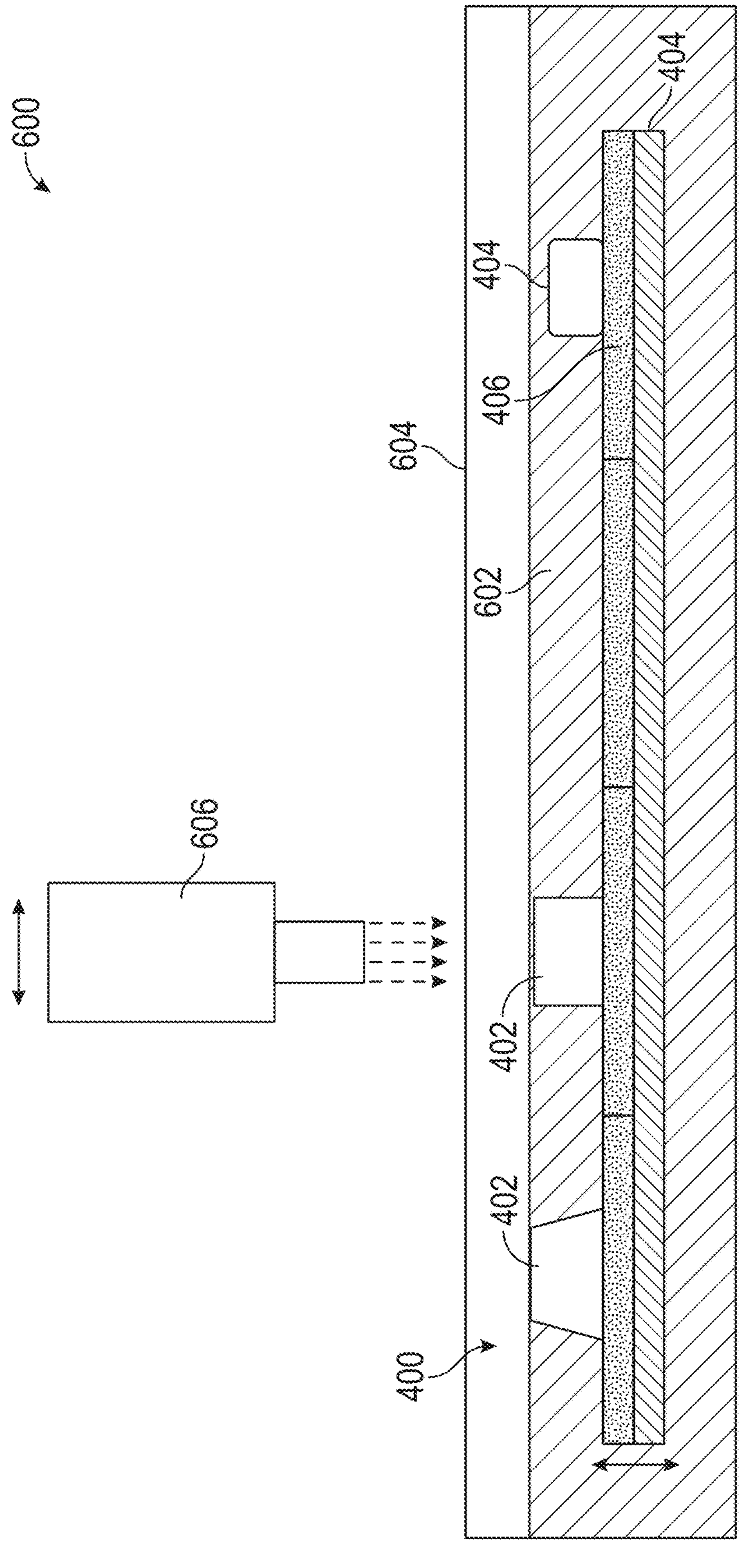
FIG. 6 is a partially schematic diagram of another additive manufacturing system including a modular build substrate, in accordance with embodiments of the present technology.

FIG. 6 is a partially schematic diagram of another additive manufacturing system 500 including the modular build substrate 400, in accordance with embodiments of the present technology. The system 600 can be a 3D printer that is used to fabricate a plurality of 3D objects 402 using any suitable additive manufacturing technique, such as a lithography-based additive manufacturing process in which the objects 402 are fabricated from a curable material in a layer-by-layer manner, as described herein. In the illustrated embodiment, the system 600 is configured for a vat-based additive manufacturing process, in which the modular build substrate 400, including the carrier 404 with the build platforms 406 thereon, is immersed into a volume (e.g., a bath) of curable material 602 (e.g., light-polymerizable resin) within a reservoir 604 (e.g., a vat). One or more movable energy sources 606 (e.g., light engines) can locally irradiate a thin layer of the curable material 602 that extends above the build platforms 406 and/or the partly built objects

402. In this way, the objects 402 can be built layer-by-layer. Each time a layer has been cured, the modular build substrate 400 can be lowered (e.g., via an elevator mechanism—not shown) in preparation for curing the next layer.

After the additive manufacturing process, the build platforms 406 with the respective fabricated objects 402 can be individually removed from the carrier 404, which may be performed outside or inside the system 600. The carrier 404 can be removed from the reservoir 604 before removing the build platforms 406 from the carrier 404, or the build platforms 406 can be removed from the carrier 404 while the carrier 404 is within the reservoir 604. Thereafter, the individual build platforms 406 with the respective fabricated objects 402 arranged thereon can be subjected to at least one post-processing step, as described elsewhere herein.

The configuration of the system 600 can be varied in many ways. For example, the system 600 can include additional components not shown in FIG. 6, such as a controller including one or more processors and memory storing instructions for controlling the operation of the system 600. The system 600 can optionally include a base that is releasably coupled to the carrier 404 to support the modular build substrate 400 (e.g., similar to the base 502 of FIG. 5). In such embodiments, the base can be a movable stage that is positioned within the reservoir 604 to raise and lower the modular build substrate 400 during the additive manufacturing process. Moreover, in some embodiments, the build platforms 406 are cooled (e.g., via one or more cooling devices such as thermoelectric coolers, cold plates, cooled fluids, etc.), while in other embodiments, the build platforms may be heated (e.g., via one or more heating devices such as heat sinks, heating plates, heat lamps, heated fluid, etc.). Accordingly, the system 600 can include cooling and/or heating devices at any suitable location, such as between the build platforms 406 and carrier 404, between the carrier 404 and the base, within the build platforms 406, within the carrier 404, within the base, within the reservoir 604, coupled to the reservoir 604, etc.

It will be appreciated that the modular build substrates and build platforms described herein can be used in other types of additive manufacturing processes besides the embodiments illustrated in FIGS. 5 and 6. For example, the build platforms described herein can also be used as a valuable tool to facilitate post-processing in bottom-up, top-down, or volumetric radiation-curing vat polymerization processes as well as static film lamination processes. For example, a coating of light-polymerizable resin can be applied on a carrier film and can be irradiated with a static light engine, thereby building up one or more 3D objects on the build platforms arranged on the carrier.

FIGS. 7A-12 illustrate additional features of modular build substrates and build platforms configured in accordance with embodiments of the present technology. Any of the embodiments described in connection with FIGS. 7A-12 can be combined with each other and/or with the embodiments described in connection with FIGS. 4-6. Moreover, the modular build substrates and build platforms described in connection with FIGS. 7A-12 can be generally similar to the modular build substrate 400 and build platform 406 of FIG. 4, such that like numbers (e.g., build platform 406 versus build platform 706) are used to identify similar or identical components, and the following discussion of FIGS. 7A-12 will be limited to those features that differ from the embodiments described in connection with FIG. 4.

Figure 7A:
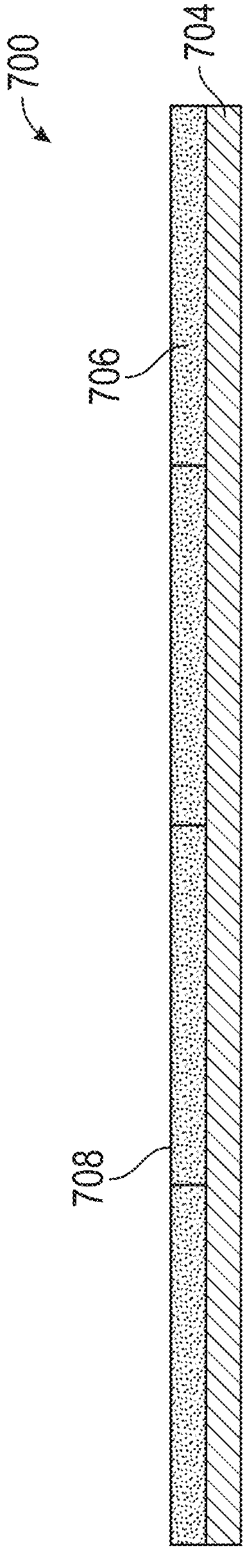
FIG. 7A is a side view of a modular build substrate configured in accordance with embodiments of the present technology.
Figure 7B:
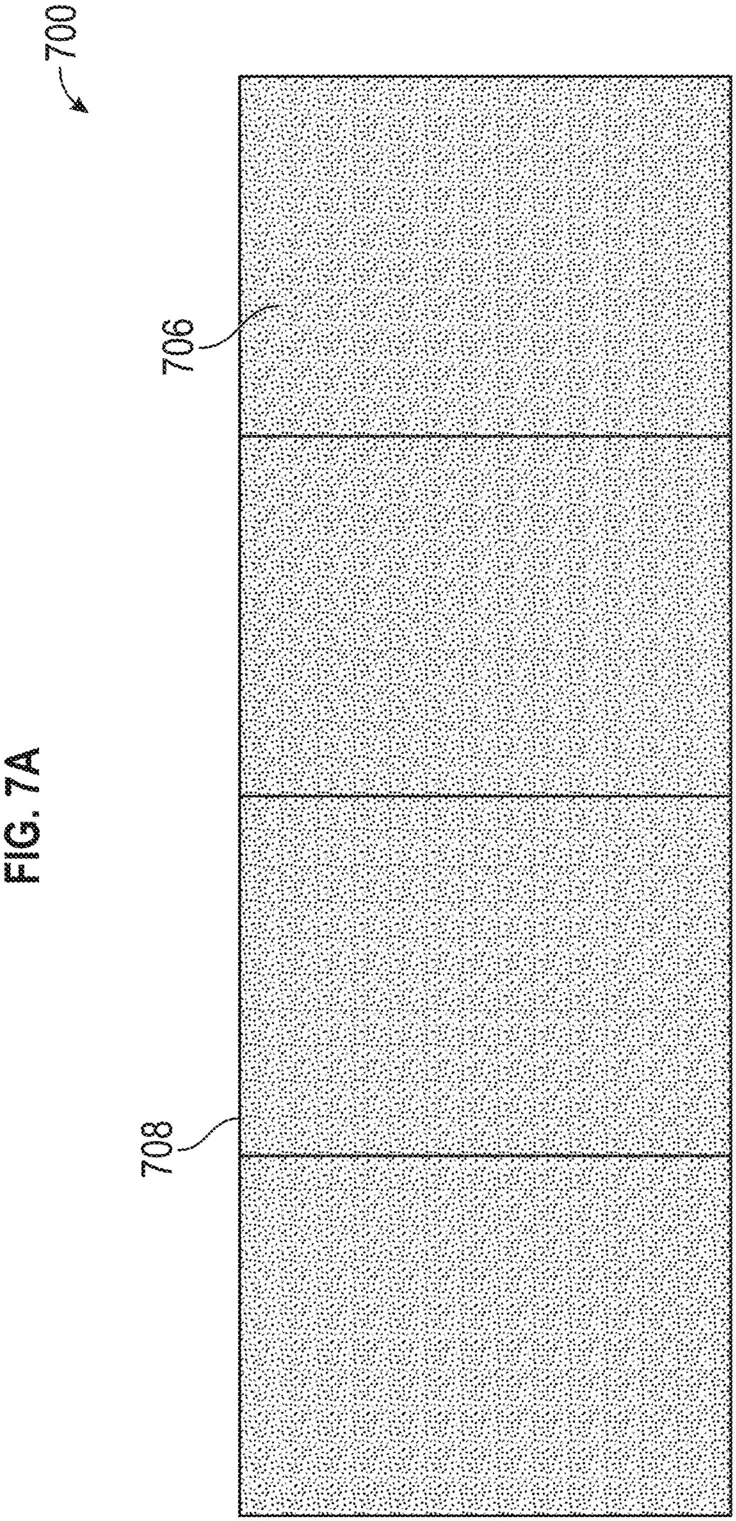
FIG. 7B is a top view of the modular build substrate of FIG. 7A.

FIGS. 7A-10B illustrate modular build substrates with various configurations of build platforms. For example, FIGS. 7A and 7B are side and top views of a modular build substrate 700 configured in accordance with embodiments of the present technology. The modular build substrate 700 includes a carrier 704 and a plurality of build platforms 706 releasably coupled to the carrier 704. In the illustrated embodiment, the build platforms 706 each have a rectangular shape and are arranged in a line configuration (e.g., a linear array such as a row) on the carrier 704. The build platforms 706 can be seamlessly and/or tightly packed next to each other so there is little or no gap between adjacent build platforms 706 (e.g., the distance between adjacent build platforms 706 is no more than 200 μm, 100 μm, 50 μm, 25 μm, or 10 μm). Accordingly, the build platforms 706 can collectively define a single continuous build plane 708 for fabricating one or more objects.

Figure 8A:
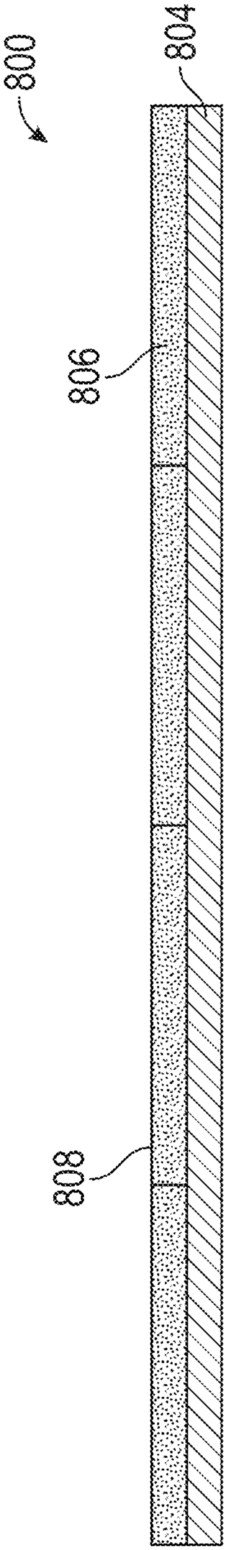
FIG. 8A is a side view of another modular build substrate configured in accordance with embodiments of the present technology.
Figure 8B:
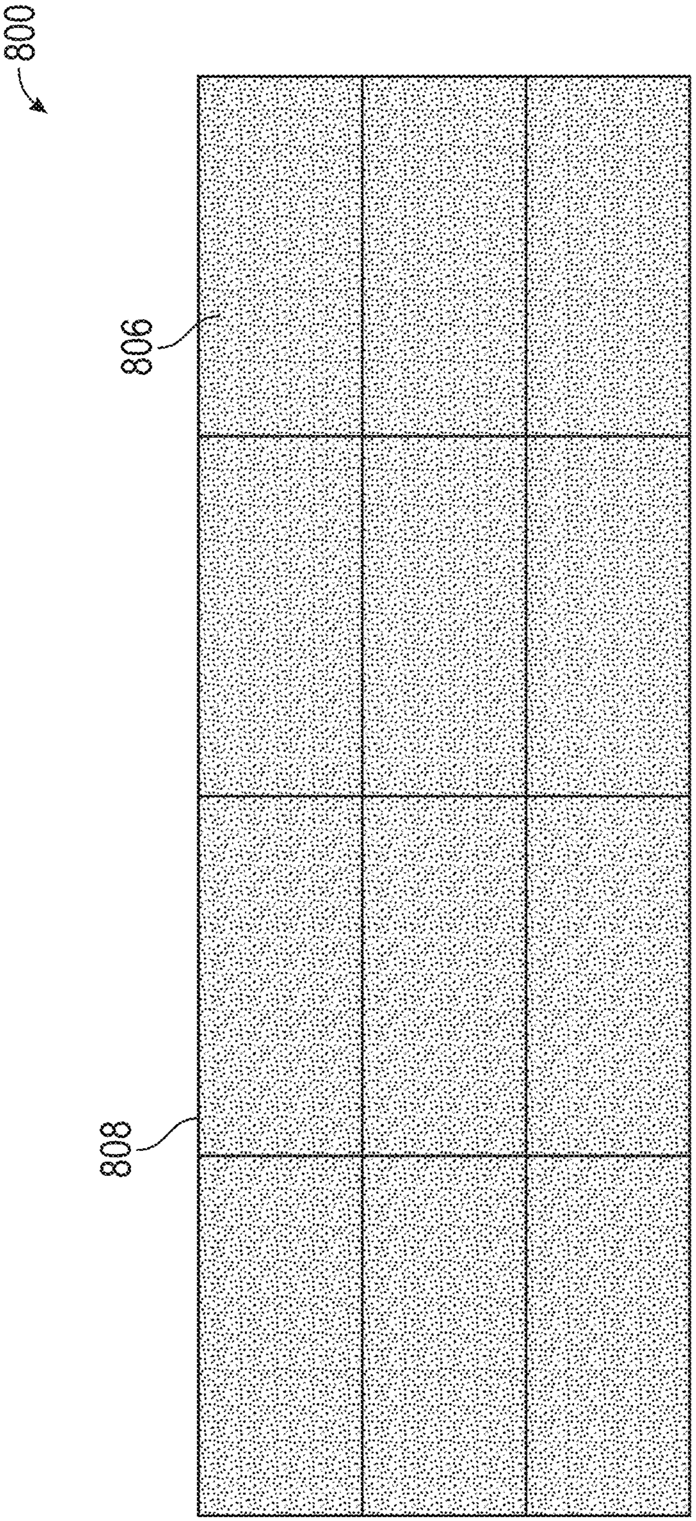
FIG. 8B is a top view of the modular build substrate of FIG. 8A.

FIGS. 8A and 8B are side and top views of another modular build substrate 800 configured in accordance with embodiments of the present technology. The modular build substrate 800 includes a carrier 804 and a plurality of build platforms 806 releasably coupled to the carrier 804. In the illustrated embodiment, the build platforms 806 each have a rectangular shape and are arranged in a grid configuration (e.g., a 2D array including a plurality of rows and a plurality of columns) on the carrier 804. The build platforms 806 can be seamlessly and/or tightly packed next to each other so there is little or no gap between adjacent build platforms 806 (e.g., the distance between adjacent build platforms 806 is no more than 200 μm, 100 μm, 50 μm, 25 μm, or 10 μm). Accordingly, the build platforms 806 can collectively define a single continuous build plane 808 for fabricating one or more objects.

Figure 9A:
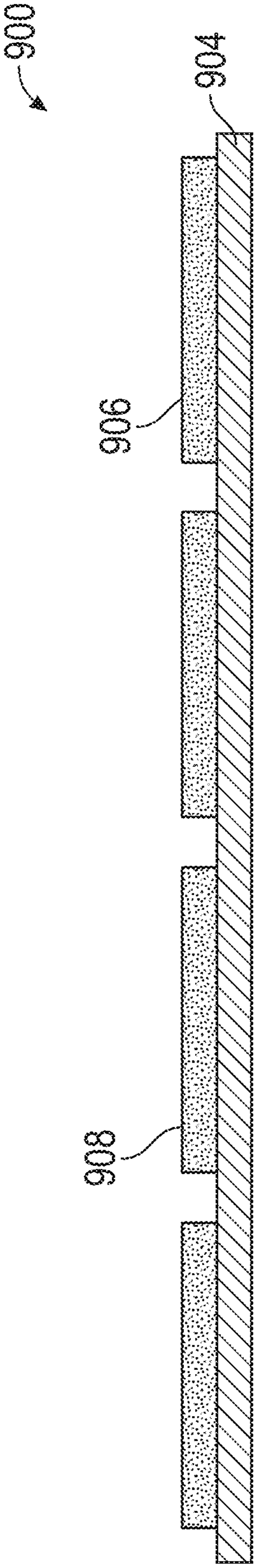
FIG. 9A is a side view of yet another modular build substrate configured in accordance with embodiments of the present technology.
Figure 9B:
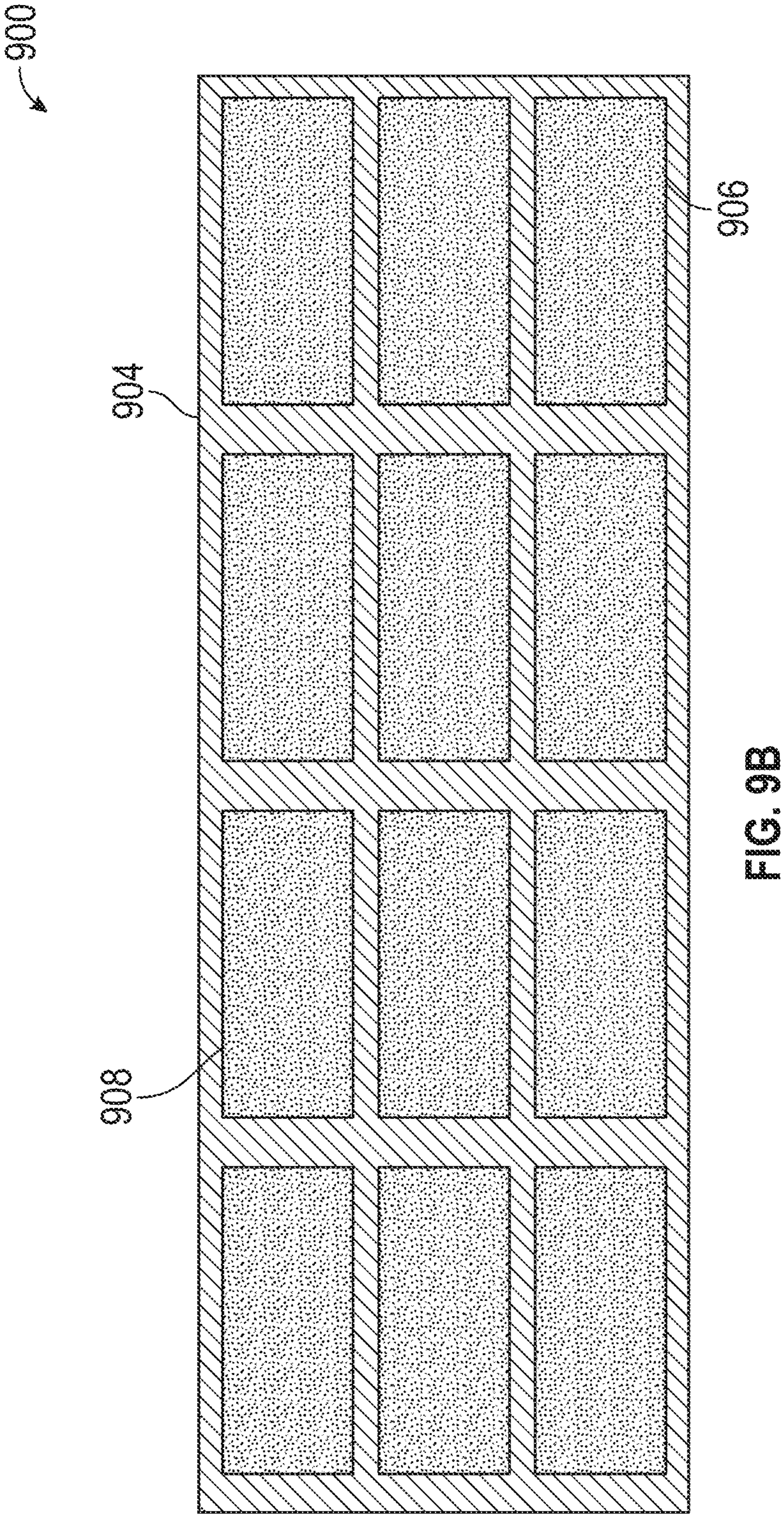
FIG. 9B is a top view of the modular build substrate of FIG. 9A.

FIGS. 9A and 9B are side and top views of yet another modular build substrate 900 configured in accordance with embodiments of the present technology. The modular build substrate 900 includes a carrier 904 and a plurality of build platforms 906 releasably coupled to the carrier 904. In the illustrated embodiment, the build platforms 906 each have a rectangular shape and are arranged in a grid configuration (e.g., a 2D array including a plurality of rows and a plurality of columns) on the carrier 904. The build platforms 906 can be spaced apart from each other, such that there are gaps between adjacent build platforms 906 through which the carrier 904 is exposed. Accordingly, the build plane 908 of the modular build substrate 900 can be segmented into a plurality of discrete regions, each corresponding to a respective build platform 906.

Figure 10A:
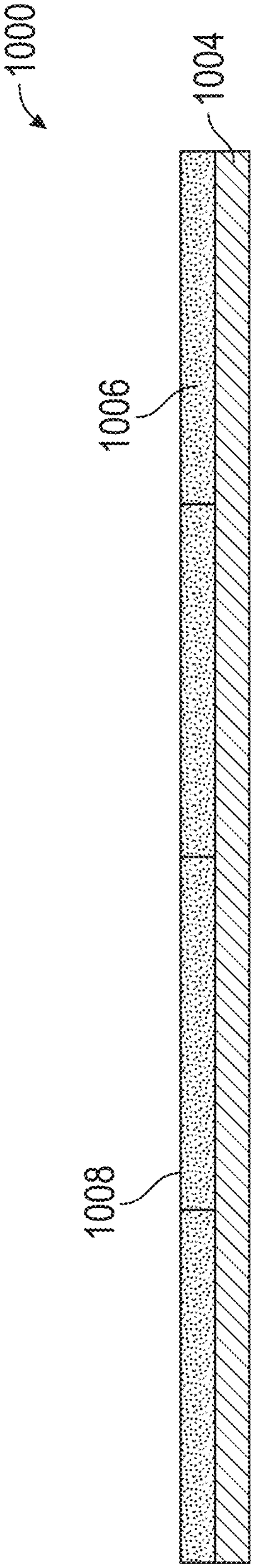
FIG. 10A is a side view of another modular build substrate configured in accordance with embodiments of the present technology.
Figure 10B:
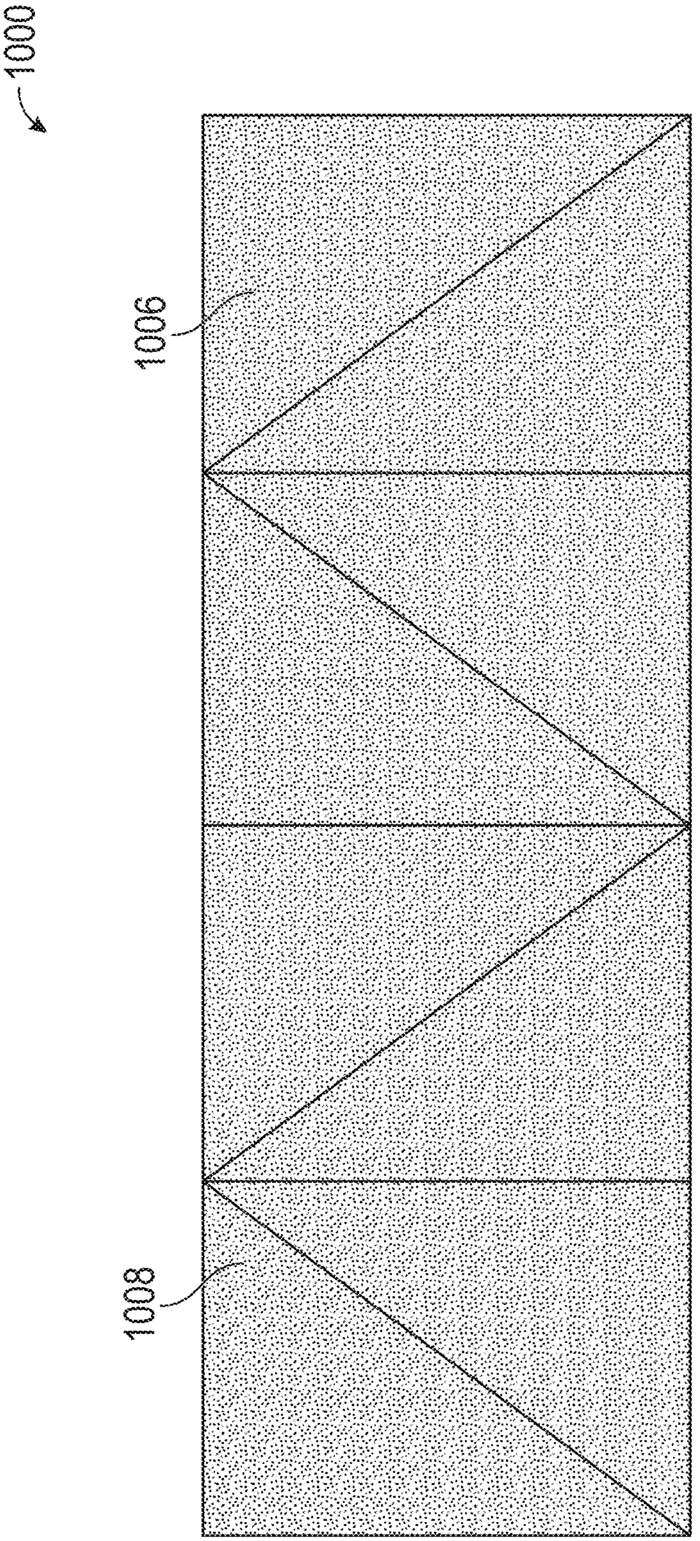
FIG. 10B is a top view of the modular build substrate of FIG. 10A.

FIGS. 10A and 10B are side and top views of another modular build substrate 1000 configured in accordance with embodiments of the present technology. The modular build substrate 1000 includes a carrier 1004 and a plurality of build platforms 1006 releasably coupled to the carrier 1004. In the illustrated embodiment, the build platforms 1006 each have a triangular shape and are arranged in a line configuration (e.g., a linear array such as a row) on the carrier 1004. The build platforms 1006 can be seamlessly and/or tightly packed next to each other so there is little or no gap between adjacent build platforms 1006 (e.g., the distance between adjacent build platforms 1006 is no more than 200 μm, 100 μm, 50 μm, 25 μm, or 10 μm). Accordingly, the build platforms 1006 can collectively define a single continuous build plane 708 for fabricating one or more objects.

FIGS. 11A-11G illustrate a build platform 1106 including recesses 1110 configured in accordance with embodiments of the present technology. The build platform 1106 can be a modular build platform that is part of a modular build substrate, as described herein. For example, the build platform 1106 can be releasably coupled to a carrier during an additive manufacturing process, and can be separated from the carrier during post-processing.

Figures 11A, 11B, 11C, 11D, 11E, 11F, 11G, 11H:
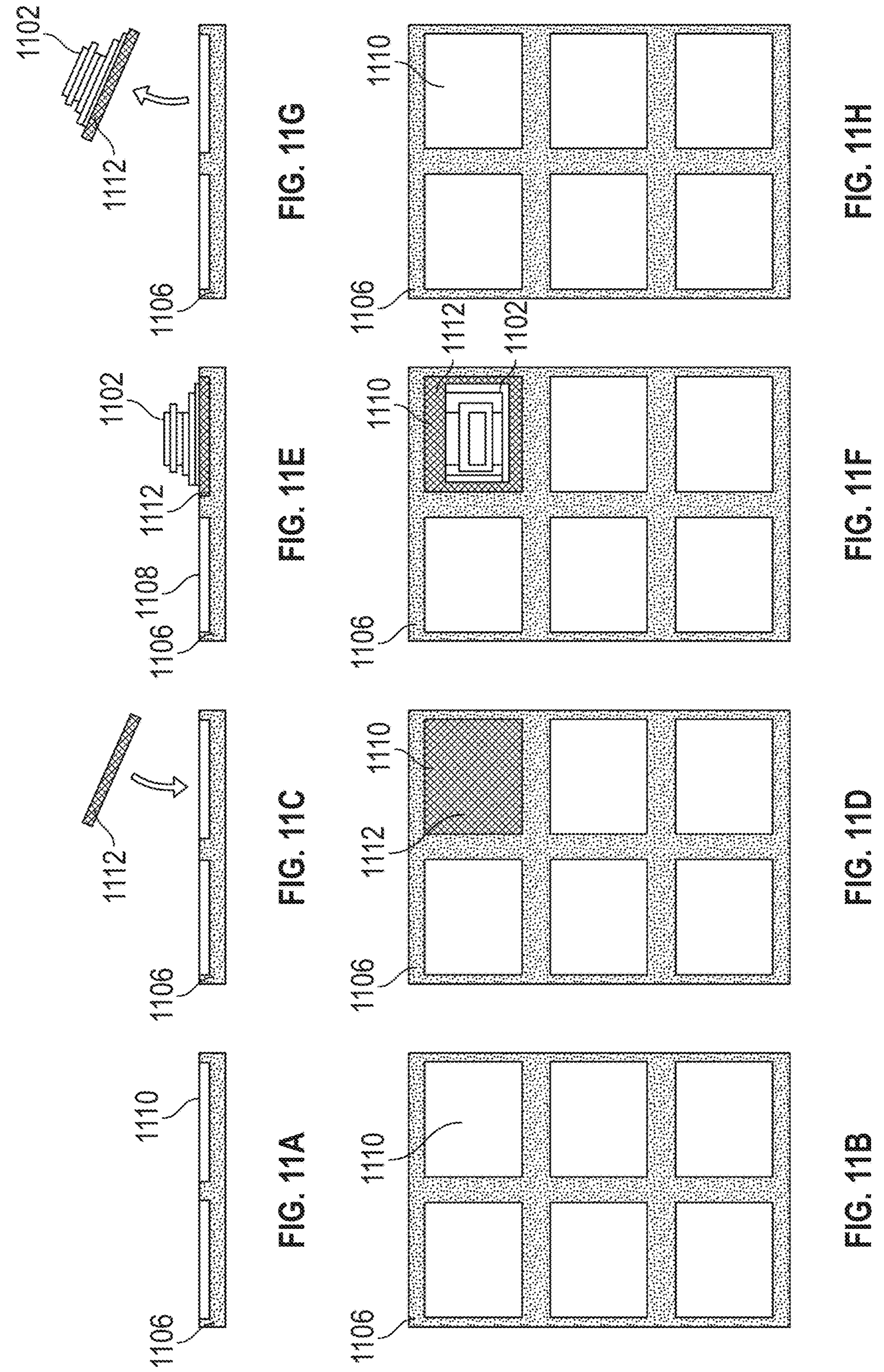
FIGS. 11A and 11B are side and top views, respectively, of a build platform including empty recesses in accordance with embodiments of the present technology.
FIGS. 11C and 11D are side and top views, respectively, showing placement of a prefabricated element into the recess of the build platform, in accordance with embodiments of the present technology.
FIGS. 11E and 11F are side and top views, respectively, showing a 3D object printed onto the prefabricated element in the build platform, in accordance with embodiments of the present technology.
FIGS. 11G and 11H are side and top views, respectively, showing removal of the final structure from the build platform, in accordance with embodiments of the present technology.

Referring first to FIGS. 11A (side view) and 11B (top view) together, the build platform 1106 includes a plurality of recesses 1110 formed therein. As best seen in FIG. 11A, the recesses 1110 can be indentations, cavities, cutouts, etc., that are formed in the upper surface of the build platform 1106. The recesses 1110 can extend partially or entirely through the thickness of the build platform 1106 toward the lower surface of the build platform 1106. Although the illustrated embodiment includes six recesses 1110, in other embodiments, the build platform 1106 can include a different number of recesses 1110, such as one, two, three, four, five, 10, 20, or more recesses 1110. Moreover, although the recesses 1110 are depicted as being arranged in a grid configuration, the recesses 1110 can alternatively be arranged in other configurations, such as in a line, cluster, or any other regular or irregular pattern. Some or all of the recesses 1110 can have the same geometry (e.g., the same size and/or shape), or some or all of the recesses 1110 can have different geometries (e.g., different sizes and/or shapes).

Referring next to FIGS. 11C (side view) and 11D (top view) together, the recesses 1110 of the build platform 1106 are each configured to receive a respective prefabricated element 1112. The shape of the prefabricated element 1112 can be identical or similar to the shape of the corresponding recess 1110 such that the prefabricated element 1112 is received within the recess 1110 in a form-fitting manner. In the illustrated embodiment, for example, the prefabricated element 1112 and recess 1110 each have a square shape. In other embodiments, however, the prefabricated element 1112 and recess 1110 can have any other suitable shape, such as rectangular, circular, oval, triangular, polygonal, non-polygonal, etc.

The prefabricated element 1112 can be releasably coupled to the build platform 1106. For example, the releasable coupling can include a mechanical connection, such as via one or more fasteners (e.g., screws, bolts) and/or a mechanical fit (e.g., interference fit, snap fit). Alternatively or in combination, the releasable coupling can involve a chemical connection (e.g., gluing, crosslinking, curing) and/or physical attachment mechanisms (e.g., vacuum, capillary forces, magnetic forces). Accordingly, the build platform 1106 can act as an adapter structure or adapter plate for the prefabricated elements 1112.

Referring next to FIGS. 11E (side view) and 11F (top view) together, each prefabricated element 1112 can be arranged so that its upper surface is flush with the build plane 1108 of the build platform 1106. Accordingly, an additively manufactured object 1102 can be built on top of the prefabricated element 1112. In some embodiments, at least a portion of the object 1102 (e.g., the initial layer of the object 1102 deposited onto the prefabricated element 1112) adheres to the prefabricated element 1112 so that the prefabricated element 1112 is integrated into and becomes part of the object 1102. The prefabricated element 1112 can be made out of a different material than the object 1102, such that the final product is a multi-material 3D structure including both the object 1102 and the prefabricated element 1112. Alternatively, the prefabricated element 1112 can be made out of the same material as the object 1102.

This approach can be used to incorporate various types of prefabricated elements 1112 into an object 1102. For instance, in embodiments where the object 1102 is a dental appliance, the prefabricated element 1112 can be a functional component to be integrated into the dental appliance, such as an electronics module, battery, sensor, wire, bracket, elastic, block, etc. In some embodiments, the object 1102 is a first portion of the dental appliance that is made out of a first material, and the prefabricated element 1112 is a second portion of the dental appliance that is made out of a second, different material.

Referring next to FIGS. 11G (side view) and 11H (top view), once the additive manufacturing process is complete, the object 1102 can be removed from the build platform 1106 together with the prefabricated element 1112, leaving the recesses 1110 empty. The build platform 1106 can then be reused for subsequent additive manufacturing operations.

Although FIGS. 11A-11H illustrate a build platform 1106 with recesses 1110 for receiving prefabricated elements 1112, in other embodiments, the recesses 1110 can be omitted, such that the prefabricated elements 1112 are placed directly on the upper surface of the build platform 1106.

Figure 12:
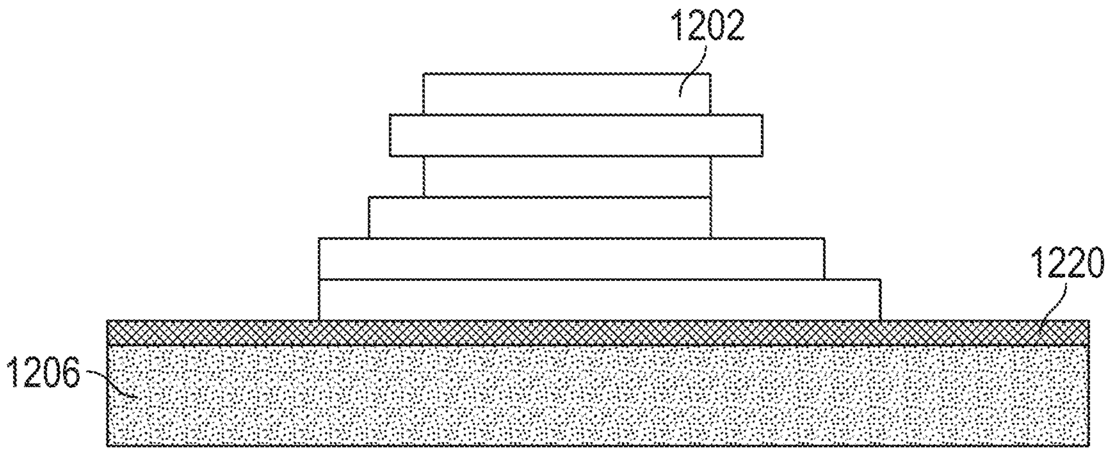
FIG. 12 is a side view of a build platform including an interface layer, in accordance with embodiments of the present technology.

FIG. 12 is a side view of a build platform 1206 including an interface layer 1220, in accordance with embodiments of the present technology. The interface layer 1220 can be a film, membrane, sheet, barrier, etc., that is positioned on an upper surface of the build platform 1206 to facilitate separation of an additively manufactured object 1202 from the build platform 1206 (e.g., after post-processing of the object 1202 is complete).

The interface layer 1220 can be made of a material that differs from the material used to fabricate the object 1202. For instance, the material of the interface layer 1220 can differ from the material of the object 1202 with respect to at least one physical and/or chemical property, such as melting point, boiling point, solubility, etc. In some embodiments, the interface layer 1220 is made partially or entirely from a material that is polymerizable and, in its polymerized and/or pre-polymerized state, can be dissolved or swollen in a solvent. Such a material can include or consist of at least one polymerizable group, such as an acrylate, methacrylate, acrylamide, vinyl ether, vinyl ester, maleimide, cyclic ether, isocyanate, amine, or other polymerizable unsaturated or saturated group. The material can optionally further comprise at least one hydrophilic or oleophilic group. The polymerized and/or pre-polymerized material may be dissolvable or swellable in a solvent, such as water, alcohol, oil, or other organic solvents. Such materials can include, for example, hydroxyl, carbonyl, or carboxyl groups, and/or derivatives with other electronegative heteroatoms, amines, ionic liquids, and/or salts. For example, the material can be or include hydroxyethylacrylate (HEA), hydroxyethylmethacrylate (HEMA), 2-(2-ethoxyethoxy)ethyl acrylate (EOEOEA), acryloyl morpholine (ACMO), polyethylene glycol derivates, polyethers, hydroxy ethylene, and/or lauryl acrylates.

The interface layer 1220 can be applied to the build platform 1206 before the object 1202 is fabricated on the build platform 1206. For instance, the interface layer 1220 can be applied via spray coating, dip coating, spin coating, adhesives, chemical deposition techniques, and/or other suitable coating techniques. The object 1202 can then be fabricated on the interface layer 1220 via an additive manufacturing process. The material of the object 1202 can exhibit sufficient adhesion to the interface layer 1220 so the object 1202 can be stably supported on the build platform 1206 during additive manufacturing.

After the additive manufacturing process, the interface layer 1220 can be removed from the build platform 1206 via a post-processing operation to destabilize, eliminate, or otherwise remove the interface layer 1220, thereby causing the object 1202 to be detached from the build platform 1206. For example, the interface layer 1220 can be removed by subjecting the interface layer 1220 to a physical and/or chemical process that causes the interface layer 1220 to disintegrate or otherwise lose its stability, such as dissolving in a solvent, etching, melting, etc. Alternatively or in combination, the interface layer 1220 can be removed by peeling, scraping, or otherwise physically separating the interface layer 1220 from the build platform 1206.

In some embodiments, the object 1202 is removed from the build platform 1206 together with the interface layer 1220, and is subsequently separated from the interface layer 1220 in a separate process step via physical and/or chemical processes. Alternatively, the removal of the interface layer 1220 from the build platform 1206 can simultaneously cause separation of the object 1202 from the interface layer 1220, e.g., if the interface layer 1220 is dissolved, melted, etched, etc.

Figure 13A:
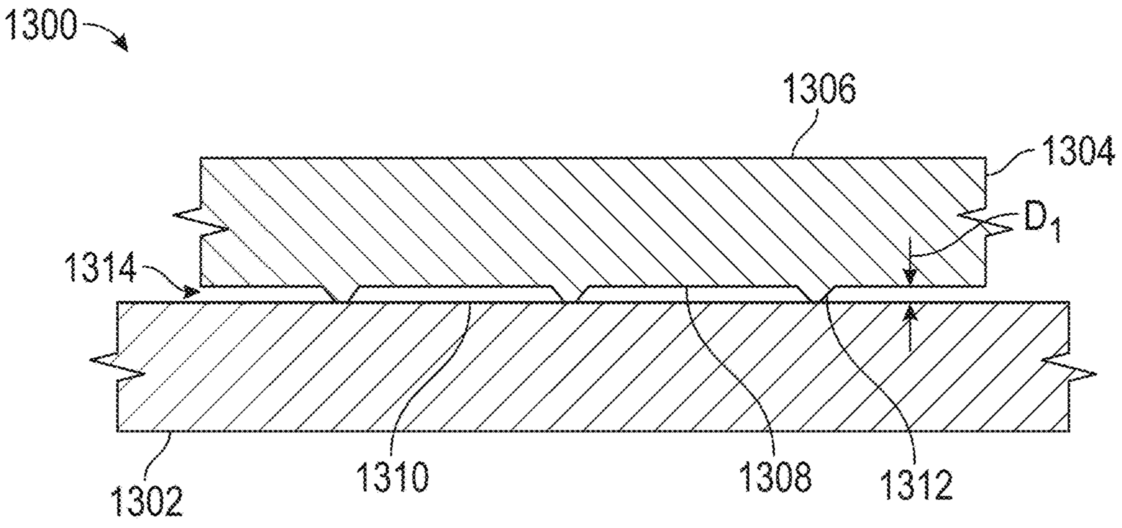
FIG. 13A is a side cross-sectional view of a portion of a modular build substrate including a carrier and a build platform, in accordance with embodiments of the present technology.
Figure 13B:
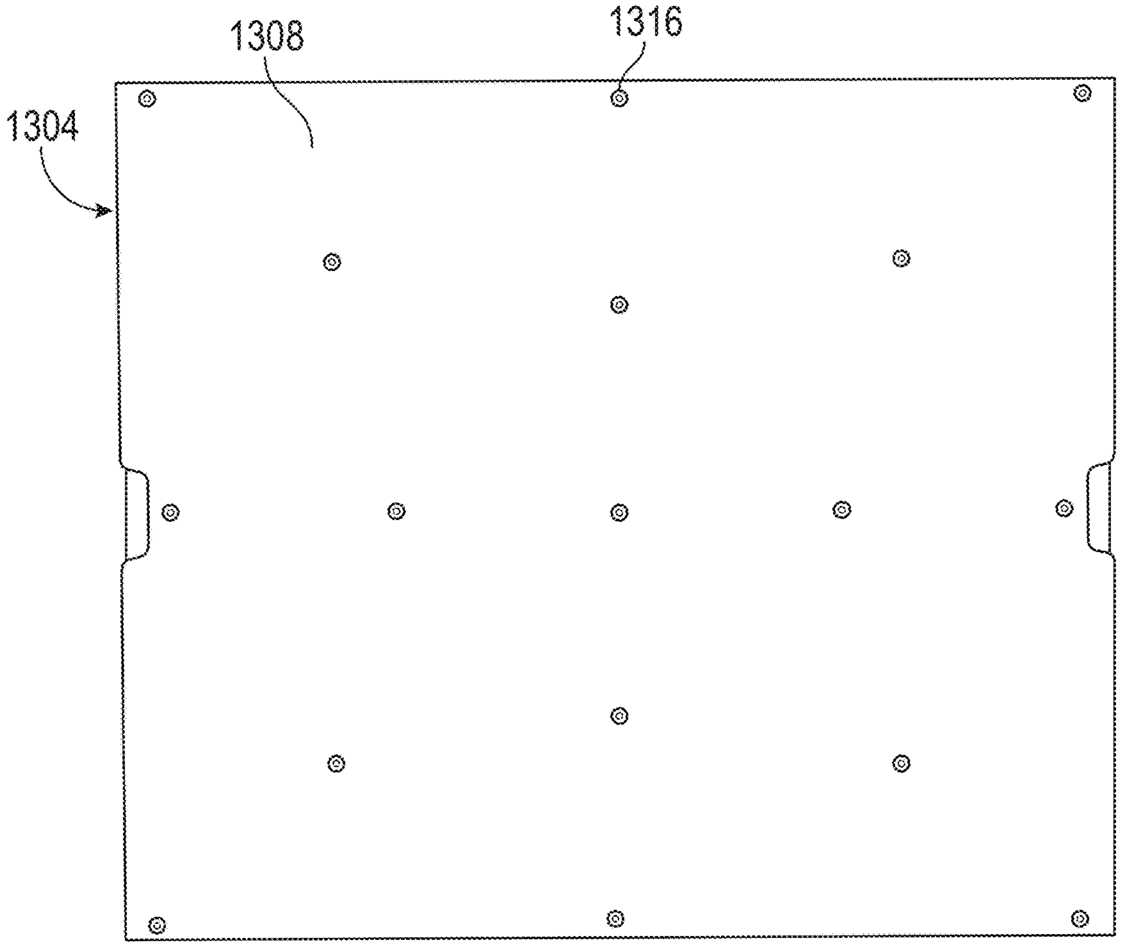
FIG. 13B is a bottom view of a build platform including a plurality of pins, in accordance with embodiments of the present technology.
Figure 13C:
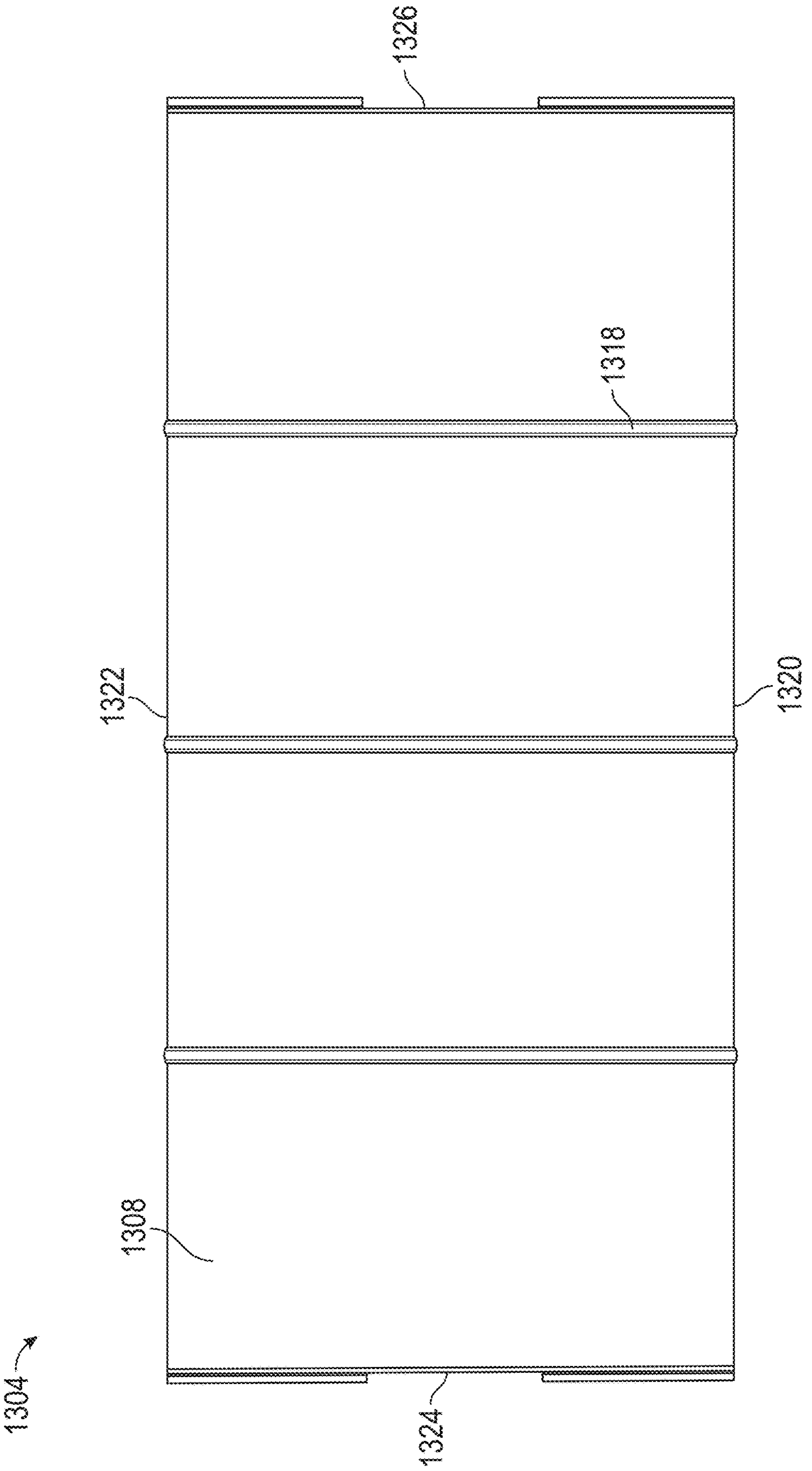
FIG. 13C is a bottom view of a build platform including a plurality of ribs, in accordance with embodiments of the present technology.

FIGS. 13A-13C illustrate modular build substrates with features to accommodate excess material, in accordance with embodiments of the present technology. Any of the embodiments described in connection with FIGS. 13A-13C can be combined with each other and/or with any of the embodiments described in connection with FIGS. 4-12.

FIG. 13A is a side cross-sectional view of a portion of a modular build substrate 1300 including a carrier 1302 and a build platform 1304, in accordance with embodiments of the present technology. The carrier 1302 and build platform 1304 can be generally similar to the other embodiments described herein (e.g., in connection with FIGS. 4-12). For instance, the carrier 1302 can be a tray, plate, film, sheet, or other generally planar substrate suitable for coupling to and supporting the build platform 1304 during the additive manufacturing process. The build platform 1304 can be a tray, plate, film, sheet, or other generally planar substrate suitable for coupling to and supporting at least one additively manufactured object thereon.

In the illustrated embodiment, the build platform 1304 includes an upper surface 1306 configured to support at least one additively manufactured object, and a lower surface 1308 opposite the upper surface 1306. The build platform 1304 can be positioned on an upper surface 1310 of the carrier 1302 such that the lower surface 1308 of the build platform 1304 faces the upper surface 1310 of the carrier 1302. One or more protrusions 1312 can be formed in the lower surface 1308 of the build platform 1304 to create a gap 1314 between the lower surface 1308 of the build platform 1304 and the upper surface 1310 of the carrier 1302. The gap 1314 can allow material from the additive manufacturing process (e.g., excess curable material and/or debris) to accumulate between the build platform 1304 and the carrier 1302 without disrupting the vertical alignment between the build platform 1304 and neighboring build platforms on the carrier 1302. This configuration can be advantageous, for example, in embodiments where the additive manufacturing process uses a liquid curable material (e.g., a resin) that may seep into spaces between the build platform 1304 and the carrier 1302.

The gap 1314 can be sufficiently large to accommodate and trap material therein, and can also be sufficiently small to allow efficient heat transfer between the carrier 1302 and the build platform 1304 (e.g., in embodiments where the carrier 1302 includes or is thermally coupled to a heating device for heating the build platform 1304). In some embodiments, the size of the gap 1314 (denoted by distance $D_1$ in FIG. 13A, which may correspond to the height of the protrusions 1312), is within a range from 0.1 mm to 3 mm, 0.1 mm to 1 mm, 0.1 mm to 0.5 mm, 0.25 mm to 0.75 mm, 0.5 mm to 1 mm, or 1 mm to 3 mm.

The protrusions 1312 can be shaped in a variety of ways to provide sufficient clearance between the build platform 1304 and the carrier 1302. In some embodiments, the protrusions 1312 are shaped as struts, ribs, rods, pins, posts, cylinders, cones, polyhedrons, balls, bumps, etc. The protrusions 1312 can have a uniform diameter and/or width, or may have a variable diameter and/or width. The protrusions 1312 can all have the same shape and/or size, or some or all of the protrusions 1312 can have different shapes and/or sizes (e.g., depending on the geometry of the build platform 1304, carrier 1302, and/or the desired size of the gap 1314). In some embodiments, some or all of the protrusions 1312 are discrete structures that are spaced apart from each other. In other embodiments, some or all of the protrusions 1312 may be interconnected with each other. For example, the protrusions 1312 can include a plurality of elongate members (e.g., ribs) that are interconnected to form an 'H'-shape, 'I'-shape, 'L'-shape, 'T'-shape, 'X'-shape, 'Z'-shape, a grid or lattice, etc.

The build platform 1304 can have any suitable number of protrusions 1312 extending therefrom, such as one, two, three, four, five, ten, 20, 50, or more protrusions 1312. In some embodiments, the build platform 1304 includes a single protrusion 1312, e.g., a protrusion 1312 coupled to a central portion of the lower surface 1308 of the build platform 1304. Alternatively, the build platform 1304 can include a plurality of protrusions 1312, which can have any of a variety of distributions on the build platform 1304, such as in a grid, lattice, or other shape (e.g., honeycomb, circular, oval, square, rectangular, triangular) or in a random distribution. In some embodiments, the protrusions 1312 are located at or near the corners of the build platform 1304. For example, in embodiments where the build platform 1304 has four corners, a protrusion 1312 can be located at or near each corner. In such cases, the protrusions 1312 can have a consistent spacing (e.g., equidistant) from one or more edges of the build platform 1304. For instance, the protrusions 1312 can have a separation distance of no more than 1 mm, 5 mm, 1 cm, 2 cm, 3 cm, etc. from the one or more edges of the build platform 1304.

In some embodiments, the protrusions 1312 are integrally formed with the build platform 1304 and made from the same material as the build platform 1304. For instance, the build platform 1304 and protrusions 1312 can be made partially or entirely out of a relative high modulus and/or stiff material (e.g., steel, aluminum, or another metal). Alternatively, the protrusions 1312 can be made from a different material than the build platform 1304. For example, the protrusions 1312 can be made partially or entirely out of a relatively low modulus and/or deformable material (e.g., silicone, rubber, or another polymer), while the build platform 1304 can be made partially or entirely out of a relatively high modulus and/or stiff material (e.g., steel, aluminum, or another metal).

While the protrusions 1312 have been discussed herein with reference to the build platform 1304, in some embodiments, the protrusions 1312 can additionally or alternatively be formed in the carrier 1302. For example, the protrusions 1312 can extend from the upper surface 1310 of the carrier 1302 and contact the lower surface 1308 of the build platform 1304, creating the gap 1314. The protrusions 1312 of the carrier 1302 can be generally similar to the protrusions 1312 of the build platform 1304. In some embodiments, a first plurality of protrusions 1312 can be formed in the carrier 1302 and a second plurality of protrusions 1312 can be formed in the build platform 1304, where both the first plurality of protrusions 1312 and the second plurality of protrusions 1312 create the gap 1314.

An example of the protrusions 1312 will now be discussed with reference to FIG. 13B. FIG. 13B is a bottom view of the build platform 1304 with a plurality of pins 1316, in accordance with embodiments of the present technology. The pins 1316 can be used as the protrusions 1312 to form the gap 1314 between the build platform 1304 and the carrier 1302, as discussed above. The pins 1316 can be discrete structures that are spaced apart from each other. The pins 1316 can be arranged on the lower surface 1308 of the build platform 1304 in many different ways, such as in a grid, lattice, or other suitable distribution. In the illustrated embodiment, for example, the pins 1316 are arranged such that there are four pins 1316 near each corner of the build platform 1304, a pin 1316 at the center of the build platform 1304, a pin 1316 near the center of each of the four quadrants of the build platform 1304, and additional pins 1316 formed along the vertical and horizontal axes of the build platform 1304. In other embodiments, the pins 1316 may instead be distributed randomly along the bottom surface 1308.

As another example, FIG. 13C is a bottom view of the build platform 1304 with a plurality of ribs 1318, in accordance with embodiments of the present technology. The ribs 1318 can be used as the protrusions 1312 to form the gap 1314 between the build platform 1304 and the carrier 1302, as discussed above. The ribs 1318 can be elongate members that extend along the lower surface 1308 of the build platform 1304. In the illustrated embodiment, the build platform 1304 includes three parallel ribs 1318 extending from a first edge 1320 of the build platform 1304 to a second, opposite edge 1322 of the build platform 1304. The ribs 1318 can be spaced apart from each other by a uniform distance, e.g., a distance of at least 1 cm, 5 cm, 10 cm, 20 cm, etc. In other embodiments, however, the number and arrangement of the ribs 1318 can modified, e.g., the build platform 1304 can include a different number of ribs 1318 (e.g., one, two, four, five, or more ribs 1318), some or all of the ribs 1318 may not be parallel to each other, the spacing between the ribs 1318 may be variable, the build platform 1304 can alternatively or additionally include ribs 1318 that extend from a third edge 1324 (left edge) to a fourth edge 1326 (right edge) of the build platform 1304, etc.

The geometry (e.g., length and/or width) of the ribs 1318 can be varied as desired. In the illustrated embodiment, the length of each rib 1318 is equal to the length of the build platform 1304 from the first edge 1320 to the second edge 1322. However, in other embodiments, the length of the ribs 1318 may be less than the length of the build platform 1304 from the first edge 1320 to the second edge 1322, e.g., no more than 20%, 30%, 40%, 50%, 60%, 70%, 80%, 90%, etc., of the length of the build platform 1304 between the first edge 1320 and the second edge 1322. In some embodiments, each rib 1318 has a width within a range from 0.1 mm to 10 mm, or from 1 mm to 5 mm.

In some embodiments, the ribs 1318 mechanically reinforce the build platform 1304 to increase its overall stiffness. For example, the ribs 1318 can be made of one or more materials that are stiffer than the material of the build platform 1304. In other embodiments, the ribs 1318 can be made of the same material as the build platform 1304 and can increase the stiffness of the build platform 1304 by increasing the thickness of the build platform 1304 at selected locations. In some embodiments, the arrangement of the ribs 1318 can also increase the stiffness of the build platform 1304, such as by having multiple intersecting ribs 1318.

In some embodiments, the present technology provides attachment mechanisms for releasably coupling modular build platforms to a carrier. The attachment mechanisms can be configured to couple the build platforms to the carrier to form a flat build plane, e.g., a build plane having a vertical deviation no more than 500 μm, 400 μm, 300 μm, 200 μm, 100 μm, or 50 μm, and/or a vertical deviation within a range from a range from 50 μm to 500 μm, or 500 μm to 1 mm. Moreover, the attachment mechanisms can secure the build platforms to the carrier to prevent the build platforms from moving relative to the carrier during additive manufacturing, e.g., due to forces applied to the build platforms by the printer assembly. The attachment mechanisms described herein can use many different types of couplings, such as mechanical couplings, magnetic couplings, vacuum couplings, or suitable combinations thereof.

In some embodiments, the attachment mechanism includes at least one mechanical coupling device, such as a block, wedge, clamp, clip, latch, spring, ratchet, cam lock, etc. For example, a mechanical coupling device can include at least one spring component (e.g., a spring clip) that uses a spring force to secure the build platform to the carrier (e.g., the spring force may bias the spring component into engagement with the build platform). As another example, a mechanical coupling device can include at least one movable component that is movable between an open configuration (e.g., in which the component is disengaged from the build platform and the build platform is removable from the carrier) and a closed configuration (e.g., in which the component engages the build platform to secure the build platform to the carrier). The movable component can be a rotatable component (e.g., a hinged clamp), a translatable component (e.g., a sliding latch) or a combination thereof. In a further example, a mechanical coupling device can include a fixed, non-movable component that secures the build platform to the carrier by obstructing movement of the build platform relative to the carrier.

In some embodiments, the attachment mechanism includes at least one magnetic coupling device. The magnetic coupling device can include, for example, a first magnet located on or within the build platform, and a second magnet located on or within the carrier. The attractive force between the first magnet and the second magnet can secure the build platform to the carrier. Alternatively or in combination, the carrier can be formed partially or entirely out of a magnetic material (e.g., a ferromagnetic material), and the carrier can be configured to engage one or more magnets located on or within the build platform. Alternatively or in combination, the build platform can be formed partially or entirely out of a magnetic material (e.g., a ferromagnetic material), and the build platform can be configured to engage one or more magnets located on or within the carrier. The magnetic coupling devices disclosed herein can include permanent magnets and/or electrically actuated magnets (e.g., electromagnets).

An attachment mechanism of the present technology can include one or more flexible coupling devices, one or more rigid coupling devices, or a combination thereof. A flexible coupling device can allow for limited movement of the coupled portion of the build platform relative to the carrier. For instance, a flexible coupling device can include a flexible material that is deformable and/or deflectable when engaged with the build platform, such as a spring material. Examples of spring materials include metals (e.g., spring steel), polymers, and composites. Alternatively or in combination, the flexible coupling device can have a flexible structure that permits some degree of deformation and/or deflection when engaged with the build platform, such as a telescopic mechanism, ratchet mechanism, compliant mechanism, etc. A rigid coupling device can prevent movement of the coupled portion of the build platform relative to the carrier. A rigid coupling device can be made out of a rigid material that does not substantially deform or deflect when engaged with the build platform and/or can have a rigid structure that does not permit deformation or deflection when engaged with the build platform.

In some embodiments, the attachment mechanisms described herein include at least one flexible coupling device that is configured to allow for some degree of lateral movement of the build platform relative to the underlying carrier while inhibiting vertical movement of the build platform relative to the carrier, which may disrupt the flat build plane for printing. For instance, in embodiments where the build platforms are heated or cooled during additive manufacturing, thermal expansion/shrinkage effects may cause the build platform to expand/shrink relative to the carrier, particularly if the build platform is made of a material having a different coefficient of thermal expansion than the carrier. The use of a flexible coupling device at one or both ends of the build platform can accommodate small lateral dimensional changes of the build platform due to thermal effects, while preserving the flat build plane and keeping the build platform secured to the carrier. In contrast, rigid coupling devices at both ends of the build platform may result in buckling and/or bending of the build platform if the build platform expands relative to the carrier, or may result in decoupling of the build platform if the build platform shrinks relative to the carrier. In other embodiments, however, an attachment mechanism may include only rigid coupling devices, e.g., if no significant thermal expansion/shrinkage effects are expected to occur during the additive manufacturing process.

The attachment mechanisms described herein can include any suitable number of coupling devices for each build platform on the carrier, such as one, two, three, four, five, or more coupling devices per build platform. For example, in embodiments where the build platform has a quadrilateral shape (e.g., a square or rectangular shape), the build platform can be coupled to the carrier via one or more coupling devices located at one side, two sides, three sides, or all four sides of the build platform. In some embodiments, the opposite ends of the build platform are secured to the carrier by respective coupling devices, e.g., a first coupling device is located at and coupled to a first end of the build platform, and a second coupling device is located at and coupled to a second, opposite end of the build platform. The sides of the build platform extending between the first and second ends may also be coupled to respective coupling devices, or may not be coupled to any coupling devices (e.g., the sides may instead be held in place via contact with the sides of neighboring build platforms).

In embodiments where the attachment mechanism includes multiple coupling devices, some or all of the coupling devices may use the same type of coupling, or some or all of the coupling devices may use different types of couplings. For instance, the attachment mechanism can include a first coupling device that couples to a first portion (e.g., a first end) of a build platform, and a second coupling device that couples to a second portion (e.g., a second end) of a build platform. The first coupling device may use the same type of coupling as the second coupling device (e.g., both are mechanical coupling devices, both are magnetic coupling devices, both are flexible coupling devices), or the first coupling device may use a different type of coupling than the second coupling device (e.g., one is a mechanical coupling device and the other is a magnetic coupling device, one is a flexible coupling device and the other is a rigid coupling device).

The number, type, and location of the coupling devices of the attachment mechanism can be varied as desired, e.g., depending on the number of build platforms, geometry of the build platforms, arrangement of the build platforms on the carrier, material properties of the build platforms, material properties of the carrier, type of additive manufacturing process, directionality of the additive manufacturing process, type of precursor material used in the additive manufacturing process, and/or other relevant considerations. Moreover, although certain embodiments herein are illustrated and described in connection with attachment mechanisms that are located on the carrier, any of the attachment mechanisms can alternatively or additionally be located on the build platform.

FIGS. 14-29 illustrate representative examples of attachment mechanisms and coupling devices for coupling modular build platforms to a carrier, in accordance with embodiments of the present technology. Any of the embodiments described in connection with FIGS. 14-29 can be combined with each other and/or with any of the embodiments described in connection with FIGS. 4-13C.

Figure 14:
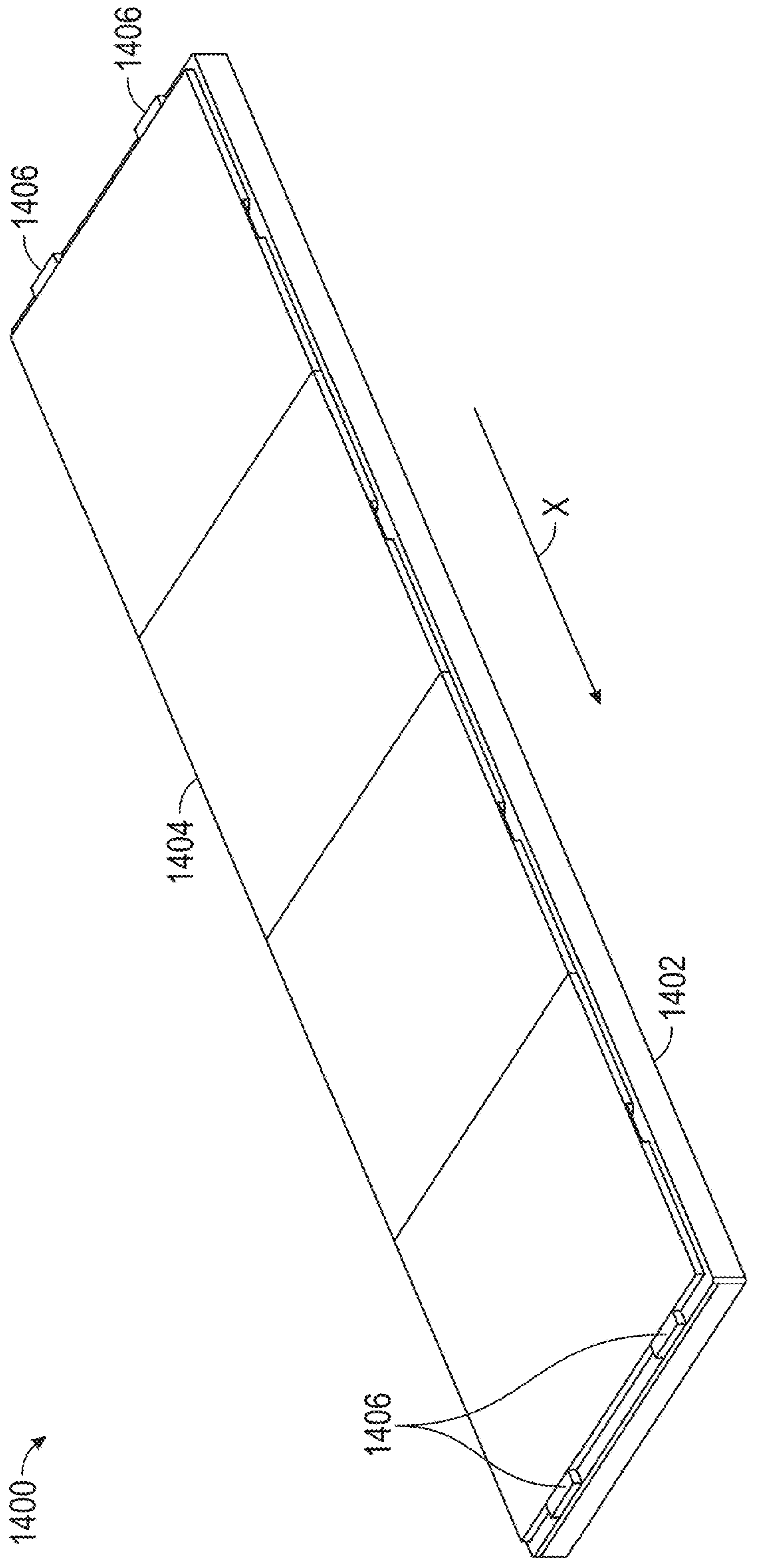
FIG. 14 is a perspective view of a modular build substrate including a plurality of blocks, in accordance with embodiments of the present technology.

FIG. 14 is a perspective view of a modular build substrate 1400 including a carrier 1402, a plurality of build platforms 1404, and an attachment mechanism including a plurality of blocks 1406, in accordance with embodiments of the present technology. The carrier 1402 and the build platforms 1404 can be generally similar to the other embodiments described herein (e.g., in connection with FIGS. 4-13C). For instance, the carrier 1402 can be a generally planar substrate for coupling to and supporting the build platforms 1404 during an additive manufacturing process, and the build platforms 1404 can each be a generally planar substrate suitable for coupling to and supporting at least one additively manufactured object thereon.

The blocks 1406 can serve as rigid coupling devices to inhibit movement of the build platforms 1404 relative to the carrier 1402, e.g., due to forces applied to the build platforms 1404 by a printer assembly (e.g., the printer assembly 302 of FIG. 3 or the printer assembly 506 of FIG. 5). In the illustrated embodiment, for example, the build platforms 1404 are arranged in a linear array along the direction of motion of the printer assembly (e.g., direction X), and the blocks 1406 are positioned on the carrier 1402 at opposite ends of the linear array. The blocks 1406 can contact and engage the edges of the build platforms 1404 at the ends of the linear array (e.g., the leftmost and rightmost build platforms 1404) to obstruct movement of the build platforms 1404 relative to the carrier 1402 along the X direction.

Although FIG. 14 illustrates four blocks 1406, with two blocks 1406 at each end of the linear array of build platforms 1404, in other embodiments, a different number of blocks 1406 can be used, such as one, three, four, five, or more blocks 1406 at each end of the array. Moreover, the location of the blocks 1406 can be varied as desired, e.g., the blocks 1406 may be located at one end of the array only, such as at the left end only or the right end only; and/or additional blocks 1406 may be positioned at other locations, such as the upper or lower edges of the build platforms 1404. Further, the blocks 1406 can have any suitable shape (e.g., pins, posts, wedges).

Figure 15:
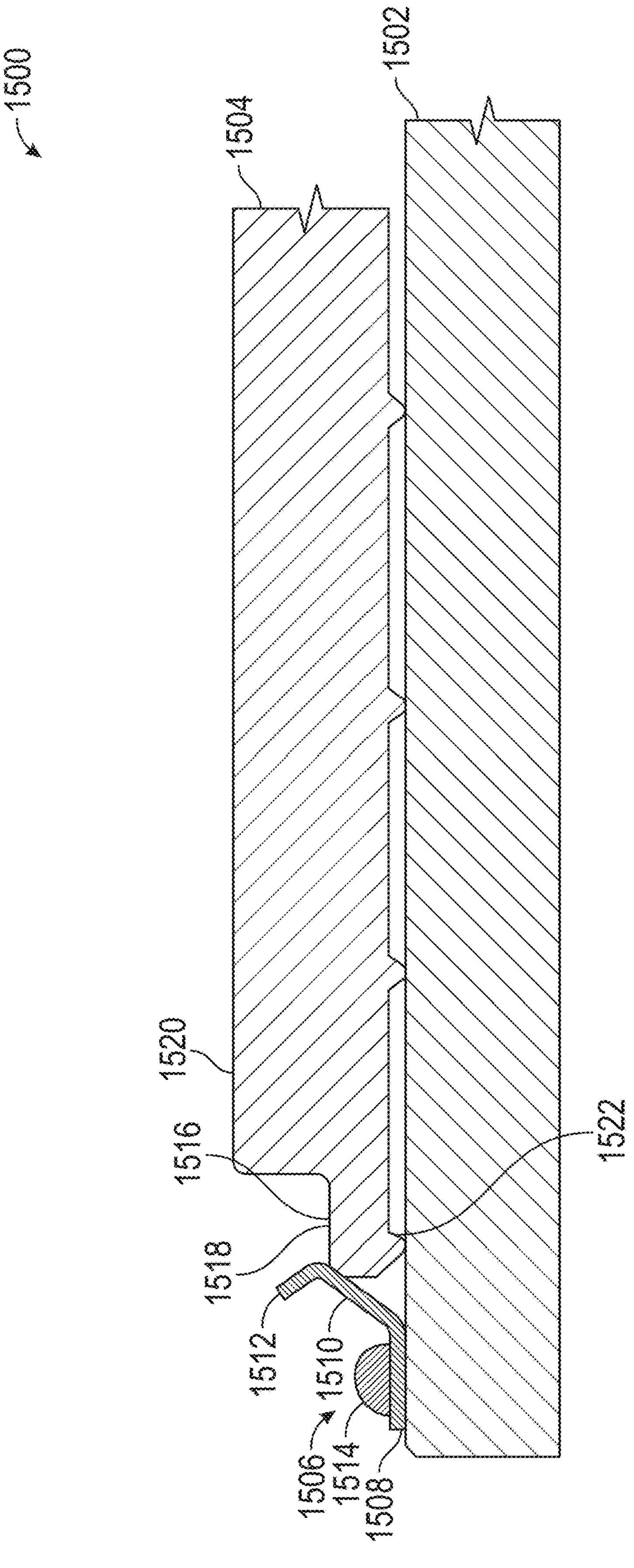
FIG. 15 is a side cross-sectional view of a modular build substrate including an external spring clip, in accordance with embodiments of the present technology.

FIG. 15 is a side cross-sectional view of a modular build substrate 1500 including a carrier 1502, a build platform 1504, and an attachment mechanism including an external spring clip 1506, in accordance with embodiments of the present technology. The carrier 1502 and the build platform 1504 can be generally similar to the other embodiments described herein (e.g., in connection with FIGS. 4-13C). For instance, the carrier 1502 can be a generally planar substrate for coupling to and supporting the build platform 1504 during an additive manufacturing process, and the build platform 1504 can be a generally planar substrate suitable for coupling to and supporting at least one additively manufactured object thereon.

The spring clip 1506 can serve as a flexible coupling device for securing the build platform 1504 to the carrier 1502. The spring clip 1506 can be made partially or entirely out of a spring material (e.g., a spring metal) that is deformable and/or deflectable when engaged by the build platform 1504, and the deformation and/or deflection of the spring material can produce a spring force that is directed against the build platform 1504 to retain the build platform 1504 on the carrier 1502. The flexibility of the spring clip 1506 can accommodate some lateral movement of the build platform 1504 relative to the carrier 1502, e.g., due to thermal expansion/shrinkage effects as discussed elsewhere herein. In some embodiments, the spring clip 1506 is configured to engage an external portion of the build platform 1504. The external portion can be any portion of the build platform 1504 that is accessible without having to decouple the build platform 1504 from the carrier 1502. For instance, as shown in FIG. 15, the external portion can be at or proximate to a lateral side of the build platform 1504.

The spring clip 1506 can include a base portion 1508, an engagement portion 1510, and an optional handle portion 1512. The base portion 1508 of the spring clip 1506 can be coupled to the carrier 1502, e.g., via a fastener, actuatable gripper, adhesive, bonding, welding, or a suitable combination thereof. For example, a fastener 1514 (e.g., a screw) can be positioned through the base portion 1508 to couple the spring clip 1506 to the carrier 1502 through the base portion 1508. In some embodiments, the fastener 1514 is inserted into a hole in the base portion 1508 and is received by a milled hole or recess in the carrier 1502.

The engagement portion 1510 can be connected to the base portion 1508 and can extend laterally inward toward the build platform 1504. The engagement portion 1510 is configured to contact the build platform 1504 to couple the build platform 1504 to the carrier 1502. In some embodiments, the engagement portion 1510 is configured to engage an external projection 1516 in the build platform 1504. The projection 1516 can be a lip, flange, shoulder, etc., that extends laterally from a side of the build platform 1504, e.g., by a distance of at least 1 mm, 2 mm, 5 mm, or 10 mm. In some embodiments, the projection 1516 includes an elongate body having a first upper surface 1518 that is lower than a second upper surface 1520 of the rest of the build platform 1504. For example, the first upper surface 1518 can be lower than the second upper surface 1520 by at least 5 mm, 1 cm, 2 cm, etc. This configuration can ensure that the spring clip 1506 remains below the second upper surface 1520 of the build platform 1504, e.g., to avoid interfering with the additive manufacturing process.

The engagement portion 1510 of the spring clip 1506 can contact the first upper surface 1518 of the projection 1516 to couple the projection 1516, and thus the build platform 1504, to the carrier 1502. For instance, when the build platform 1504 is placed on the carrier 1502, the projection 1516 can displace the engagement portion 1510 of the spring clip 1506 upward and away from the carrier 1502, and the engagement portion 1510 can resist the displacement to apply a spring force downward against the first upper surface 1518 of the projection 1516. In some embodiments, the projection 1516 may be shaped to complement the spring clip 1506. For example, although the first upper surface 1518 of the projection 1516 is depicted as being horizontal, the first upper surface 1518 can alternatively be angled, e.g., in embodiments where the engagement portion 1510 of the spring clip 1506 is also angled.

The handle portion 1512 can be connected to the engagement portion 1510 to allow the spring clip 1506 to be retracted, e.g., during placement of the build platform 1504 on the carrier 1502 and/or removal of the build platform 1504 from the carrier 1502. For example, a user can pull upward on the handle portion 1512 to temporarily retract the spring clip 1506 upward and away from the carrier 1502, thus allowing the build platform 1504 to be placed on the carrier 1502. The handle portion 1512 can then be released to allow the spring clip 1506 to move downward toward the build platform 1504 so that the engagement portion 1510 contacts and applies a downward force against the projection 1516. To remove the build platform 1504 from the carrier 1502, the handle portion 1512 can be lifted upward to separate the engagement portion 1510 from the projection 1516, thereby releasing the build platform 1504 from the spring clip 1506.

Although FIG. 15 illustrates a single spring clip 1506 that engages a single portion of the build platform 1504, in other embodiments, the modular build substrate 1500 can include a plurality of spring clips 1506 on the carrier 1502 to couple to different portions of the build platform 1504 (e.g., different sides of the build platform 1504). Moreover, the build platform 1504 can include any of the features described in connection with the other embodiments herein, such as a plurality of projections 1522 (e.g., pins, ribs) for creating a gap between the build platform 1504 and carrier 1502.

Figure 16A:
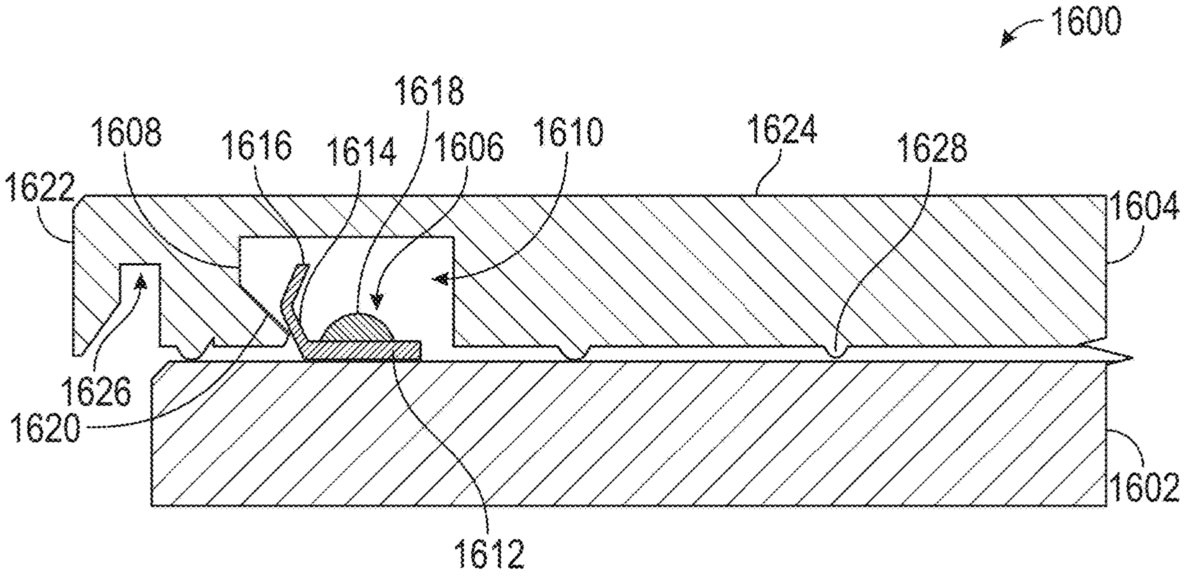
FIG. 16A is a side cross-sectional view of a modular build substrate including an internal spring clip, in accordance with embodiments of the present technology.
Figure 16B:
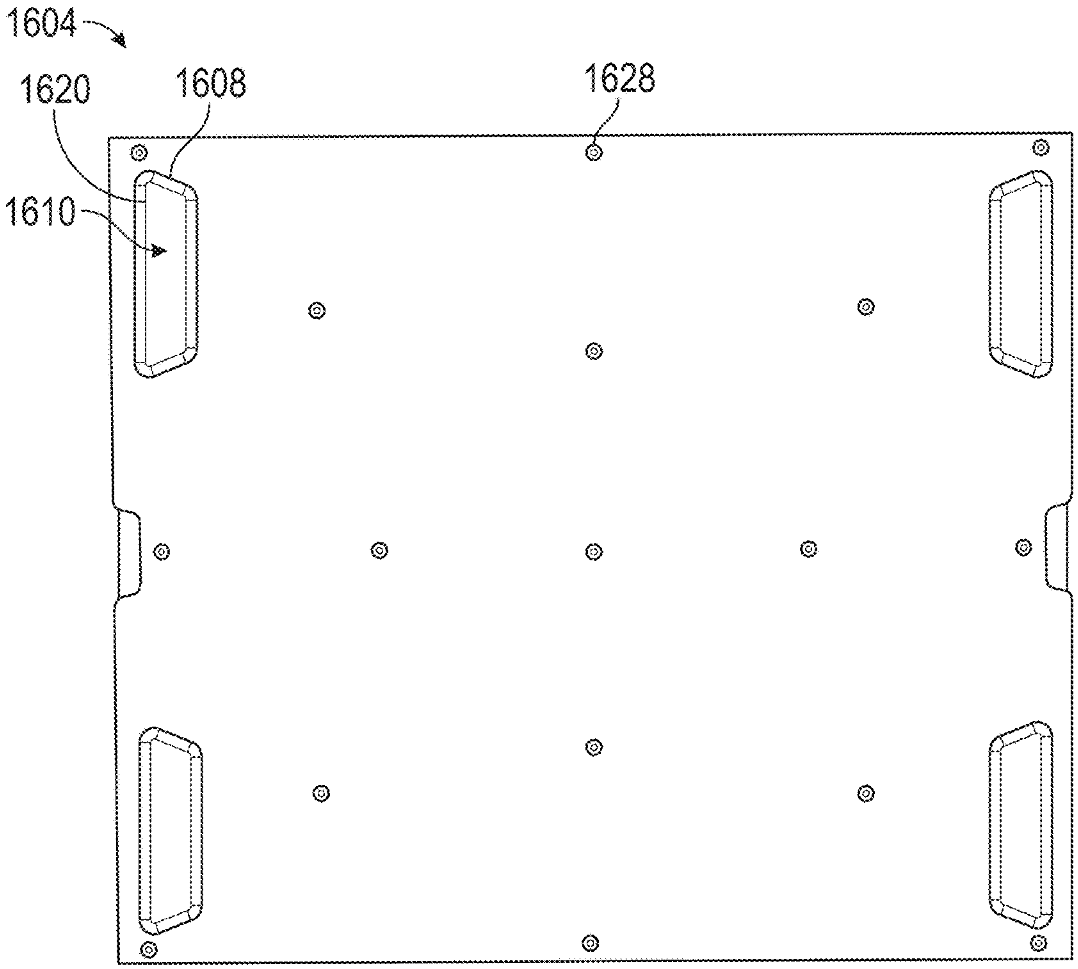
FIG. 16B is a bottom view of a build platform of the modular build substrate of FIG. 16A, in accordance with embodiments of the present technology.
Figure 16C:
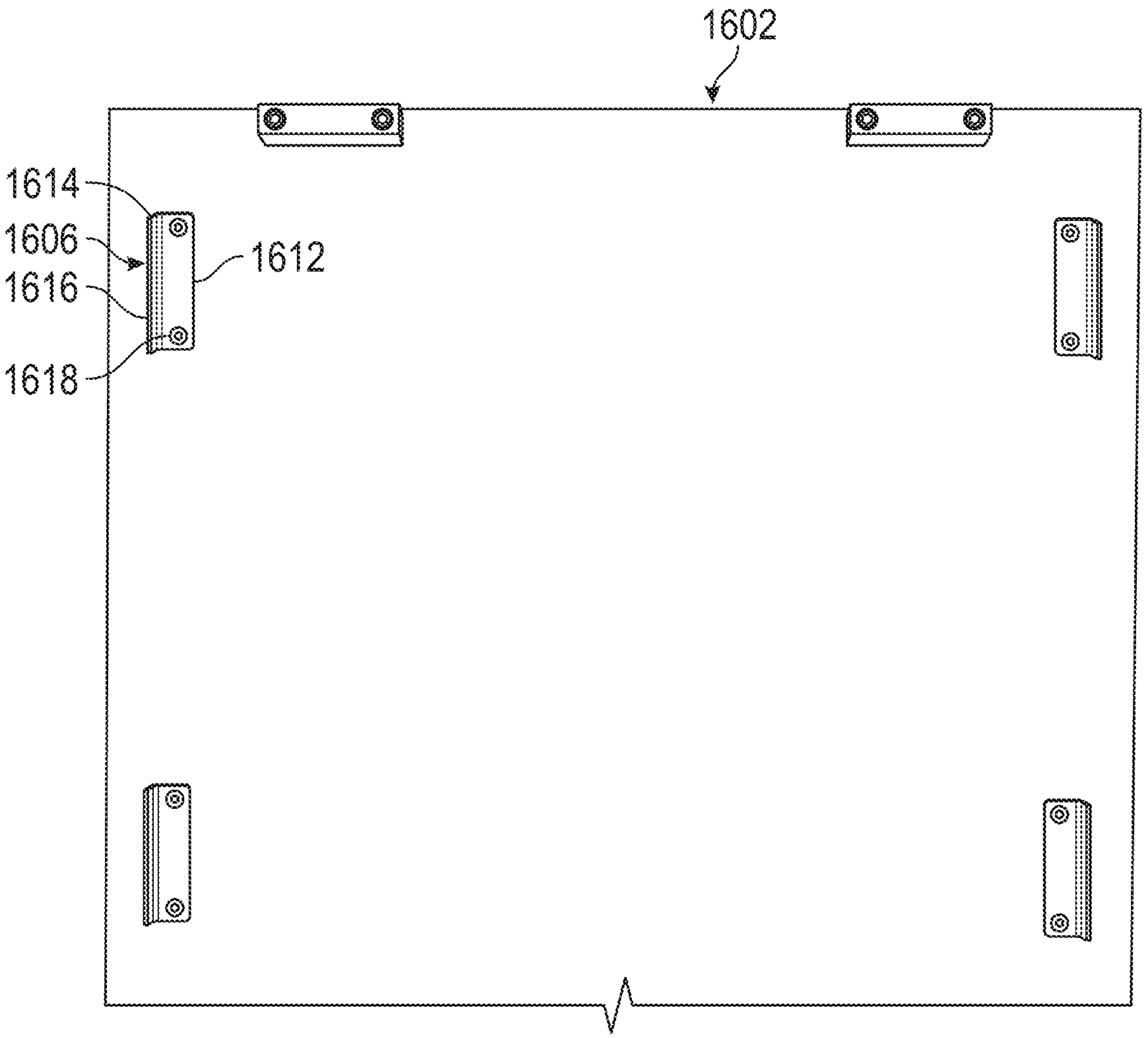
FIG. 16C is a top view of a carrier of the modular build substrate of FIG. 16A, in accordance with embodiments of the present technology.

FIGS. 16A-16C illustrate a modular build substrate 1600 including a carrier 1602, a build platform 1604, and an attachment mechanism including a plurality of internal spring clips 1606, in accordance with embodiments of the present technology. Specifically, FIG. 16A is a side cross-sectional view of the build platform 1604 coupled to the carrier 1602 via an individual spring clip 1606, FIG. 16B is a bottom view of the build platform 1604, and FIG. 16C is a top view of the carrier 1602 and a plurality of spring clips 1606. The carrier 1602 and the build platform 1604 can be generally similar to the other embodiments described herein (e.g., in connection with FIGS. 4-13C). For instance, the carrier 1602 can be a generally planar substrate for coupling to and supporting the build platform 1604 during an additive manufacturing process, and the build platform 1604 can be a generally planar substrate suitable for coupling to and supporting at least one additively manufactured object thereon.

Referring to FIGS. 16A and 16C together, the spring clips 1606 can serve as flexible coupling devices for securing the build platform 1604 to the carrier 1602. The spring clips 1606 can be generally similar to the spring clip 1506 of FIG. 15. For example, the spring clips 1606 can each be made partially or entirely out of a spring material that applies a spring force to the build platform 1604 to retain the build platform 1604 on the carrier 1602, and the flexibility of the spring material can permit some degree of lateral movement of the build platform 1604 relative to the carrier 1602.

In some embodiments, as best seen in FIG. 16A, the spring clips 1606 are each configured to engage an internal portion 1608 of the build platform 1604. The internal portion 1608 can be any portion of the build platform 1604 that is not accessible without first decoupling the build platform 1604 from the carrier 1602. For instance, the internal portion 1608 can be at or proximate to a lower surface of the build platform 1604. As depicted, the internal portion 1608 can define a recess 1610 in the lower surface that is configured to receive the spring clip 1606 therein when the build platform 1604 is placed on the carrier 1602. In some embodiments, the use of spring clips 1606 that engage the internal portions 1608 of the build platform 1604 allows for a greater build area (e.g., a larger unobstructed upper surface of the build platform 1604). Moreover, the spring clip 1606 may be protected from residual curable material (e.g., resin) during the additive manufacturing process.

Each spring clip 1606 can include a base portion 1612, an engagement portion 1614, and an optional handle portion 1616. The base portion 1612 of the spring clip 1606 can be coupled to the carrier 1602 (e.g., via a fastener, actuatable gripper, adhesive, bonding, welding, or a suitable combination thereof). For example, at least one fastener 1618 (e.g., a screw) can be inserted into at least one hole in the base portion 1612 and received by a milled hole and/or recess in the carrier 1602.

The engagement portion 1614 can be connected to the base portion 1612 and can be configured to couple to an internal projection 1620 in the build platform 1604. The projection 1620 can be a lip, flange, shoulder, etc., that extends into the recess 1610, e.g., by a distance of at least 1 mm, 2 mm, 5 mm, or 10 mm. The engagement portion 1614 of the spring clip 1606 can directly contact the projection 1620 to couple the projection 1620, and thus the build platform 1604, to the carrier 1602. For instance, when the build platform 1604 is placed on the carrier 1602, the projection 1620 can displace the engagement portion 1614 of the spring clip 1606 upward and away from the carrier 1602, and the engagement portion 1614 can resist the displacement to apply a spring force downward against the projection 1620 to constrain vertical and/or lateral movement of the build platform 1604 relative to the carrier 1602. Although the upper surface of the projection 1620 is depicted as being angled (e.g., to pull the build platform 1604 downward against the carrier 1602), in other embodiments, the upper surface of the projection 1620 can instead be horizontal.

Referring to FIGS. 16B and 16C together, the carrier 1602 can include a plurality of spring clips 1606 and the build platform 1604 can include a corresponding plurality of recesses 1610, such that each spring clip 1606 is received within a corresponding recess 1610. Although the illustrated embodiment shows four spring clips 1606 and four recesses 1610, with each spring clip 1606 and recess 1610 being located near a respective corner of the build platform 1604, in other embodiments, a different number of spring clips 1606 and recesses 1610 can be used (e.g., one, two, three, five, or more spring clips 1606 and recesses 1610), and/or the spring clips 1606 and recesses 1610 can be positioned at different locations relative to the build platform 1604.

Referring again to FIG. 16A, the build platform 1604 may optionally include an overhanging edge 1622. The overhanging edge 1622 can extend laterally past an edge of the carrier 1602 such that excess material (e.g., excess resin and/or debris) on the build platform 1604 can flow along and drip off the edge 1622 to a collection reservoir (not depicted), as opposed to accumulating on the carrier 1602 and/or between the carrier 1602 and the build platform 1604. The collection reservoir can be a groove, channel, gutter, etc., formed in or coupled to the carrier 1602, or can be separate from the carrier (e.g., a separate bucket, vat, drip tray). In some embodiments, the overhanging edge 1622 is perpendicular to the upper surface 1624 of the build platform 1604. In other embodiments, the overhanging edge 1622 is angled, e.g., having a drop-off of 0 to 10 degrees, 20 to 30 degrees, 30 to 40 degrees, 40 to 50 degrees, 50 to 60 degrees, 60 to 70 degrees, 70 to 80 degrees, 80 to 90 degrees, etc.

In some embodiments, the build platform 1604 includes a notch 1626 formed in the lower surface near the edge of the build platform 1604. The notch 1626 can optionally be configured to receive a portion of a removal tool that decouples the build platform 1604 from the carrier 1602. In such cases, the removal tool may be used to apply an upward force against the build platform 1604, and the upward force can disengage the projection 1620 from the spring clip 1606 to release the build platform 1604 from the carrier 1602.

Furthermore, the build platform 1604 can optionally include a plurality of protrusions 1628. The protrusions 1628 can be generally similar to the protrusions 1312 of FIG. 13 and be configured to provide a separation distance between the build platform 1604 and the carrier 1602. In some embodiments, the protrusions 1628 are pins arranged in a grid, e.g., as depicted in FIG. 16B.

Figure 17:
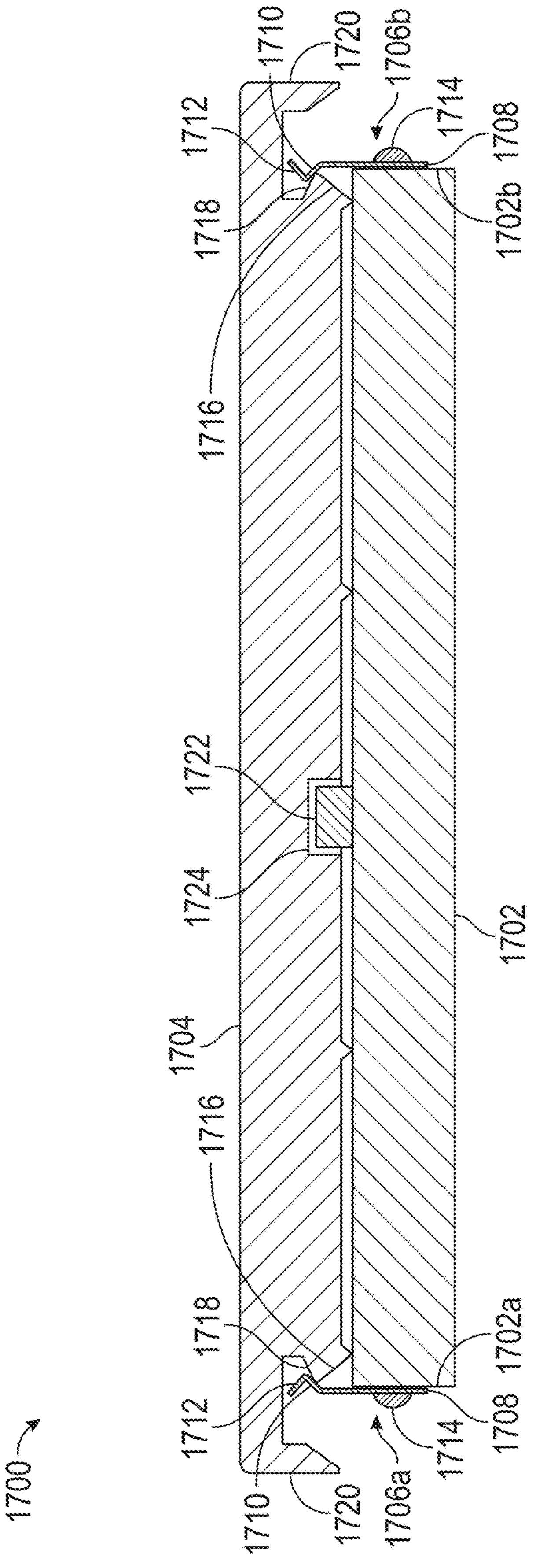
FIG. 17 is a side cross-sectional view of a modular build substrate including a plurality of spring clips, in accordance with embodiments of the present technology.

FIG. 17 is a side cross-sectional view of a modular build substrate 1700 including a carrier 1702, a build platform 1704, and an attachment mechanism including a plurality of spring clips 1706*a*, 1706, in accordance with embodiments of the present technology. The carrier 1702 and the build platform 1704 can be generally similar to the other embodiments described herein (e.g., in connection with FIGS. 4-13C). For instance, the carrier 1702 can be a generally planar substrate for coupling to and supporting the build platform 1704 during an additive manufacturing process, and the build platform 1704 can be a generally planar substrate suitable for coupling to and supporting at least one additively manufactured object thereon.

The plurality of spring clips 1706*a*, 1706*b* can include a first spring clip 1706*a* and a second spring clip 1706*b* (collectively, "spring clips 1706"). The spring clips 1706 can be generally similar to the spring clip 1506 of FIG. 15 and/or the spring clip 1606 of FIG. 16, except that the spring clips 1706 are oriented vertically rather than laterally. For example, the spring clips 1706 can each be made partially or entirely out of a spring material that applies a spring force to the build platform 1704 to retain the build platform 1704 on the carrier 1702, and that permits some degree of lateral movement of the build platform 1704 relative to the carrier 1702. In some embodiments, the spring clips 1706 each include a base portion 1708, an engagement portion 1710, and an optional handle portion 1712, which may be generally similar to the corresponding components of the embodiments of FIGS. 15 and 16.

The spring clips 1706 can each be affixed to a respective side of the carrier 1702. For example, as depicted, the first spring clip 1706*a* is attached to a first (e.g., left) side 1702*a* of the carrier 1702 and the second spring clip 1706*b* is attached to a second (e.g., right) side 1702*b* of the carrier 1702, e.g., via respective fasteners 1714. The spring clips 1706 can be oriented vertically such that the engagement portions 1710 and handle portions 1712 extend upward from the base portions 1708 and toward the build platform 1704. In some embodiments, at least one end of each of the spring clips 1706 surpasses the total height of the carrier 1702.

The spring clips 1706 can be configured to releasably couple the build platform 1704 to the carrier 1702. For instance, the first spring clip 1706*a* can be configured to couple to a first (e.g., left) side 1702*a* of the build platform 1704, and the second spring clip 1706*b* can be configured to couple to a second (e.g., right side) 1702*b* of the build platform 1704. In the illustrated embodiment, the spring clips 1706 are each configured to engage an external portion of the build platform 1704, such as external projections 1716 formed in the lateral surfaces of the build platform 1704. The projections 1716 can be lips, flanges, shoulders, etc., that extend laterally from sides of the build platform 1704, e.g., by a distance of at least 1 mm, 2 mm, 5 mm or 10 mm.

The projections 1716 can have respective upper surfaces 1718 configured to engage the engagement portions 1710 of the spring clips 1706. When the build platform 1704 is placed on the carrier 1702, the projections 1716 can displace the engagement portions 1710 of the spring clips 1706 upward and/or outward, and the engagement portions 1710 can resist the displacement to impart one or more spring forces onto the upper surfaces 1718 of the projections 1716 to constrain vertical and/or lateral movement of the build platform 1704 relative to the carrier 1702. The upper surfaces 1718 can have a geometry that is complementary to the engagement portions 1710 of the spring clips 1706. In some embodiments, the upper surfaces 1718 have a first angle that is complementary to a second angle of the engagement portions 1710. In other embodiments, however, the upper surfaces 1718 can instead be horizontal.

In some embodiments, the build platform 1704 further includes overhanging edges 1720 that, similar to the overhanging edges 1622 of FIG. 16, are configured to direct excess material into one or more collection reservoirs (not depicted). In some embodiments, the overhanging edges 1720 extend laterally beyond the spring clips 1706, e.g., by at least 2 mm, 5 mm, 1 cm, 2 cm, or 5 cm, to protect the spring clips 1706 from the excess material.

The modular build substrate 1700 can further include registration features to align the build platform 1704 to the carrier 1702 in a predetermined position and/or orientation. For instance, the carrier 1702 can include a first registration feature 1722, and the build platform 1704 can include a second registration feature 1724 that mates with the first registration feature 1722 to affix the position and/or orientation of the build platform 1704 relative to the carrier 1702. In the illustrated embodiment, the first registration feature 1722 is a protrusion in the carrier 1702 (e.g., a post, pin, bump), and the second registration feature 1724 is a recess in the build platform 1704 (e.g., a hole, channel, aperture) that receives the first registration feature 1722. In other embodiments, the first registration feature 1722 can be a recess in the build platform 1704 and the second registration feature 1724 can be a protrusion in the carrier 1702. Alternatively, or in combination, other types of components can be used for the first registration feature 1722 and the second registration features 1724, such as fasteners, magnets, hooks, teeth, snap-fit elements, and/or other components that mate or otherwise engage each other to align the carrier 1702 to the build platform 1704. Furthermore, although FIG. 17 illustrates a single registration feature 1722 in the carrier 1702 and a single registration feature 1724 in the build platform 1704, the carrier 1702 and build platform 1704 can alternatively include a plurality of registration features.

Figure 18:
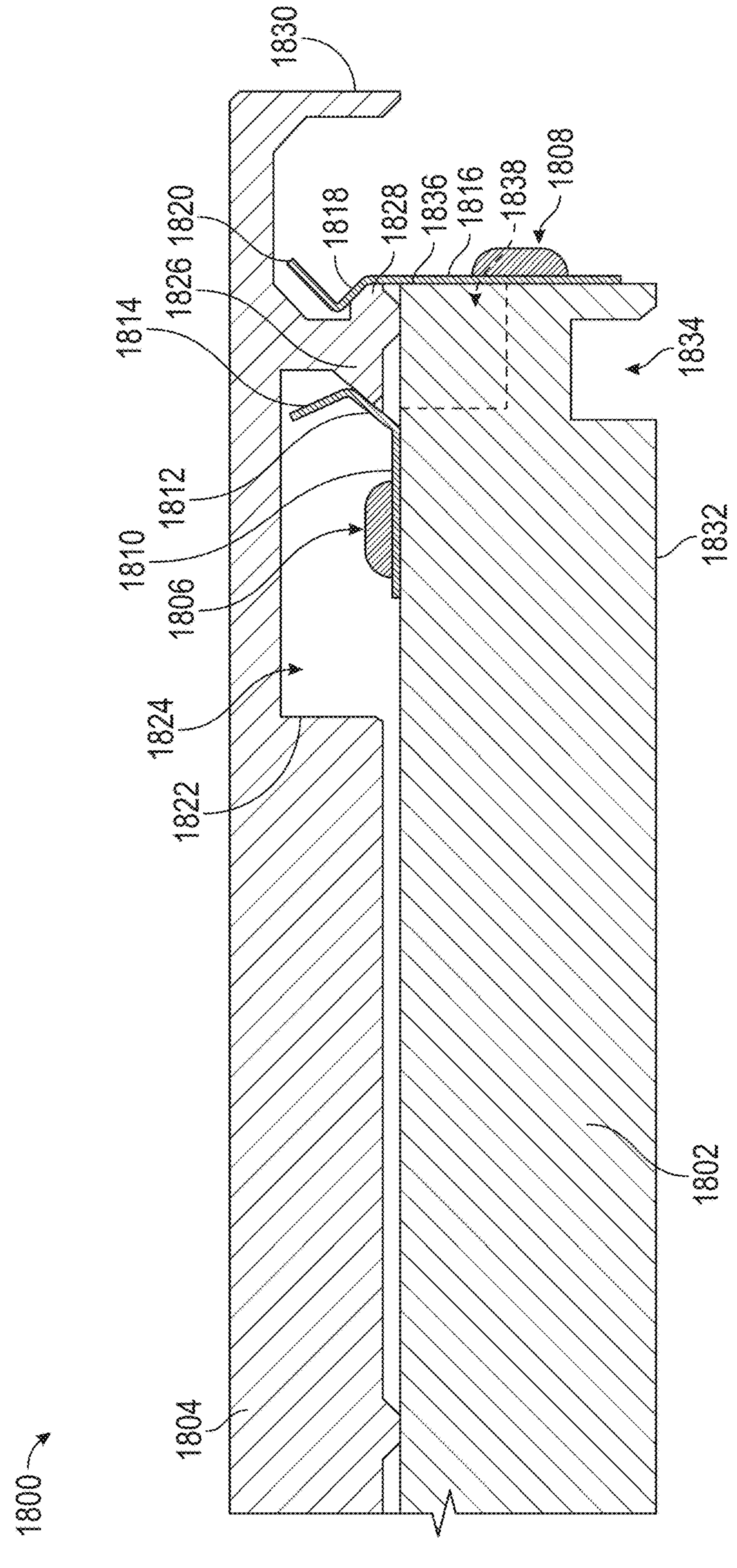
FIG. 18 is a side cross-sectional view of a modular build substrate including a plurality of spring clips, in accordance with embodiments of the present technology.

FIG. 18 is a side cross-sectional view of a modular build substrate 1800 including a carrier 1802, a build platform 1804, and an attachment mechanism including a plurality of spring clips 1806, 1808. The carrier 1802 and the build platform 1804 can be generally similar to the other embodiments described herein (e.g., in connection with FIGS. 4-13C). For instance, the carrier 1802 can be a generally planar substrate for coupling to and supporting the build platform 1804 during an additive manufacturing process, and the build platform 1804 can be a generally planar substrate suitable for coupling to and supporting at least one additively manufactured object thereon.

The attachment mechanism can include an internal spring clip 1806 configured to engage an internal portion of the build platform 1804, and an external spring clip 1808 configured to engage an external portion of the build platform 1804. The internal spring clip 1806 can be generally similar to the spring clip 1606 of FIG. 16, and the external spring clip 1808 can be generally similar to the spring clip 1706 of FIG. 17. For example, the spring clips 1806, 1808 can each be made partially or entirely out of a spring material that applies a spring force to the build platform 1804 to retain the build platform 1804 on the carrier 1802, and that permits some degree of lateral movement of the build platform 1804 relative to the carrier 1802. The internal spring clip 1806 can have a first base portion 1810, a first engagement portion 1812, and an optional first handle portion 1814; and the external spring clip 1808 can have a second base portion 1816, a second engagement portion 1818, and a second optional handle portion 1820.

In some embodiments, the internal spring clip 1806 and the external spring clip 1808 are used in tandem to secure the build platform 1804 to the carrier 1802. For instance, as shown in FIG. 18, the internal spring clip 1806 and the external spring clip 1808 can both be located at the same side of the build platform 1804, and thus can be used to collectively couple the side of the build platform 1804 to the carrier 1802. However, in other embodiments, the internal spring clip 1806 and the external spring clip 1808 may be used independently from one another, e.g., the attachment mechanism may include the internal spring clip 1806 only or the external spring clip 1808 only. Moreover, in other embodiments, the internal spring clip 1806 may be located at a different (e.g., opposite) side of the build platform 1804 than the external spring clip 1808.

In some embodiments, the build platform 1804 includes an internal portion 1822 defining a recess 1824 for receiving the internal spring clip 1806 therein when the build platform 1804 is placed on the carrier 1802. The internal portion 1822 and recess 1824 may be generally similar to the internal portion 1608 and recess 1610 of FIGS. 16A-16C. For example, the internal portion 1822 can further include an internal projection 1826, such that the first engagement portion 1812 of the internal spring clip 1806 is configured to directly contact and couple to the internal projection 1826. When the build platform 1804 is placed on the carrier 1802, the internal projection 1826 can displace the first engagement portion 1812 of the internal spring clip 1806 upward and away from the carrier 1802, and the first engagement portion 1812 can resist the displacement to apply a spring force downward against the internal projection 1826 to constrain vertical and/or lateral movement of the build platform 1604 relative to the carrier 1602. The internal projection 1826 can be generally similar to the projection 1620 of FIG. 16. In some embodiments, the internal projection 1826 is a lip, flange, shoulder, etc., that extends laterally into the recess 1824, e.g., by a distance of at least 1 mm, 2 mm, 5 mm, or 10 mm. The upper surface of the internal projection 1826 can have a first angle that is complementary to a second angle of the first engagement portion 1812 of the internal spring clip 1806. In other embodiments, the upper surface of the internal projection 1826 can instead be horizontal.

The external spring clip 1808 can be affixed to a side of the carrier 1802, e.g., via a fastener. The external spring clip 1808 can be oriented vertically such that the second engagement portion 1818 and second handle portion 1820 extend upward from the second base portion 1816 and toward the build platform 1804. The second engagement portion 1818 can be configured to engage an external projection 1828 formed in the lateral surface of the build platform 1804. When the build platform 1804 is placed on the carrier 1802, the external projection 1828 can displace the second engagement portion 1818 of the external spring clip 1808 upward and/or outward, and the second engagement portion 1818 can resist the displacement to impart one or more spring forces onto the upper surface of the external projection 1828 to constrain vertical and/or lateral movement of the build platform 1804 relative to the carrier 1802. The external projection 1828 can be generally similar to the projection 1716 of FIG. 17. For instance, the external projection 1828 can be a lip, flange, shoulder, etc., that extends laterally from the build platform 1804, e.g., by a distance of at least 1 mm, 2 mm, 5 mm or 10 mm. In some embodiments, the upper surface of the external projection 1828 includes a third angle that is complementary to a fourth angle of the second engagement portion 1818 of the external spring clip 1808. In other embodiments, however, the upper surface of the external projection 1828 can instead be horizontal.

In some embodiments, the build platform 1804 further includes an overhanging edge 1830. The overhanging edge 1830 can be generally similar to the overhanging edges 1720 of FIG. 17 and can be configured to direct excess material (e.g., resin) into a collection reservoir and/or away from the recess 1824. In some embodiments, the overhanging edge 1830 extends laterally beyond the external spring clip 1808, e.g., by at least 2 mm, 5 mm, 1 cm, 2 cm, or 5 cm, to protect the external spring clip 1808 from the excess material.

In some embodiments, the build platform 1804 is mounted onto the carrier 1802 using a placement tool. For example, the bottom surface 1832 of the carrier 1802 can include a first recess 1834 formed therein for receiving a portion of the placement tool. The placement tool can include one or more elongate members that exert forces on the carrier 1802 via the first recess 1834, which in turn cause the build platform 1804 to engage with the carrier 1802. Further details of an example placement process are described below in connection with FIGS. 19A and 19B.

In some embodiments, the build platform 1804 is removed from the carrier 1802 using a removal tool. For example, the lateral surface 1836 of the carrier 1802 can include a second recess 1838 formed therein for receiving a portion of the removal tool. The removal tool can include one or more elongate members that exert forces on the carrier 1802 via the second recess 1838, which in turn causes the build platform 1804 to disengage from the carrier 1802. Further details of an example removal process are described below in connection with FIGS. 20A and 20B.

In other embodiments, however, the build platform 1804 may be placed on the carrier 1802 and/or removed from the carrier 1802 without aid of any tools. In such embodiments, the first recess 1834 and/or the second recess 1838 are optional and may be omitted.

Figure 19A:
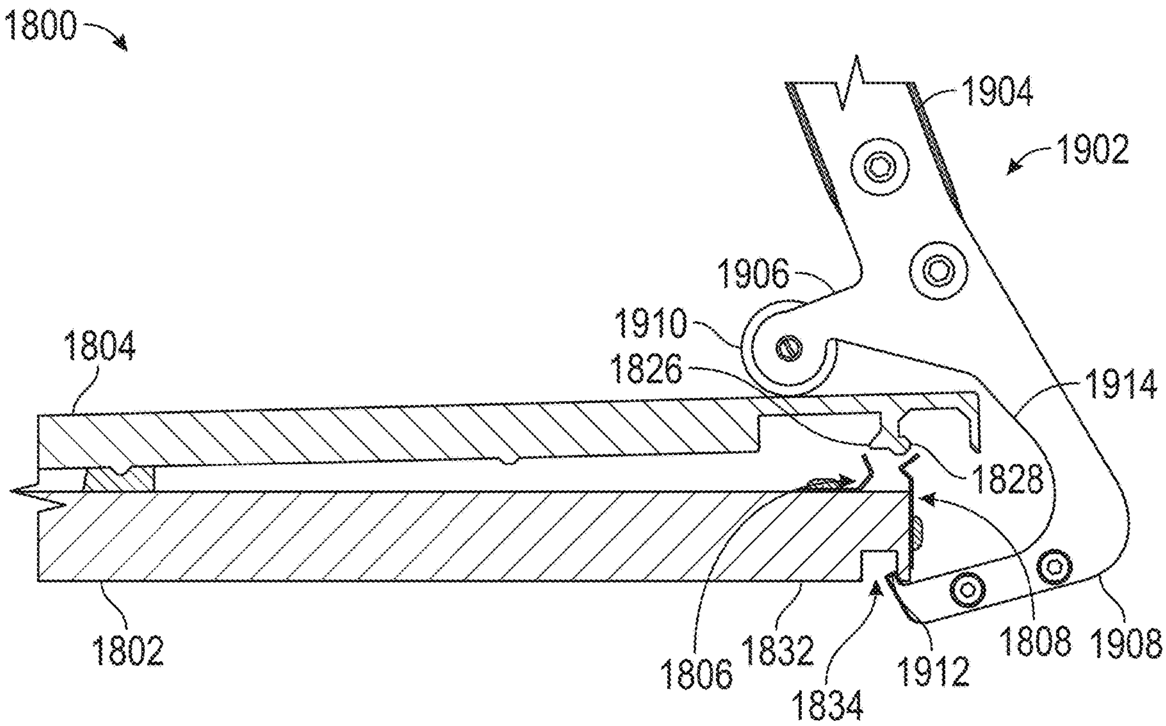
FIGS. 19A and 19B illustrate a process for coupling a build platform to a carrier using a placement tool, in accordance with embodiments of the present technology.
Figure 19B:
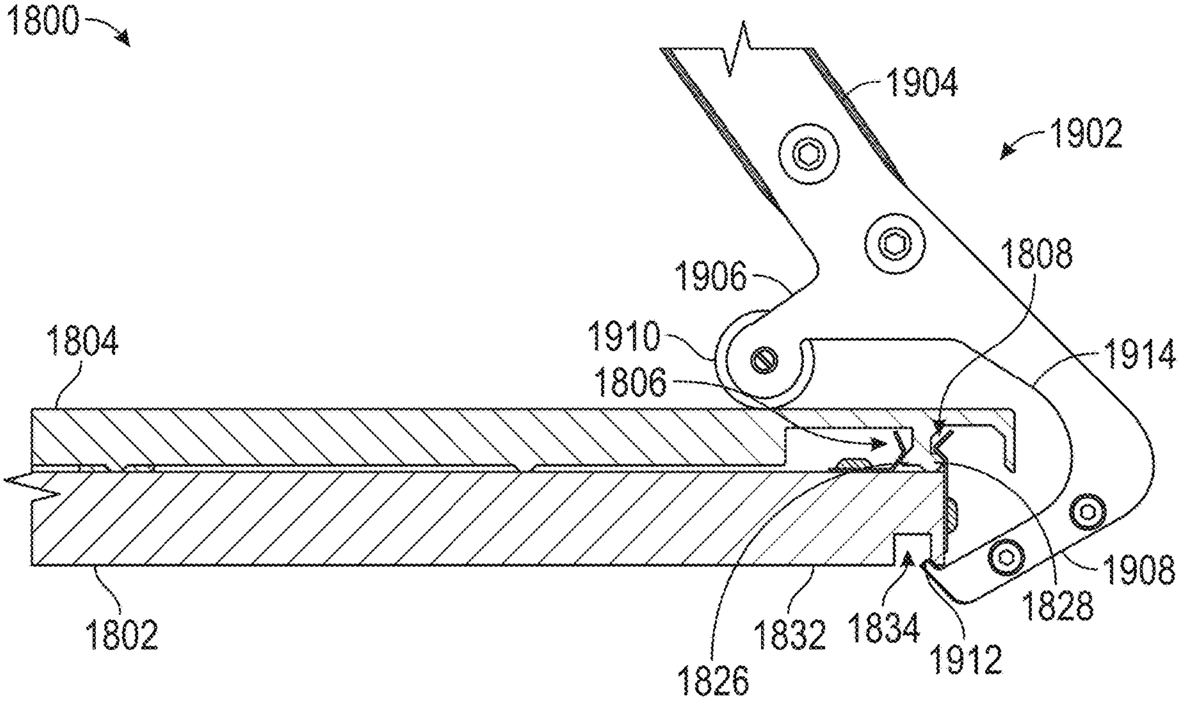

FIGS. 19A and 19B illustrate a process for coupling the build platform 1804 to the carrier 1802 using a placement tool 1902, in accordance with embodiments of the present technology. Specifically, FIG. 19A is a side cross-sectional view of the carrier 1802, build platform 1804, and placement tool 1902 in a first configuration before the build platform 1804 is coupled to the carrier 1802, and FIG. 19B is a side cross-sectional view of the carrier 1802, build platform 1804 and placement tool 1902 in a second configuration after the build platform 1804 is coupled to the carrier 1802.

Turning now to FIG. 19A, the placement tool 1902 can include an elongate body 1904 that acts as a lever for applying forces to the carrier 1802 and the build platform 1804 to couple these components to each other, e.g., by causing the spring clips 1806, 1808 on the carrier 1802 to engage the corresponding portions of the build platform 1804. The elongate body 1904 can have a suitable length and can provide a handle for a user to grasp and rotate the placement tool 1902 via the elongate body 1904. For example, the elongate body 1904 can have a length of at least 5 cm, 10 cm, 15 cm, 20 cm, etc. The elongate body 1904 can be made out of a relatively rigid and/or stiff material, such as a metal (e.g., steel, aluminum, brass, copper, titanium), a ceramic, a polymer (e.g., thermoformed or thermoset polymer), a composite, or suitable combinations thereof.

The elongate body 1904 can have a first arm 1906 configured to contact and apply force to the build platform 1804, and a second arm 1908 configured to contact and apply force to the carrier 1802. The first arm 1906 can include a roller 1910 (e.g., a wheel or rotating cylinder) that is configured to slide and/or roll along the upper surface of the build platform 1804 during the placement process to distribute forces along the build platform 1804. The second arm 1908 can include a tip 1912 that is configured to fit at least partially into the first recess 1834 of the carrier 1802 to create leverage for the roller 1910 to press the build platform 1804 downward against the carrier 1802. In some embodiments, the first arm 1906 and the second arm 1908 are connected by a bridge 1914. The curvature and the arc length of the bridge 1914 can be adjusted, e.g., based on the dimensions of the build platform 1804 and carrier 1802. For example, the bridge 1914 can be an extendable member configured to adapt to the height of the build platform 1804 and carrier 1802.

During the placement process, the build platform 1804 can be placed onto the carrier 1802, with the internal spring clip 1806 and external spring clip 1808 on the carrier 1802 initially disengaged from the internal projection 1826 and external projection 1828, respectively, of the build platform 1804. The tip 1912 of the second arm 1908 can then be inserted into the first recess 1834 of the carrier 1802, and the roller 1910 of the first arm 1906 can be placed against the upper surface of the build platform 1804. The user can then rotate the elongate body 1904, e.g., in a counterclockwise direction with the tip 1912 of the second arm 1908 serving as the center of rotation. The rotation of the elongate body 1904 can produce a downward force that is transmitted through the first arm 1906 and roller 1910 onto the build platform 1804. The roller 1910 can slide along the upper surface of the build platform 1804 as the elongate body 1904 rotates to propagate the applied forces from the edge of the build platform 1804 toward the center of the build platform 1804. The forces applied to the build platform 1804 can cause the internal projection 1826 and external projection 1828 to engage with the internal spring clip 1806 and external spring clip 1808, respectively, thus coupling the build platform 1804 to the carrier 1802, as depicted in FIG. 19B. The placement tool 1902 can then be removed.

Figure 20A:
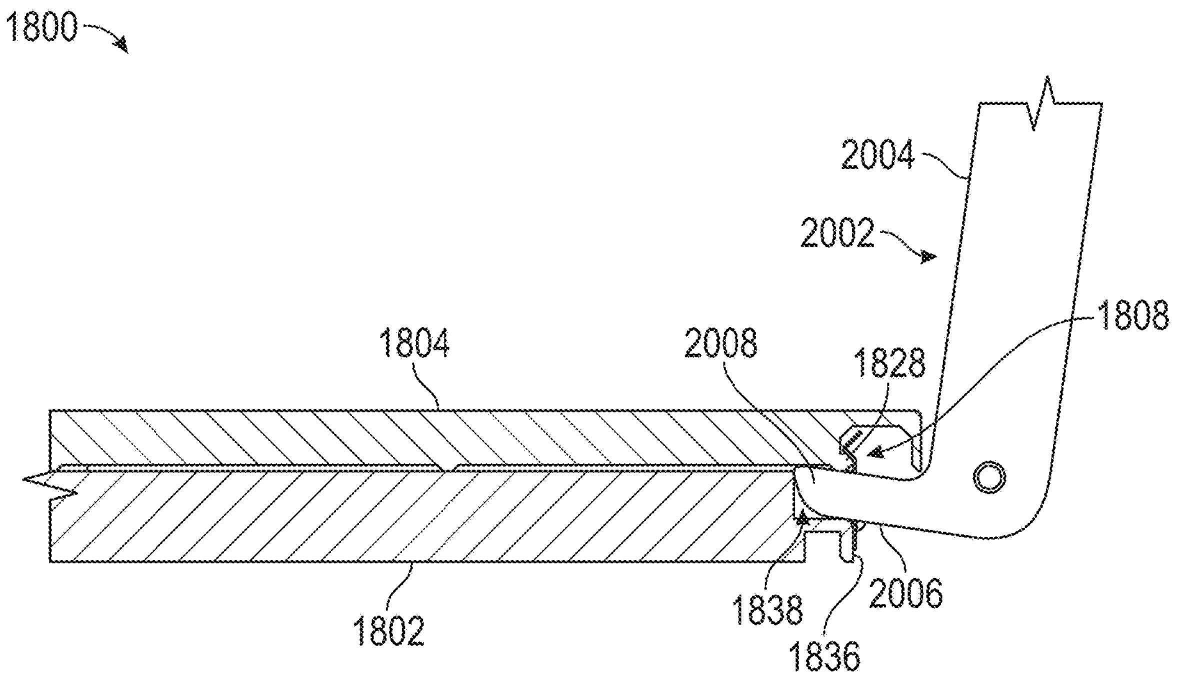
FIGS. 20A and 20B illustrate a process for decoupling a build platform from a carrier using a removal tool, in accordance with embodiments of the present technology.
Figure 20B:
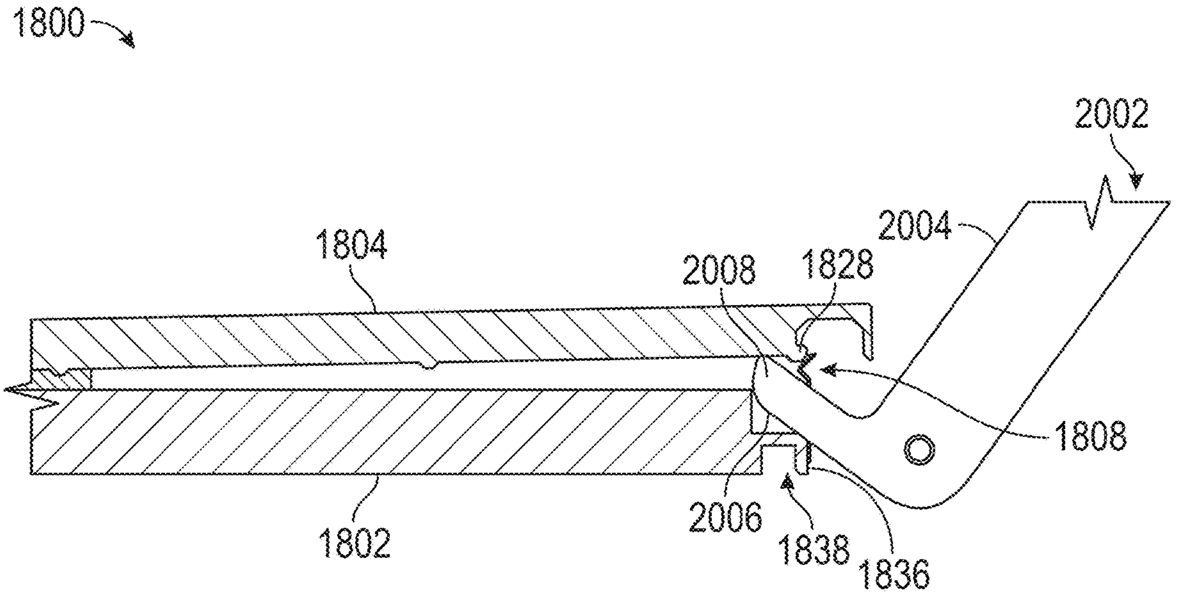

FIGS. 20A and 20B illustrate a process for decoupling the build platform 1804 from the carrier 1802 using a removal tool 2002, in accordance with embodiments of the present technology. Specifically, FIG. 20A is a side cross-sectional view of the carrier 1802, build platform 1804, and removal tool 2002 in a first configuration while the build platform 1804 is coupled to the carrier 1802, and FIG. 20B is a side cross-sectional view of the carrier 1802, build platform 1804 and removal tool 2002 in a second configuration after the build platform 1804 is decoupled from the carrier 1802 (the internal spring clip 1806, internal portion 1822, recess 1824, and internal projection 1826 are omitted from FIGS. 20A and 20B merely for purposes of simplicity).

Turning now to FIG. 20A, the removal tool 2002 can include an elongate body 2004 that acts as a lever for applying forces to the carrier 1802 and the build platform 1804 to decouple these components from each other, e.g., by causing the spring clips 1806, 1808 on the carrier 1802 to disengage the corresponding portions of the build platform 1804. The elongate body 2004 can have a suitable length and can provide a handle for a user to grasp and rotate the removal tool 2002 via the elongate body 2004. For example, the elongate body 2004 can be made out of a relatively rigid and/or stiff material, such as a metal (e.g., steel, aluminum, brass, copper, titanium), a ceramic, a polymer (e.g., thermoformed or thermoset polymer), a composite, or suitable combinations thereof. The elongate body 2004 can have an arm 2006 configured to contact and apply force to the carrier 1802 and/or the build platform 1804. The arm 2006 can engage the carrier 1802 and/or the build platform 1804 via a tip 2008 that is configured to fit into the second recess 1838 of the carrier 1802 to create leverage for the arm 2006 to press the build platform 1804 upward away from the carrier 1802.

The build platform 1804 can initially be coupled to the carrier 1802, with the internal spring clip 1806 and the external spring clip 1808 on the carrier 1802 initially engaged with the internal projection 1826 and the external projection 1828, respectively, of the build platform 1804. The tip 2008 of the arm 2006 can then be inserted into the second recess 1838 of the carrier 1802. The user can then rotate the elongate body 2004, e.g., in a clockwise direction with the tip 2008 of the arm 2006 serving as the center of rotation. The rotation of the elongate body 2004 can produce an upward force that is transmitted through the arm 2006 onto the build platform 1804. The force applied to the build platform 1804 can cause the internal projection 1826 and external projection 1828 to disengage from the internal spring clip 1806 and external spring clip 1808, respectively, thus decoupling the build platform 1804 from the carrier 1802, as depicted in FIG. 20B. The removal tool 2002 can then be removed.

Figure 21A:
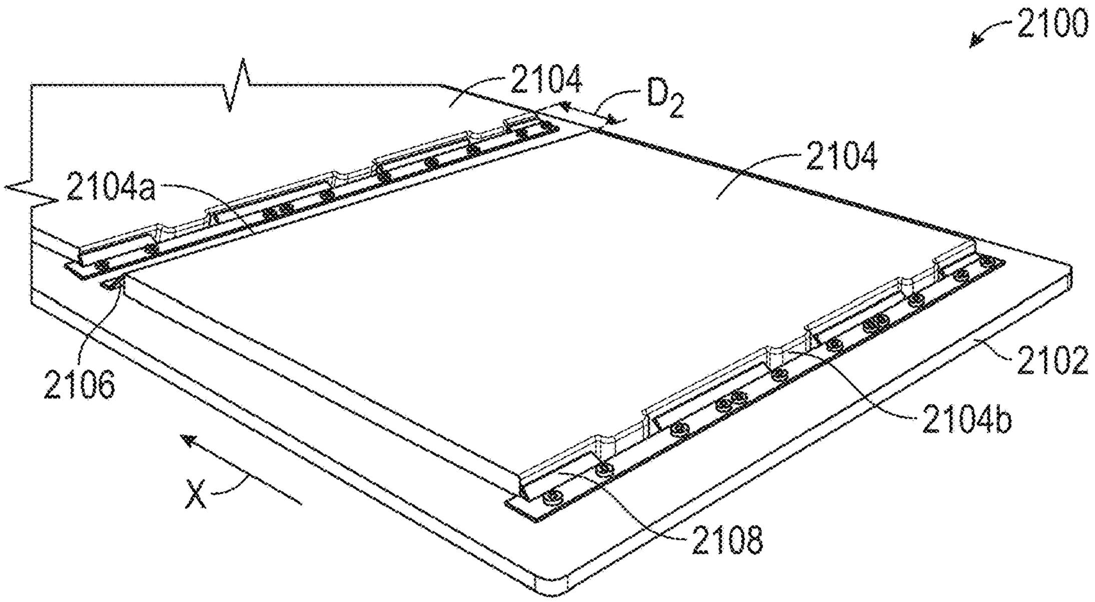
FIG. 21A is a perspective view of a modular build substrate including spring clips and rotatable clips, in accordance with embodiments of the present technology.
Figure 21B:
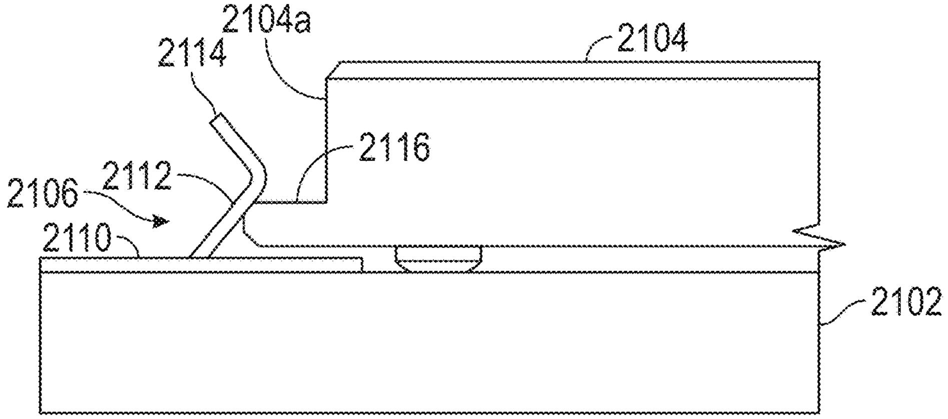
FIG. 21B is a side view of a portion of the modular build substrate of FIG. 21A, in accordance with embodiments of the present technology.
Figure 21C:
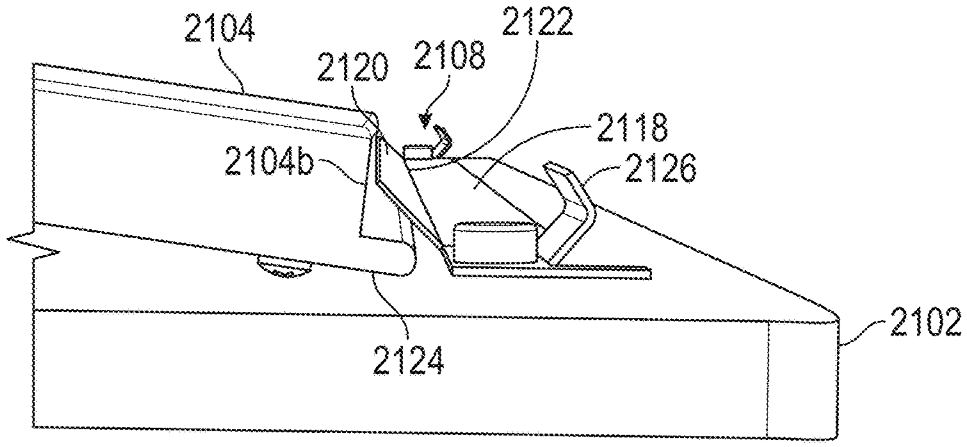
FIG. 21C is a perspective view of a portion of the modular build substrate of FIG. 21A, in accordance with embodiments of the present technology.

FIGS. 21A-21C illustrate a modular build substrate 2100 including a carrier 2102, one or more build platforms 2104, and an attachment mechanism including one or more spring clips 2106 and one or more rotatable clips 2108, in accordance with embodiments of the present technology. Specifically, FIG. 21A is a perspective view of the modular build substrate, FIG. 21B is a side view of a portion of the modular build substrate including the one or more spring clips 2106, and FIG. 21C is a perspective view of another portion of the modular build substrate including the one or more rotatable clips 2108.

Referring now to FIG. 21A, the carrier 2102 and the build platforms 2104 can be generally similar to the other embodiments described herein (e.g., in connection with FIGS. 4-13C). For instance, the carrier 2102 can be a generally planar substrate for coupling to and supporting the build platforms 2104 during an additive manufacturing process, and the build platforms 2104 can each be a generally planar substrate suitable for coupling to and supporting at least one additively manufactured object thereon. As depicted, the build platforms 2104 can be arranged in a linear array with a separation distance $D_2$ between neighboring build platforms 2104. For instance, the separation distance $D_2$ can be at least 1 mm, 2 mm, 5 mm, 1 cm, 2 cm, or more. The separation distance $D_2$ can ensure adequate space to accommodate the attachment mechanism (e.g., the spring clips 2106 and the rotatable clips 2108), which may be positioned between the build platforms 2104 as shown in FIG. 21A. Additionally, or alternatively, the separation distance $D_2$ can help ensure that the build platforms 2104 can be independently and easily removed from the carrier 2102.

Each build platform 2104 can be coupled to the carrier 2102 via one or more spring clips 2106 and one or more rotatable clips 2108. The spring clips 2106 can be positioned proximate to and configured to engage a first side 2104*a* of the build platform 2104, and the rotatable clips 2108 can be positioned proximate to and configured to engage a second, opposite side 2104*b* of the build platform 2104. The first side 2104*a* and second side 2104*b* can correspond to the edges of the build platform 2104 that are orthogonal to the direction of motion of the printer assembly (e.g., direction X). In some embodiments, the spring clips 2106 serve as flexible coupling devices that allow some lateral movement of the first side 2104*a* of the build platform 2104 relative to the carrier 2102, while the rotatable clips 2108 serve as rigid coupling devices that prevent lateral movement of the second side 2104*b* of the build platform 2104 relative to the carrier 2102. This configuration can be advantageous to accommodate dimensional changes of the build platform 2104 due to thermal expansion/shrinkage effects, as described elsewhere herein.

In some embodiments, the spring clips 2106 are arranged on the carrier 2102 in a linear array (e.g., a row). The spring clips 2106 may collectively releasably couple the first side 2104*a* of the build platform 2104 to the carrier 2102. Each of the spring clips 2106 can be generally similar to the spring clips 1506 of FIG. 15. For example, as shown in FIG. 21B, each spring clip 2106 can be made partially or entirely out of a spring material and can include a base portion 2110, an engagement portion 2112, and an optional handle portion 2114. The base portion 2110 can be coupled to the carrier 2102, e.g., via a fastener, actuatable gripper, adhesive, bonding, welding, or a suitable combination thereof. The engagement portion 2112 can be configured to engage an external portion of the build platform 2104, such as an external projection 2116, which may be generally similar to the projection 1516 of FIG. 15. For example, the external projection 2116 can extend laterally from the first side 2104*a* of the build platform 2104 and can have a lower upper surface than the build platform 2104. When the build platform 2104 is placed on the carrier 2102, the external projection 2116 can displace the engagement portion 2112 of the spring clip 2106 upward and away from the carrier 2102, and the engagement portion 2112 can resist the displacement to apply a spring force downward against the external projection 2116 to secure the first side 2104*a* of the build platform 2104 to the carrier 2102.

The rotatable clips 2108 can be arranged on the carrier 2102 in a linear array (e.g., in a row). The rotatable clips 2108 may collectively releasably couple the second side 2104*b* of the build platform 2104 to the carrier 2102. The rotatable clips 2108 can be configured to engage and lock the second side 2104*b* of the build platform 2104 to the carrier 2102 in a manner that inhibits movement of the second side 2104*b* of build platform 2104 relative to the carrier 2102.

Referring now to FIG. 21C, the rotatable clips 2108 can include a base portion 2118 and an engagement portion 2120 coupled to the base portion 2118 via a hinge 2122. The base portion 2118 can be coupled to the carrier 2102, e.g., via fasteners, actuatable grippers, adhesives, bonding, welding, or a suitable combination thereof. The engagement portion 2120 can be configured as a generally flat structure, such as a sheet, strip, tab, etc. The engagement portion 2120 can be made out of a relatively rigid and/or stiff material, such as metal (e.g., steel, aluminum, brass, copper, titanium), a ceramic, a polymer (e.g., thermoformed or thermoset polymer), a composite, or suitable combinations thereof. The hinge 2122 can allow the engagement portion 2120 to rotate in a vertical direction relative to the base portion 2118. For example, the engagement portion 2120 can rotate in a range from 0 to 30 degrees, 30 to 60 degrees, 60 to 90 degrees, 90 to 120 degrees, 120 to 150 degrees, or 150 to 180 degrees.

The rotatable clips 2108 can be configured to rotate between an open configuration in which the engagement portions 2120 are disengaged from the second side 2104*b* of the build platform 2104, and a closed configuration in which the engagement portions 2120 are engaged with the second side 2104*b* of the build platform. In the closed configuration, the engagement portions 2120 can directly contact an external portion of the second side 2104*b* of the build platform, such as one or more external projections 2124 of the build platform 2104, which can be identical or generally similar to the external projection 2116. The contact between the engagement portions 2120 and the external projections 2124 can obstruct movement of the second side 2104*b* of the build platform 2104 relative to the carrier 2102. Moreover, when in the closed configuration, the rotatable clips 2108 can be entirely below the upper surface of the build platform 2104, e.g., to avoid interfering with the additive manufacturing process.

The rotatable clips 2108 can optionally be disengaged from the build platform 2014 by a release mechanism 2126. In some embodiments, the release mechanism 2126 is a tab extending vertically that, when retracted, cause the engagement portions 2120 of the rotatable clips 2108 to rotate away from the build platform 2104. For example, a user may pull back the release mechanism 2126 away from the build platform 2104 to free the second side 2104*b* of the build platform 2104 from the carrier 2102. In other embodiments, the release mechanism 2126 can have a different form factor, such as a strut, pin, switch, cantilever, string, etc.

Although FIGS. 21A-21C illustrate an embodiment in which the first side 2104*a* of the build platforms 2104 are coupled to spring clips 2106 and the second side 2104*b* of the build platforms 2104 are coupled to rotatable clips 2108, other configurations can also be used, e.g., the spring clips 2106 can be used for both the first side 2104*a* and the second side 2104*b* of the build platforms 2104, the rotatable clips 2108 can be used for both the first side 2104*a* and the second side 2104*b* of the build platforms 2104, or the spring clips 2106 and/or rotatable clips 2108 can each independently be substituted with any of the other coupling devices described herein. Moreover, although the remaining sides of the build platforms 2014 (e.g., corresponding to the edges of the build platforms 2104 that are parallel to direction X) are depicted as not being coupled to the carrier 2102 by any coupling devices, in other embodiments, one or both of the remaining sides can be coupled to the carrier 2102 via spring clips 2106, rotatable clips 2108, and/or any of the other coupling devices described herein.

Figure 22A:
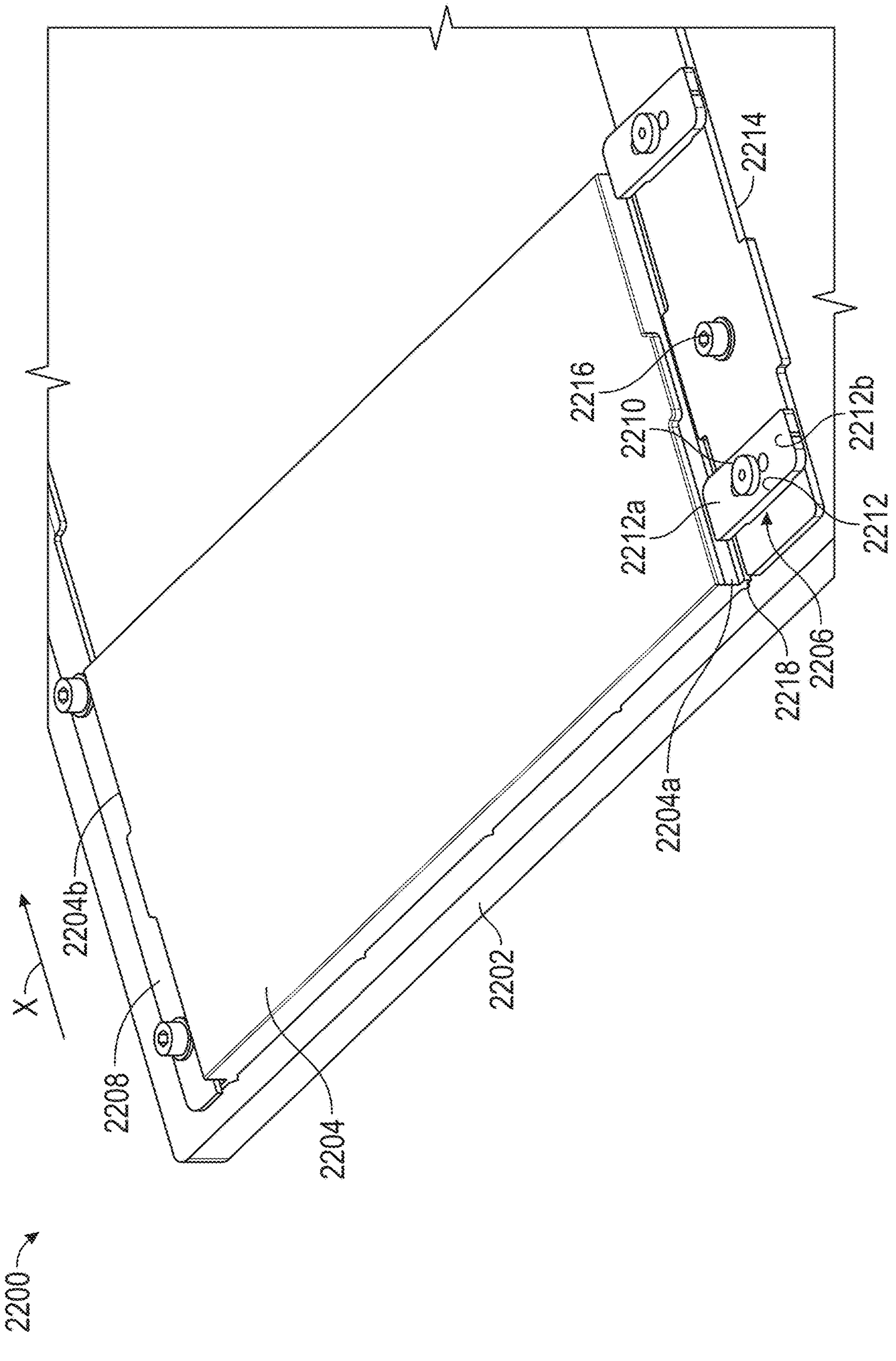
FIG. 22A is a perspective view of a modular build substrate including a plurality of laterally rotatable clips, in accordance with embodiments of the present technology.
Figure 22B:
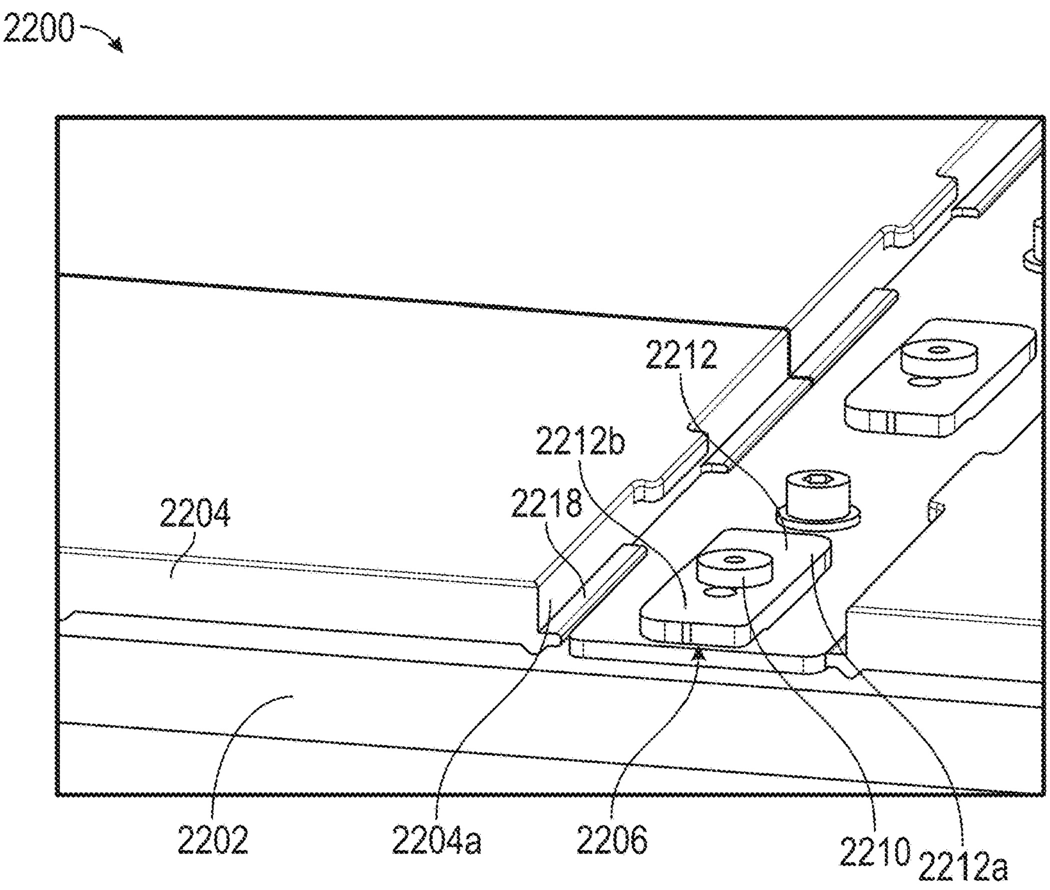
FIG. 22B is a close-up perspective view of the modular build substrate of FIG. 22A with the laterally rotatable clips in an open configuration, in accordance with embodiments of the present technology.
Figure 22C:
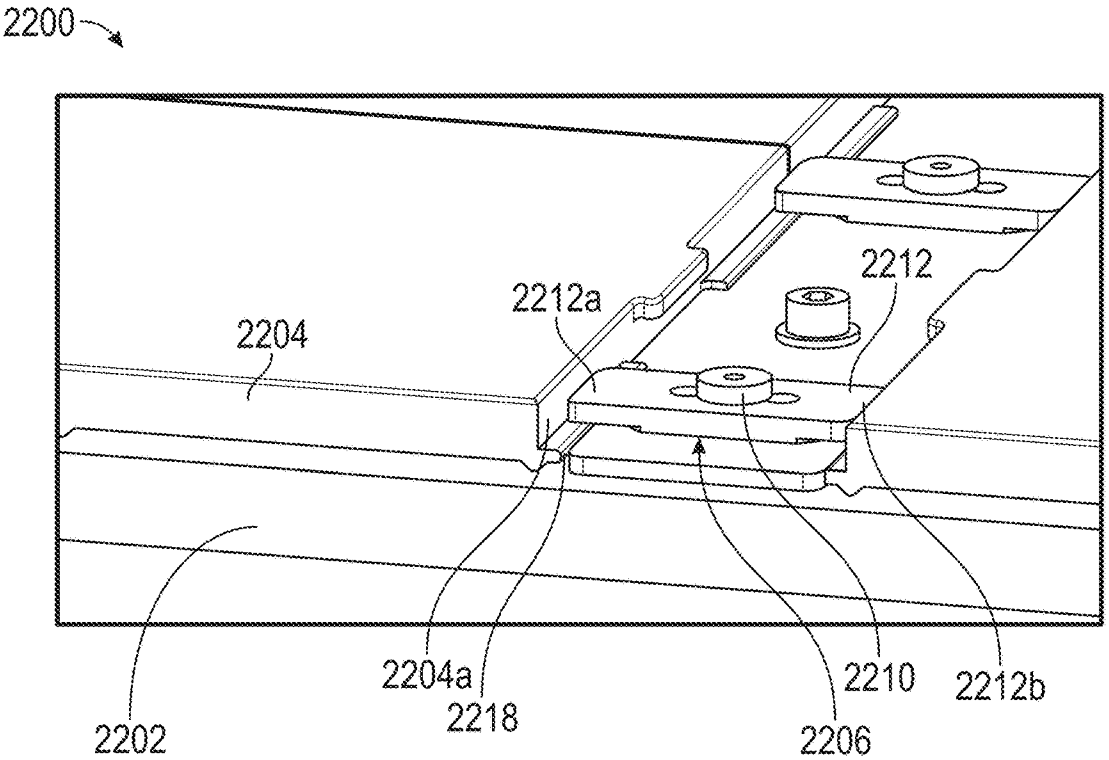
FIG. 22C is a close-up perspective view of the modular build substrate of FIG. 22A with the laterally rotatable clips in a closed configuration, in accordance with embodiments of the present technology.

FIGS. 22A-22C illustrate a modular build substrate 2200 including a carrier 2202, one or more build platforms 2204, and an attachment mechanism including a plurality of laterally rotatable clips 2206, in accordance with embodiments of the present technology. Specifically, FIG. 22A is a perspective view of the modular build substrate, FIG. 22B is a perspective view of the modular build substrate with the laterally rotatable clips 2206 in an open configuration, and FIG. 22C is a perspective view of the modular build substrate with the laterally rotatable clips 2206 in a closed configuration.

Referring now to FIG. 22A, the carrier 2202 and the build platforms 2204 can be generally similar to the other embodiments described herein (e.g., in connection with FIGS. 4-13C). For instance, the carrier 2202 can be a generally planar substrate for coupling to and supporting the build platforms 2204 during an additive manufacturing process, and the build platforms 2204 can each be a generally planar substrate suitable for coupling to and supporting at least one additively manufactured object thereon (a single build platform 2204 is shown in FIG. 22A merely for purposes of simplicity). The build platforms 2204 can be arranged on the carrier 2202 in an array (e.g., a row or grid).

Each build platform 2204 can be coupled to the carrier 2202 via one or more laterally rotatable clips 2206 and one or more vertically rotatable clips 2208. The laterally rotatable clips 2206 can be positioned proximate to and configured to engage a first side 2204*a* of the build platform 2204, and the vertically rotatable clips 2208 can be positioned proximate to and configured to engage a second, opposite side 2204*b* of the build platform 2204. The first side 2204*a* and second side 2204*b* can correspond to the edges of the build platform 2204 that are parallel to the direction of motion of the printer assembly (e.g., direction X).

The laterally rotatable clips 2206 can be arranged on the carrier 2202 in a linear array (e.g., in a row). The laterally rotatable clips 2206 can each include an axle 2210 and a body 2212 that is rotatably coupled to the axle 2210. The axle 2210 can be attached to a base portion 2214 (e.g., a plate, strip, sheet). The base portion 2214 can be affixed to the carrier 2202, e.g., via a fastener 2216. For example, the base portion 2214 can be affixed to the carrier 2202 using a screw that is inserted into the base portion 2214 and received by a milled hole and/or recess in the carrier 2202. In other embodiments, however, the base portion 2214 may be omitted such that the laterally rotatable clips 2206 may be mounted directly to the carrier 2202 (e.g., the axle 2210 can be attached directly to the carrier 2202).

The body 2212 can be an elongate member having a first end 2212*a* and a second end 2212*b* opposite the first end 2212*a*. One or both of the first ends 2212*a*, 2212*b* can serve as engagement portions for coupling to the build platform 2204. In the illustrated embodiment, the body 2212 has a generally rectangular shape (e.g., rounded rectangular shape). In other embodiments, the body 2212 can have a different shape, such as square, circular, oval, oblong, etc. The body 2212 can be rotated laterally about the axle 2210 through a plurality of different orientations. In some embodiments, the body 2212 is rotatable about the axle 2210 over an angular range of 360 degrees. In other embodiments, the body 2212 may be rotatable about the axle 2210 over an angular range less than 360 degrees, e.g., an angular range less than or equal to 30 degrees, 60 degrees, 90 degrees, 120 degrees, 150 degrees, etc.

The laterally rotatable clips 2206 can be configured to rotate between an open configuration in which the first end 2212*a* and/or second end 2212*b* are disengaged from one or more build platforms 2204 (e.g., FIG. 22B), and a closed configuration in which the first end 2212*a* and/or second end

2212*b* are engaged with the one or more build platforms 2204 (e.g., FIG. 22C). As shown in FIG. 22B, in the open configuration, the laterally rotatable clips 2206 are in an initial orientation in which the first end 2212*a* and second end 2212*b* are spaced apart from the build platforms 2204. As shown in FIG. 22C, in the closed configuration, the laterally rotatable clips 2206 have been rotated approximately 90 degrees from their initial position, such that the first end 2212*a* and/or the second end 2212*b* are engaged with an external portion of one or more build platforms 2204. Specifically, the first end 2212*a* and/or the second end 2212*b* can be positioned over and/or in direct contact with one or more external projections 2218 of one or more build platforms 2204 to obstruct vertical and/or lateral movement of the build platforms 2204 relative to the carrier 2202. The external projections 2218 may be generally similar to the other external projections described herein, e.g., the projection 1516 of FIG. 15.

Referring back to FIG. 22A, the carrier 2202 can include one or more vertically rotatable clips 2208 opposite of the laterally rotatable clips 2206 to couple to the second side 2204*b* of the build platform 2204. The vertically rotatable clips 2208 can be generally similar to the rotatable clips 2108 of FIG. 21. For example, the vertically rotatable clips 2208 can include a hinged engagement portion that rotates vertically downward to secure the second side 2204*b* of the build platform 2104 to the carrier 2202.

Although FIGS. 22A-22C illustrate an embodiment in which the first side 2204*a* of the build platforms 2204 are coupled to laterally rotatable clips 2206 and the second side 2204*b* of the build platforms 2204 are coupled to vertically rotatable clips 2208, other configurations can also be used, e.g., the laterally rotatable clips 2206 can be used for both the first side 2204*a* and the second side 2204*b* of the build platforms 2204, the vertically rotatable clips 2208 can be used for both the first side 2204*a* and the second side 2204*b* of the build platforms 2204, or the laterally rotatable clips 2206 and/or the vertically rotatable clips 2208 can each independently be substituted with any of the other coupling devices described herein. Moreover, although the remaining sides of the build platforms 2204 (e.g., corresponding to the edges of the build platforms 2204 that are orthogonal to direction X) are depicted as not being coupled to the carrier 2202 by any coupling devices, in other embodiments, one or both of the remaining sides can be coupled to the carrier 2202 via laterally rotatable clips 2206, vertically rotatable clips 2208, and/or any of the other coupling devices described herein.

Figure 23:
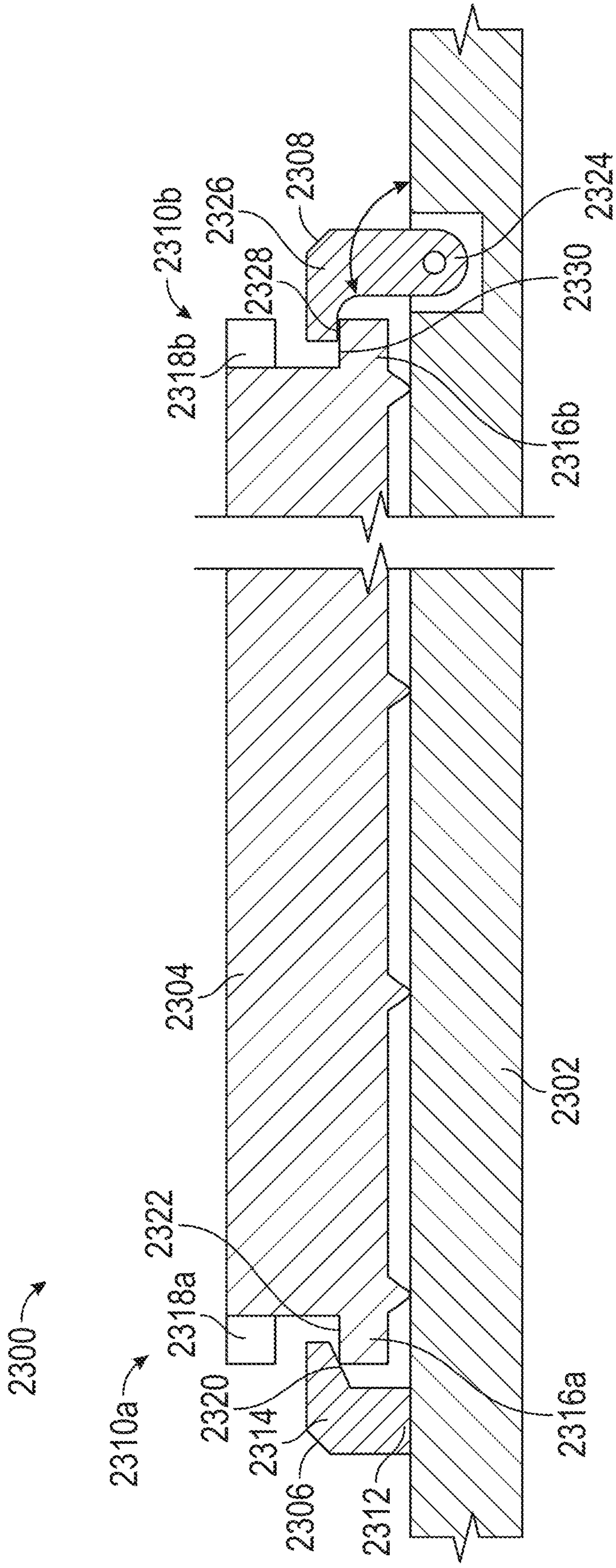
FIG. 23 is a side cross-sectional view of a modular build substrate including a fixed clip and a rotatable clip, in accordance with embodiments of the present technology.

FIG. 23 is a side cross-sectional view of modular build substrate 2300 including a carrier 2302, a build platform 2304, and an attachment mechanism including a fixed clip 2306 and a rotatable clip 2308, in accordance with embodiments of the present technology. The carrier 2302 and build platform 2304 can be generally similar to the other embodiments described herein (e.g., in connection with FIGS. 4-12). For instance, the carrier 2302 can be a tray, plate, film, sheet, or other generally planar substrate suitable for coupling to and supporting the build platform 2304 during an additive manufacturing process. The build platform 2304 can be a tray, plate, film, sheet, or other generally planar substrate suitable for coupling to and supporting at least one additively manufactured object thereon.

The build platform 2304 can be coupled to the carrier 2302 via at least one fixed clip 2306 and at least one rotatable clip 2308. In the illustrated embodiment, the fixed clip 2306 is configured to engage a first side 2310*a* of the build platform 2304, and the rotatable clip 2308 is configured to engage a second side 2310*b* of the build platform 2304 opposite the first side 2310*a*. The fixed clip 2306 can serve as a rigid coupling device for securing the first side 2310*a* of the build platform 2304 to the carrier 2302. As shown in FIG. 23, the fixed clip 2306 can include a base portion 2312 and an engagement portion 2314. In some embodiments, the base portion 2312 and the engagement portion 2314 are integrally formed with each other and made of a rigid material that does not substantially deform and/or deflect when the fixed clip 2306 engages the build platform 2304. The base portion 2312 can be configured to be mounted to the carrier 2302, e.g., via a fastener, actuatable gripper, adhesive, bonding, welding, or a suitable combination thereof. The engagement portion 2314 can be connected to the base portion 2312, and can extend upward and laterally inward from the base portion 2312 toward the first side 2310*a* of the build platform 2304.

In the illustrated embodiment, the engagement portion 2314 of the fixed clip 2306 is configured to engage an external projection 2316*a* formed in the first side 2310*a* of the build platform 2304 to rigidly couple the first side 2310*a* to the carrier 2302. The projection 2316 may be generally similar to the other external projections described herein, e.g., the projection 1516 of FIG. 15. For example, the projection 2316*a* can extend laterally outward from the first side 2310*a* of the build platform 2304. The projection 2316*a* can be a lip, flange, shoulder, or other suitable member for coupling to the fixed clip 2306. The projection 2316*a* can be adjacent to the bottom surface of the build platform 2304 and/or positioned below the upper surface of the build platform 2304 such that when the fixed clip 2306 engages the projection 2316*a*, the fixed clip 2306 remains below the upper surface of the build platform 2304, e.g., to avoid interfering with the additive manufacturing process. Optionally, the build platform 2304 can include an additional projection 2318*a* formed in the first side 2310*a* of the build platform 2304 and positioned above the projection 2316*a*, e.g., to prevent material from dripping onto the projection 2316*a* during the additive manufacturing process.

The engagement portion 2314 of the fixed clip 2306 can include a lower surface 2320 that contacts an upper surface 2322 of the projection 2316*a*, thereby constraining lateral and vertical movement of the build platform 2304 relative to the carrier 2302. The lower surface 2320 can optionally be angled toward the carrier 2302 to pull the projection 2316*a*, and thus the build platform 2304, downward toward the carrier 2302. In other embodiments, however, the lower surface 2320 may not be angled, and may instead be substantially parallel to the surface of the carrier 2302. Moreover, although the upper surface 2322 of the projection 2316*a* is depicted as being substantially parallel to the surface of the carrier 2302, the upper surface 2322 can alternatively be angled.

The rotatable clip 2308 can serve as a flexible coupling device for securing the second side 2310*b* of the build platform 2304 to the carrier 2302. As shown in FIG. 23, the rotatable clip 2308 can include a base portion 2324 and an engagement portion 2326. The base portion 2324 can be configured to be mounted to the carrier 2302 via a rotatable coupling (e.g., a hinge, pivot, ball joint) that permits rotation of the rotatable clip 2308 in a vertical direction, e.g., as indicated by the double-headed arrow in FIG. 23. For instance, the rotatable clip 2308 can be rotated between a closed configuration in which the rotatable clip 2308 engages the second side 2310*b* of the build platform 2304 (shown in FIG. 23), and an open configuration in which the rotatable clip 2308 is spaced apart from the second side 2310*b* of the build platform 2304.

When the rotatable clip 2308 is in the closed configuration, the engagement portion 2326 of the rotatable clip 2308 can engage a projection 2316*b* formed in the second side 2310*b* of the build platform 2304. The projection 2316*b* can be identical or generally similar to the projection 2316*a*, e.g., the projection 2316*b* can be a lip, flange, shoulder, etc., that extends laterally outward from the second side 2310*b* and is positioned below the upper surface of the build platform 2304. Optionally, the build platform 2304 can include an additional projection 2318*b* formed in the second side 2310*b* of the build platform 2304 above the projection 2316*b*, e.g., to prevent material from dripping onto the projection 2316*b* during the additive manufacturing process.

The engagement portion 2326 of the rotatable clip 2308 can include a lower surface 2328 that contacts an upper surface 2330 of the projection 2316*b*, thereby constraining lateral and vertical movement of the build platform 2304 relative to the carrier 2302. Although the lower surface 2328 of the engagement portion 2326 and the upper surface 2330 of the projection 2316*b* are both depicted as being substantially parallel to the surface of the carrier 2302, in other embodiments, the lower surface 2328 and/or the upper surface 2330 can alternatively be angled. In some embodiments, the rotatable clip 2308 is made partially or entirely out of a flexible material (e.g., a spring material such as a spring metal) such that the rotatable clip 2308 can accommodate some degree of movement of the second side 2310*b* of the build platform 2304 relative to the carrier 2302, e.g., due to thermal expansion/shrinkage effects as discussed elsewhere herein. In other embodiments, however, the rotatable clip 2308 can instead be configured as a rigid coupling device and thus can be made out of a rigid material that is not deformable and/or deflectable when engaged with the second side 2310*b* of the build platform 2304.

The configuration of the modular build substrate 2300 shown in FIG. 23 can provide various advantages. For instance, the build platform 2304 can be placed into and removed from the carrier 2302 simply by rotating the rotatable clip 2308 between the closed and open configurations, respectively, thereby avoiding the need for specialized placement and removal tools. Moreover, the fixed clip 2306 and rotatable clip 2308 can be used to precisely fix the build platform 2304 at a desired location (e.g., x- and y-position) relative to the carrier 2302, without requiring additional registration features to align the build platform 2304 on the carrier 2302.

Figure 24A:
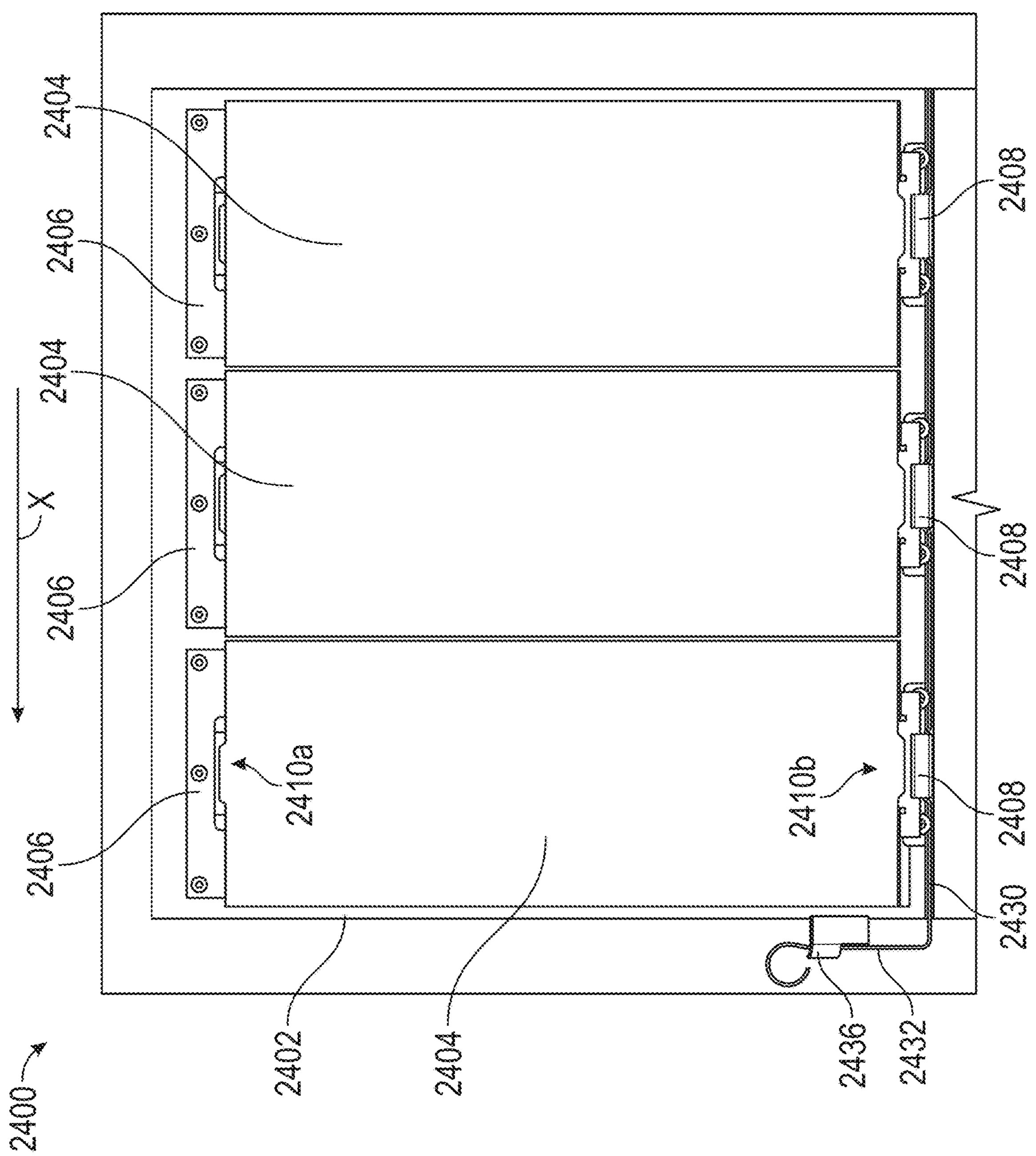
FIG. 24A is a top view of a modular build substrate including a plurality of fixed clips and a plurality of rotatable clips, in accordance with embodiments of the present technology.
Figure 24B:
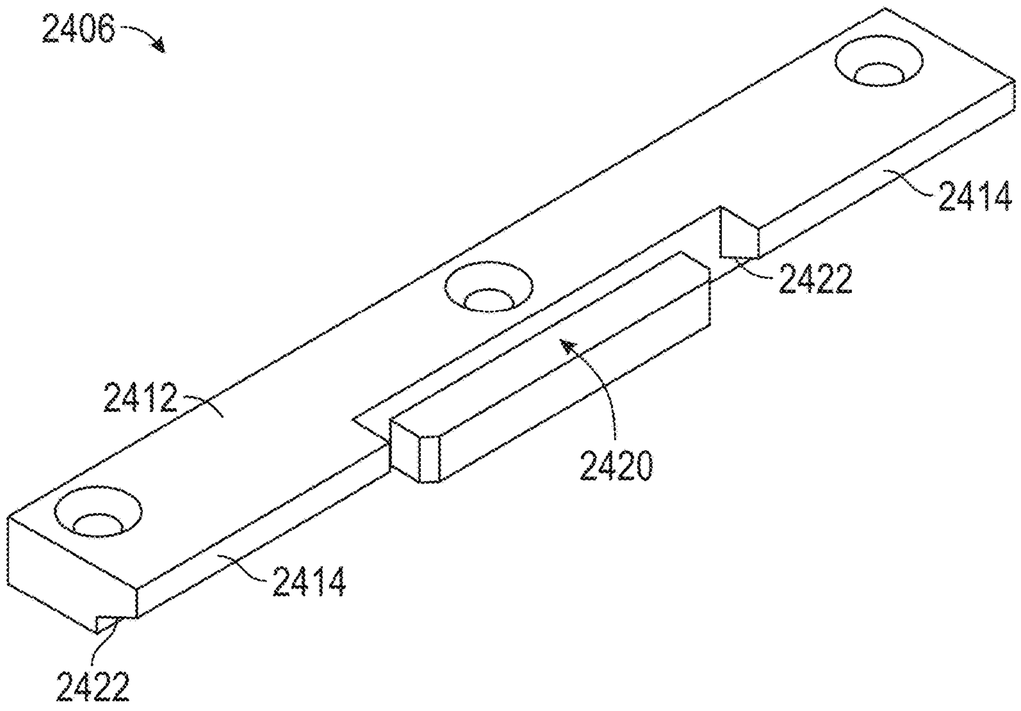
FIG. 24B is a perspective view of a fixed clip of the modular build substrate of FIG. 24A, in accordance with embodiments of the present technology.
Figure 24C:
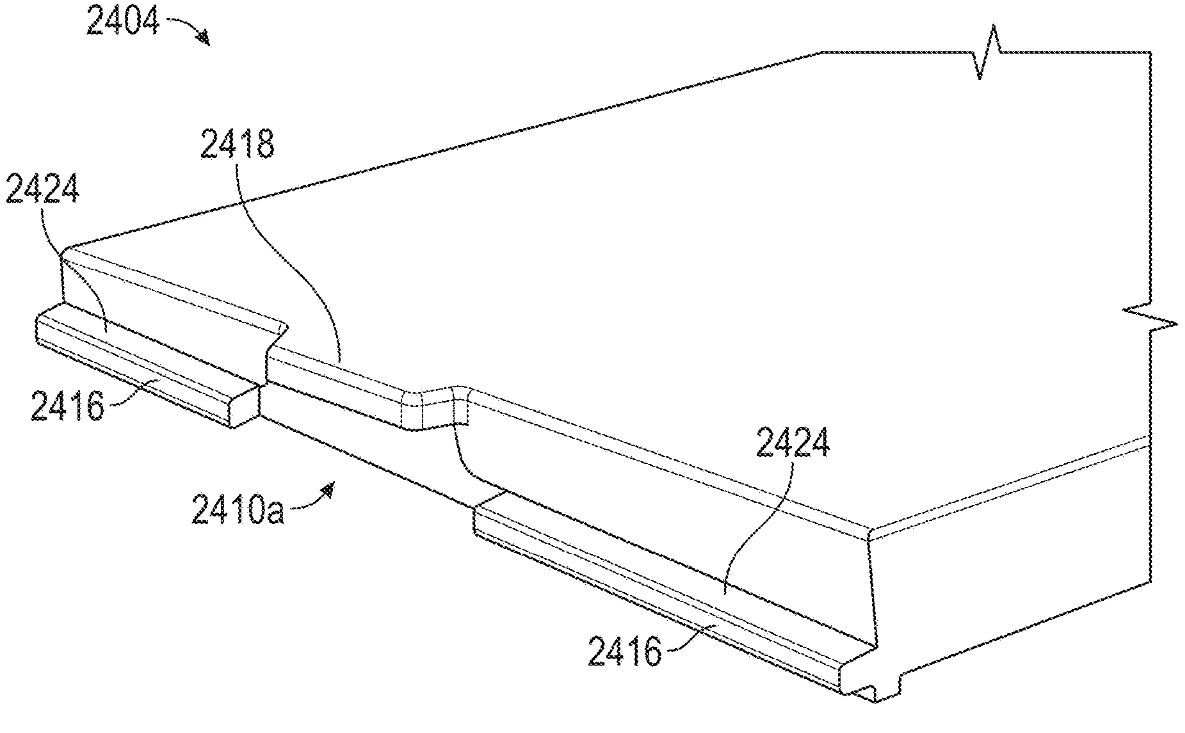
FIG. 24C is a perspective view of a portion of a build platform of the modular build substrate of FIG. 24A, in accordance with embodiments of the present technology.
Figure 24D:
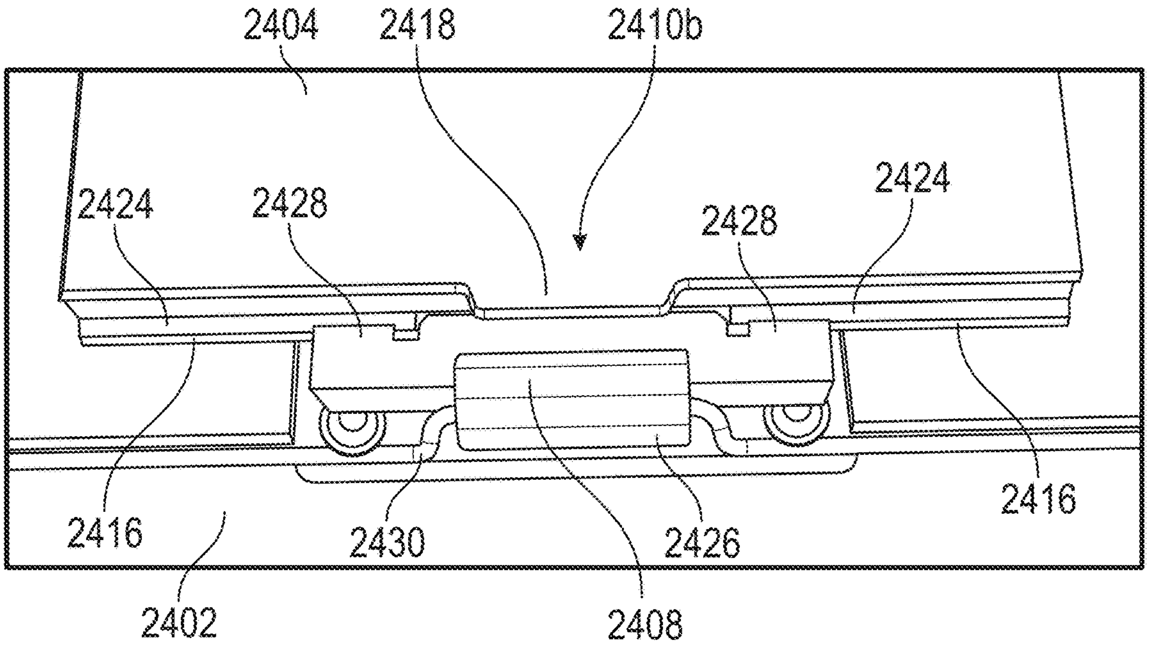
FIG. 24D is a top view of a rotatable clip and a build platform of the modular build substrate of FIG. 24A, in accordance with embodiments of the present technology.
Figure 24E:
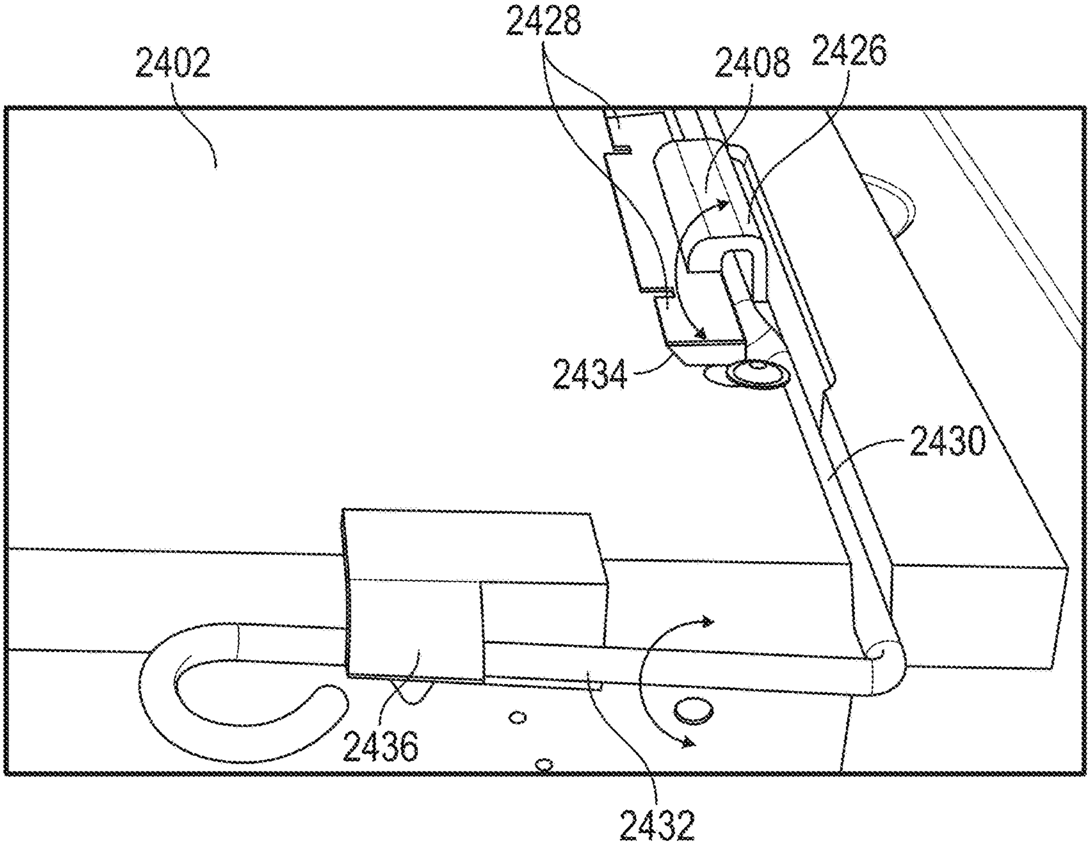
FIG. 24E is a perspective view of a rotatable clip of the modular build substrate of FIG. 24A, in accordance with embodiments of the present technology.
Figure 24F:
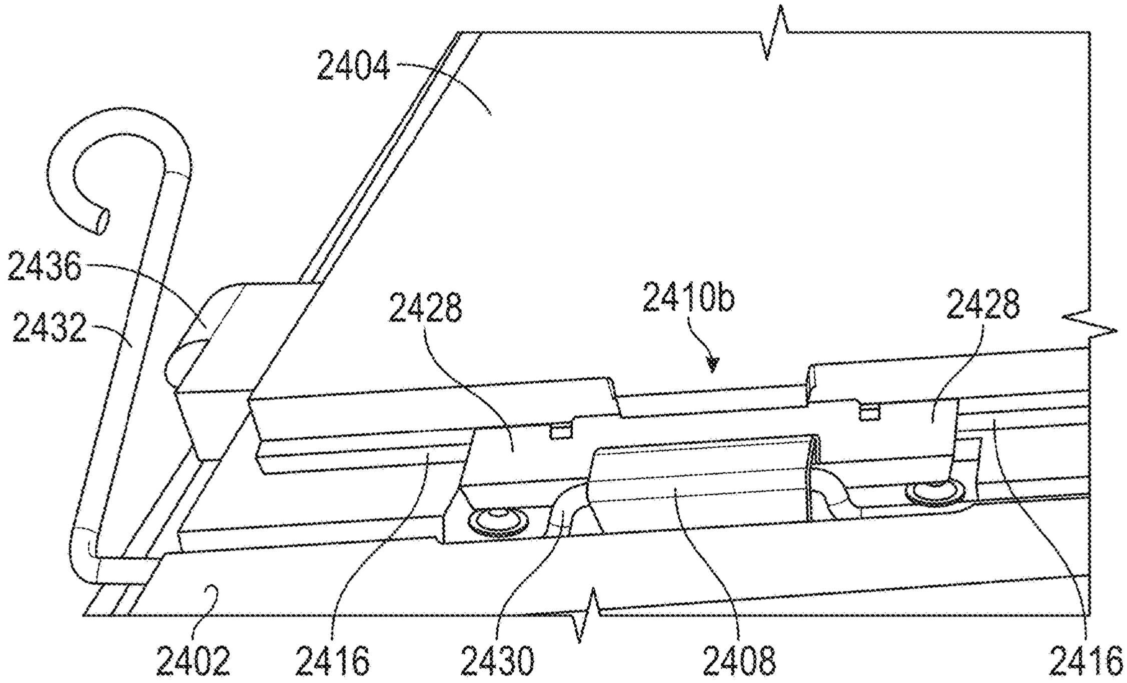
FIG. 24F is a perspective view of a rotatable clip of the modular build substrate of FIG. 24A in an open configuration, in accordance with embodiments of the present technology.
Figure 24G:
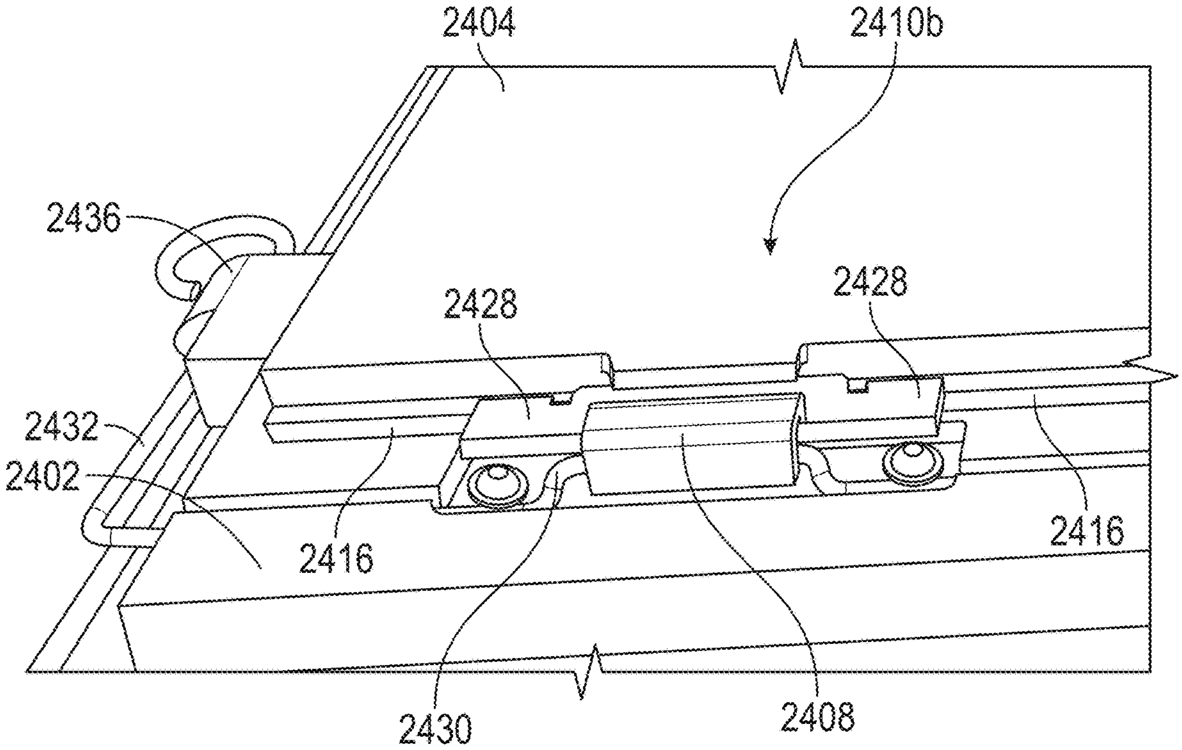
FIG. 24G is a perspective view of a rotatable clip of the modular build substrate of FIG. 24A in a closed configuration, in accordance with embodiments of the present technology.

FIGS. 24A-24G illustrate a modular build substrate 2400 including a carrier 2402, a plurality of build platforms 2404, and an attachment mechanism including a plurality of fixed clips 2406 and a plurality of rotatable clips 2408, in accordance with embodiments of the present technology. Specifically, FIG. 24A is a top view of the modular build substrate 2400, FIG. 24B is a perspective view of a fixed clip 2406, FIG. 24C is a perspective view of a portion of a build platform 2404, FIG. 24D is a top view of a rotatable clip 2408 and the build platform 2404, FIG. 24E is a perspective view of the rotatable clip 2408 and the build platform 2404, FIG. 24F is a perspective view of the rotatable clip 2408 in an open configuration, and FIG. 24G is a perspective view of the rotatable clip 2408 in a closed configuration.

Referring first to FIG. 24A, the carrier 2402 and build platforms 2404 can be generally similar to the other embodiments described herein (e.g., in connection with FIGS. 4-12). For instance, the carrier 2402 can be a tray, plate, film, sheet, or other generally planar substrate suitable for coupling to and supporting the build platforms 2404 during an additive manufacturing process. The build platforms 2404 can each be a tray, plate, film, sheet, or other generally planar substrate suitable for coupling to and supporting at least one additively manufactured object thereon.

In the illustrated embodiment, the build platforms 2404 are arranged in a linear array on the carrier 2402. Each build platform 2404 is coupled to the carrier 2402 by a fixed clip 2406 and a rotatable clip 2408. The fixed clip 2406 can be coupled to a first side 2410*a* of each build platform 2404, and the rotatable clip 2408 can be coupled to a second side 2410*b* of the build platform 2404 opposite the first side 2410*a* (reference numbers are shown for a single build platform 2404 merely for purposes of simplicity). The first side 2410*a* and second side 2410*b* can correspond to the edges of the build platform 2204 that are parallel to the direction of motion of the printer assembly (e.g., direction X).

Referring to FIGS. 24A and 24B together, the fixed clip 2406 can serve as a rigid coupling device for securing the first side 2410*a* of the build platform 2404 to the carrier 2402. The fixed clip 2406 can include a base portion 2412 and a pair of engagement portions 2414. In some embodiments, the base portion 2412 and the engagement portions 2414 are integrally formed with each other and made of a rigid material that does not substantially deform and/or deflect when the fixed clip 2406 engages the build platform 2404. The base portion 2412 can be configured to be mounted to the carrier 2402, e.g., via fasteners, actuatable grippers, adhesives, bonding, welding, or a suitable combination thereof. The engagement portions 2414 can be connected to the base portion 2412, and can extend laterally inward from the base portion 2412 toward the first side 2410*a* of the build platform 2304.

Referring next to FIGS. 24B and 24C together, each engagement portion 2414 can be configured to engage a respective projection 2416 formed in the first side 2410*a* of the build platform 2404 to rigidly couple the first side 2410*a* to the carrier 2402. The projections 2416 can each be a lip, flange, shoulder, etc., that extends laterally outward from the first side 2410*a* of the build platform 2404 and/or may be integrally formed with the build platform 2404. The projections 2416 can be adjacent to the bottom surface of the build platform 2404 and/or positioned below the upper surface of the build platform 2404 such that when the fixed clip 2406 engages the projections 2416, the fixed clip 2406 remains below the upper surface of the build platform 2404. Optionally, the build platform 2404 can include an additional projection 2418 located between and above the projections 2416, e.g., to serve as a handle for removing the build platform 2404 from the carrier 2402. In such embodiments, the fixed clip 2406 can include a notch 2420 between the engagement portions 2414 to accommodate the additional projection 2418.

In some embodiments, the engagement portions 2414 of the fixed clip 2406 each include a lower surface 2422 that contacts an upper surface 2424 of the respective projection 2416 on the build platform 2404, thereby constraining lateral and vertical movement of the build platform 2404 relative to the carrier 2402. The lower surface 2422 can optionally be angled toward the carrier 2402 to pull the projection 2416, and thus the build platform 2404, downward toward the carrier 2402. In other embodiments, however, the lower surface 2422 may not be angled, and may instead be substantially parallel to the surface of the carrier 2402. Moreover, although the upper surfaces 2424 of the projections 2416 are depicted as being substantially parallel to the surface of the build platform 2404, the upper surfaces 2424 can alternatively be angled.

Referring next to FIGS. 24D and 24E together, the rotatable clip 2408 can serve as a flexible coupling device for securing the second side 2410*b* of the build platform 2404 to the carrier 2402. The rotatable clip 2408 can include a base portion 2426 and a pair of engagement portions 2428. In some embodiments, the base portion 2426 and the engagement portions 2428 are integrally formed with each other and made of a rigid material that does not substantially deform and/or deflect when the rotatable clip 2408 engages the build platform 2404. However, the base portion 2426 can be coupled to the carrier 2402 via a flexible coupling that is deformable and/or deflectable to accommodate some degree of movement of the second side 2410*b* of the build platform 2404 relative to the carrier 2402, e.g., due to thermal expansion/shrinkage effects. For instance, the base portion 2426 can be coupled to a spring member 2430 that is coupled to the carrier 2402. As best seen in FIG. 24A, the spring member 2430 can be an elongate element (e.g., a wire, rod, shaft) that extends along the length of the carrier 2402 and is coupled to the base portion 2426 of each rotatable clip 2408 on the carrier 2402. The spring member 2430 can terminate in an arm 2432 that serves as a handle for rotating the spring member 2430. The spring member 2430 can be rotatably coupled to the carrier 2402 and rigidly coupled to the rotatable clips 2408, such that vertical rotation of the spring member 2430 causes each of the rotatable clips 2408 to rotate together in a vertical direction relative to the carrier 2402 and build platforms 2404 (e.g., as indicated by the double-headed arrows in FIG. 24E). For instance, the rotatable clips 2408 can each be rotated between a closed configuration in which each rotatable clip 2408 engages the second side 2410*b* of its respective build platform 2404 (FIGS. 24D and 24F) and an open configuration in which each the rotatable clip 2408 is spaced apart from the second side 2310*b* of the build platform 2304 (FIG. 24G).

As best seen in FIG. 24D, the pair of engagement portions 2428 of the rotatable clip 2408 can be configured to engage a pair of projections 2416 formed in the second side 2410*b* of the build platform 2404 to couple the second side 2410*b* to the carrier 2402. The projections 2416 in the second side 2410*b* can be identical to the projections 2416 in the first side 2410*a*, and accordingly can include any of the features discussed above with respect to FIG. 24C. Moreover, the build platform 2404 can optionally include an additional projection 2418 formed in the second side 2410*b*, which can be identical to the projection 2418 in the first side 2410*a*, e.g., as previously described with respect to FIG. 24C.

Each engagement portion 2428 of the rotatable clip 2408 can include a lower surface 2434 configured to contact an upper surface 2424 of the corresponding projection 2416, thereby constraining lateral and vertical movement of the build platform 2404 relative to the carrier 2302. The lower surface 2434 can optionally be angled toward the carrier 2402 to pull the projection 2416, and thus the build platform 2404, downward toward the carrier 2402. In other embodiments, however, the lower surface 2434 may not be angled, and may instead be substantially parallel to the surface of the carrier 2402. Moreover, although the upper surfaces 2424 of the projections 2416 are depicted as being substantially parallel to the surface of the build platform 2404, the upper surfaces 2424 can alternatively be angled.

Referring to FIG. 24F, when placing a build platform 2404 on the carrier 2402 or removing the build platform 2404 from the carrier 2402, the spring member 2430 can be rotated in a first direction (e.g., by pulling the arm 2432 upward away from the carrier 2402) to place the rotatable clip 2408 in an open configuration. In the open configuration, the engagement portions 2428 of the rotatable clip 2408 can be spaced apart from the projections 2416 at the second side 2410*b* of the build platform 2404.

Referring next to FIG. 24G, to secure the build platform 2404 to the carrier 2402, the spring member 2430 can be rotated in a second, opposite direction (e.g., by pushing the arm 2432 downward toward the carrier 2402) to place the rotatable clip 2408 in a closed configuration. In the closed configuration, the engagement portions 2428 of the rotatable clip 2408 can directly contact the projections 2416 at the second side 2410*b* of the build platform 2404, thereby coupling the second side 2410*b* of the build platform 2404 to the carrier 2402. Optionally, the arm 2432 can be temporarily secured in the downward position by a lock member 2436, which can be a block, plate, post, or other overhanging element that engages the arm 2432 to keep the rotatable clips 2408 closed. However, due to the elastic properties of the spring member 2430, the spring member 2430 can still exhibit some degree of deflection and/or deformation even when the rotatable clips 2408 are closed, which can be beneficial for accommodating changes in the dimensions of the build platforms 2404 (e.g., due to thermal expansion/shrinkage effects).

Although FIGS. 24A-24G illustrate an embodiment in which the first side 2410*a* of the build platforms 2404 are coupled to fixed clips 2406 and the second side 2410*b* of the build platforms 2404 are coupled to rotatable clips 2208, other configurations can also be used, e.g., the fixed clips 2406 can be used for both the first side 2410*a* and the second side 2410*b* of the build platforms 2404, the rotatable clips 2208 can be used for both the first side 2410*a* and the second side 2410*b* of the build platforms 2404, or the fixed clips 2406 and/or the rotatable clips 2408 can each independently be substituted with any of the other coupling devices described herein. Moreover, although the remaining sides of the build platforms 2404 (e.g., corresponding to the edges of the build platforms 2404 that are orthogonal to direction X) are depicted as not being coupled to the carrier 2402 by any coupling devices, in other embodiments, one or both of the remaining sides can be coupled to the carrier 2402 via fixed clips 2406, rotatable clips 2408, and/or any of the other coupling devices described herein.

Figure 25:
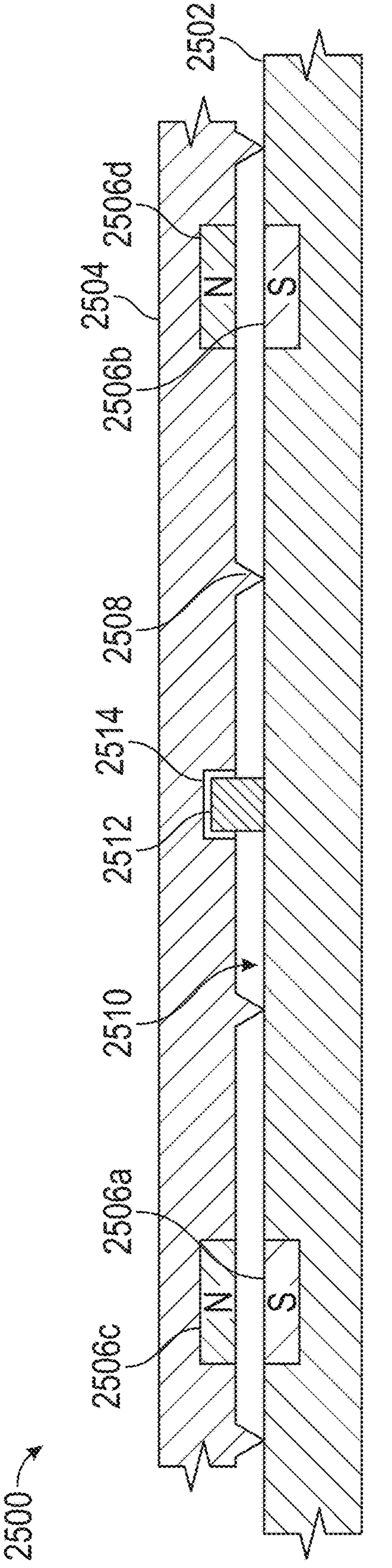
FIG. 25 is a side cross-sectional view of a modular build substrate including a plurality of magnets, in accordance with embodiments of the present technology.

FIG. 25 is a side cross-sectional view of a modular build substrate 2500 including a carrier 2502, a build platform 2504, and an attachment mechanism including a plurality of magnets 2506*a*-2506*d*, in accordance with embodiments of the present technology. The carrier 2502 and build platform 2504 can be generally similar to the other embodiments described herein (e.g., in connection with FIGS. 4-12). For instance, the carrier 2502 can be a tray, plate, film, sheet, or other generally planar substrate suitable for coupling to and supporting the build platform 2504 during an additive manufacturing process. The build platform 2504 can be a tray, plate, film, sheet, or other generally planar substrate suitable for coupling to and supporting at least one additively manufactured object thereon.

The build platform 2504 can be coupled to the carrier 2502 via the plurality of magnets 2506*a*-2506*b* (collectively, "magnets 2506"). In some embodiments, the carrier 2502 includes a first set of magnets (e.g., magnets 2506*a* and 2506*b*), and the build platform 2504 can include a second set of magnets (e.g., magnets 2506*c* and 2506*d*). The magnets 2506 can be situated such that the first set of magnets and the second set of magnets are attracted to one another, causing a coupling force between the carrier 2502 and the build platform 2504 to secure the build platform 2504 to the carrier 2502. For instance, the first set of magnets of the carrier 2502 can have a first polarity (e.g., the south/positive pole is oriented upward toward the build platform 2504, and the second set of magnets of the build platform 2504 can have a second, opposite polarity (e.g., the north/negative pole is oriented downward toward the carrier 2502). Each magnet in the carrier 2502 can be paired with a corresponding magnet in the build platform 2504 with the opposite polarity, thereby generating an attractive force between the magnets that pulls the carrier 2502 and build platform 2504 toward each other.

The magnets 2506 can be electromagnets or permanent magnets (e.g., made of a magnetic material). The magnets 2506 can emit a suitable magnetic field strength, e.g., at least 1 mT, 10 mT, or 100 mT. In some embodiments, multiple magnets may be employed (e.g., an assembly of magnetic pairs) to increase the overall attractive forces between the build platform 2504 and the carrier 2502. As depicted, the build platform 2504 can optionally include a plurality of protrusions 2508 defining a gap 2510 between the carrier 2502 and the build platform 2504, and the gap 2510 can be sufficiently small to maintain sufficient attractive forces between the magnets 2506 to secure the build platform 2504 to the carrier 2502.

The modular build substrate 2500 can further include registration features to align the build platform 2504 to the carrier 2502 in a predetermined position and/or orientation. In some embodiments, the carrier 2502 includes a first registration feature 2512, and the build platform 2504 includes a second registration feature 2514 that mates with the first registration feature 2512 to affix the position and/or orientation of the build platform 2504 relative to the carrier 2502. The first registration feature 2512 can be generally similar to the first registration feature 1722 of FIG. 17, and the second registration feature 2514 can be generally similar to the second registration feature 1724 of FIG. 17. For example, the first registration feature 2512 can be a protrusion extending from the carrier 2502 (e.g., a post, pin, bump), and the second registration feature 2514 can be a recess in the build platform 2504 (e.g., a hole, channel, aperture) that receives the first registration feature 2512. In other embodiments, the first registration feature 2512 can be a recess in the build platform 2504 and the second registration feature 2514 can be a protrusion in the carrier 2502.

In some embodiments, the configuration of FIG. 25 provides various advantages, such as providing a larger build area on the build platform 2504, providing easy to clean surfaces of the build platform 2504 and the carrier 2502, and/or case of manufacture. In some embodiments, the magnets 2506 can serve as flexible coupling devices to accommodate thermal expansion/shrinkage effects, e.g., caused by heating of one or more of the carrier 2502, build platform 2504, or objects carried thereon as described elsewhere herein.

Figure 26:
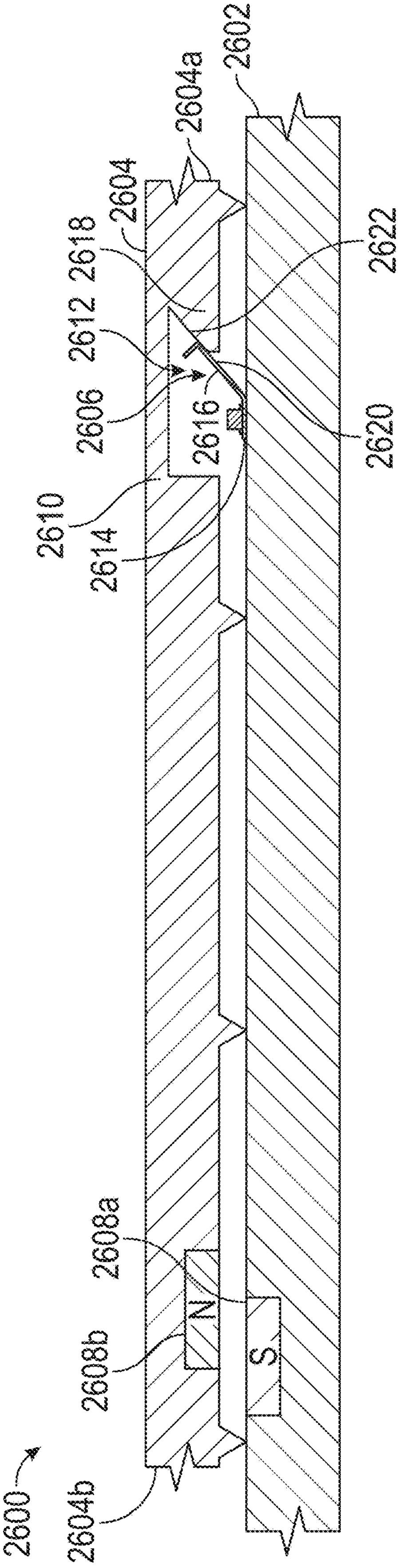
FIG. 26 is a side cross-sectional view of a modular build substrate including a spring clip and a plurality of magnets, in accordance with embodiments of the present technology.

FIG. 26 is a side cross-sectional view of a modular build substrate 2600 including a carrier 2602, a build platform 2604, and an attachment mechanism including a spring clip 2606 and a plurality of magnets 2608*a* and 2608*b*, in accordance with embodiments of the present technology. The carrier 2602 and build platform 2604 can be generally similar to the other embodiments described herein (e.g., in connection with FIGS. 4-12). For instance, the carrier 2602 can be a tray, plate, film, sheet, or other generally planar substrate suitable for coupling to and supporting the build platform 2604 during an additive manufacturing process. The build platform 2604 can be a tray, plate, film, sheet, or other generally planar substrate suitable for coupling to and supporting at least one additively manufactured object thereon.

A first side 2604*a* of the build platform 2604 can be coupled to the carrier 2602 via the spring clip 2606. The spring clip 2606 can serve as a flexible coupling device for securing the first side 2604*a* of the build platform 2604 to the carrier 2602. The spring clip 2606 can be generally similar to the internal spring clip 1606 of FIGS. 16A-16C and/or the internal spring clip 1806 of FIG. 18. In the illustrated embodiment, for example, the spring clip 2606 is configured to engage an internal portion 2610 of the build platform 2604. The internal portion 2610 can be at or proximate to a lower surface of the build platform 2604, and can define a recess 2612 that is configured to receive the spring clip 2606 therein when the build platform 2604 is placed on the carrier 2602.

In some embodiments, the spring clip 2606 includes a base portion 2614 and an engagement portion 2616. In some embodiments, the base portion 2614 and the engagement portion 2616 are integrally formed with each other and are each made of a spring material that is deformable and/or deflectable. The base portion 2614 can be coupled to the carrier 2602, and the engagement portion 2616 can be configured to engage an internal projection 2618 of the internal portion 2610 of the build platform 2604. The internal projection 2618 can be generally similar to the internal projection 1620 of FIGS. 16A-16C and/or the internal projection 1826 of FIG. 18. For instance, the internal projection 2618 can be a lip, flange, shoulder, or other suitable member for coupling to the spring clip 2606. The engagement portion 2616 of the spring clip 2606 can include a lower surface 2620 that directly contacts an upper surface 2622 of the internal projection 2618, thereby constraining lateral and vertical movement of the build platform 2604 relative to the carrier 2602. The upper surface 2622 of the internal projection 2618 can be angled toward the carrier 2602 to pull the internal projection 2618, and thus the build platform 2604, downward toward the carrier 2602. In other embodiments, however, the upper surface 2622 can instead be horizontal.

A second side 2604*b* of the build platform 2604 can be coupled to the carrier 2602 via the plurality of magnets 2608. In some embodiments, the carrier 2602 includes a first magnet 2608*a*, and the build platform includes a second magnet 2608*b*. The magnets 2608 can be situated such that the first magnet 2608*a* and the second magnet 2608*b* are attracted to one another, causing a coupling force between the carrier 2602 and the build platform 2604 to secure the second side 2604*b* of the build platform 2604 to the carrier 2602. For instance, the first magnet 2608*a* of the carrier 2502 can have a first polarity (e.g., the south/positive pole is oriented upward toward the build platform 2604, and the second magnet 2608*b* of the build platform 2604 can have a second, opposite polarity (e.g., the north/negative pole is oriented downward toward the carrier 2602).

In some embodiments, the second magnet 2608*b* is laterally offset from the first magnet 2608*a*. For example, the second magnet 2608*b* may be laterally closer to the spring clip 2606 than the first magnet 2608*a*. In some embodiments, this lateral offset imparts a magnetic force that biases the build platform 2604 to the left to bring the second magnet 2608*b* into closer alignment with the first magnet 2608*a*. The biasing of the build platform 2604, and thereby the internal projection 2618, can enhance the engagement of the spring clip 2606 with the internal projection 2618. For example, the internal projection 2618 can be pushed leftward against the spring clip 2606, thereby increasing the spring force exerted onto the internal projection 2618 by the spring clip 2606. The effect of this biasing can be controlled by varying the strength of the first magnet 2608*a*, the second magnet 2608*b*, or both.

Alternatively, or in combination, the carrier 2602 can include an external spring clip (e.g., similar to the external spring clip 1506 of FIG. 15, the external spring clip 1706 of FIG. 17, and/or the external spring clip 1808 of FIG. 18) that is configured to engage an external portion of the second side 2604*b* of the build platform 2604 (e.g., an external projection similar to the external projection 1516 of FIG. 15, the external projection 1716 of FIG. 17, and/or the external projection 1828 of FIG. 18). In such embodiments, the lateral offset between the first magnet 2606*a* and the second magnet 2606*b* may be reversed (e.g., the first magnet 2606*a* may be closer to the external spring clip than the second magnet 2606*b*). The resultant magnetic force can bias the build platform 2604 to the right, which may further enhance the engagement between the external projection and the external spring clip. For instance, the external projection can be pushed rightward against the external spring clip, thereby increasing the spring force exerted onto the external projection by the external spring clip.

Figure 27:
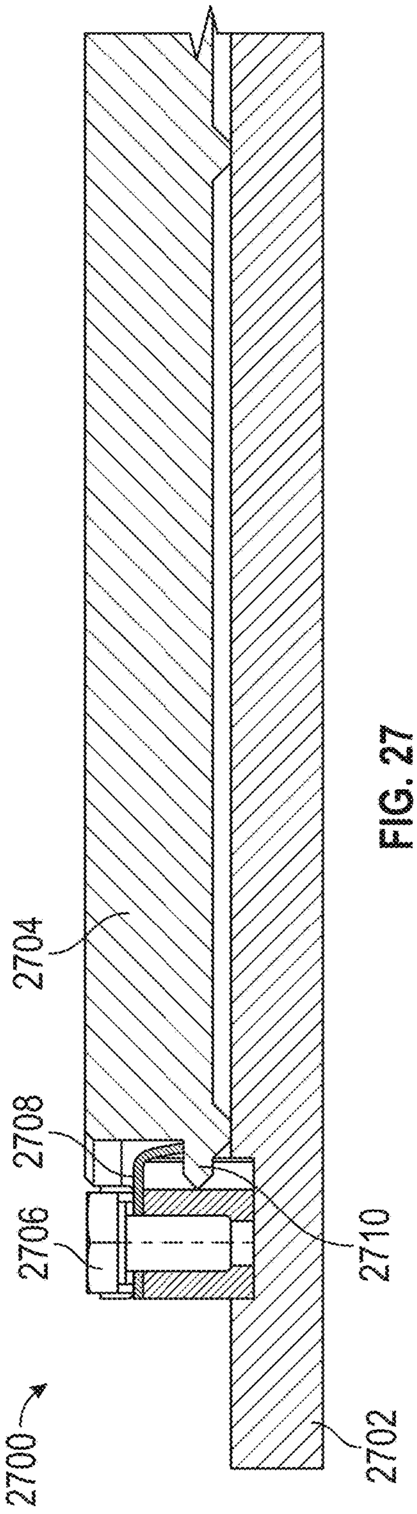
FIG. 27 is a side cross-sectional view of a portion of a modular build substrate including a carrier, a build platform, and an attachment mechanism including a bolt, in accordance with embodiments of the present technology.

FIG. 27 is a side cross-sectional view of a portion of a modular build substrate 2700 including a carrier 2702, a build platform 2704, and an attachment mechanism including a bolt 2706, in accordance with embodiments of the present technology. The carrier 2702 and build platform 2704 can be generally similar to the other embodiments described herein (e.g., in connection with FIGS. 4-12). For instance, the carrier 2702 can be a tray, plate, film, sheet, or other generally planar substrate suitable for coupling to and supporting the build platform 2704 during an additive manufacturing process. The build platform 2704 can be a tray, plate, film, sheet, or other generally planar substrate suitable for coupling to and supporting at least one additively manufactured object thereon.

One or both sides of the build platform 2704 can be secured to the carrier 2702 via a bolt 2706. In the illustrated embodiment, the bolt 2706 is not coupled directly to the build platform 2704, but is instead coupled to a bar 2708 (e.g., a strip of sheet metal) which engages the build platform 2704. For instance, the bar 2708 can be configured to push down against a projection 2710 extending from a lateral surface of the build platform 2704 to couple the build platform 2704 to the carrier 2702. This configuration can secure the build platform 2704 without reducing the build area of the build platform 2704.

Figure 28:
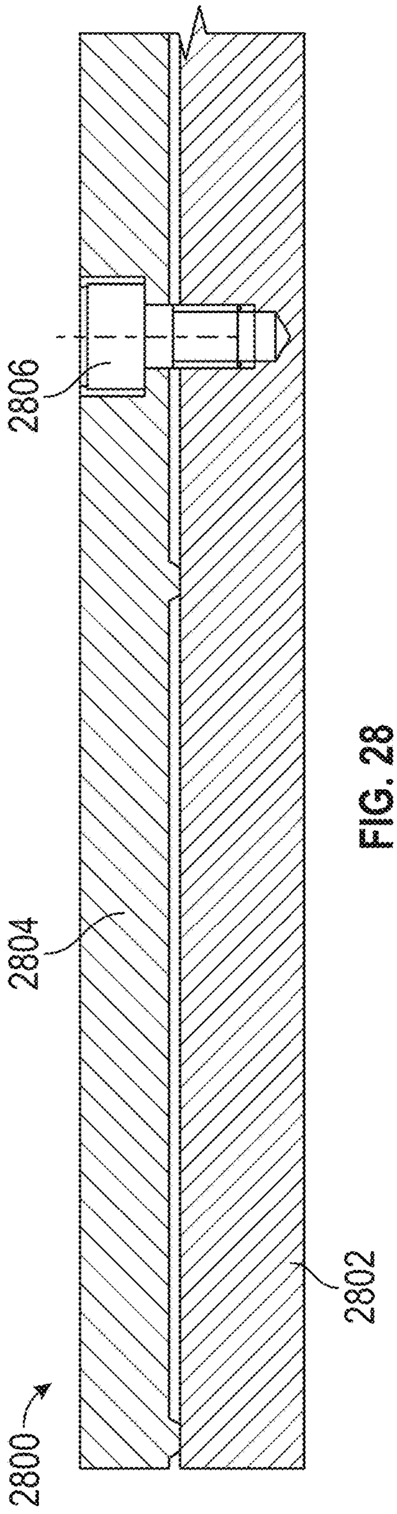
FIG. 28 is a side cross-sectional view of a portion of a modular build substrate including a carrier, a build platform, and an attachment mechanism including a bolt, in accordance with embodiments of the present technology.

FIG. 28 is a side cross-sectional view of a portion of a modular build substrate 2800 including a carrier 2802, a build platform 2804, and an attachment mechanism including a bolt 2806, in accordance with embodiments of the present technology. The carrier 2802 and build platform 2804 can be generally similar to the other embodiments described herein (e.g., in connection with FIGS. 4-12). For instance, the carrier 2802 can be a tray, plate, film, sheet, or other generally planar substrate suitable for coupling to and supporting the build platform 2804 during an additive manufacturing process. The build platform 2804 can be a tray, plate, film, sheet, or other generally planar substrate suitable for coupling to and supporting at least one additively manufactured object thereon.

As shown in FIG. 28, the bolt 2806 can extend through the build platform 2804 and the carrier 2802 to directly couple the build platform 2804 to the carrier 2802. Although the bolt 2806 is depicted as being located at the central portion of the build platform 2804, in other embodiments, the bolt 2806 can alternatively or additionally be located near the edges of the build platform 2804.

Figure 29:
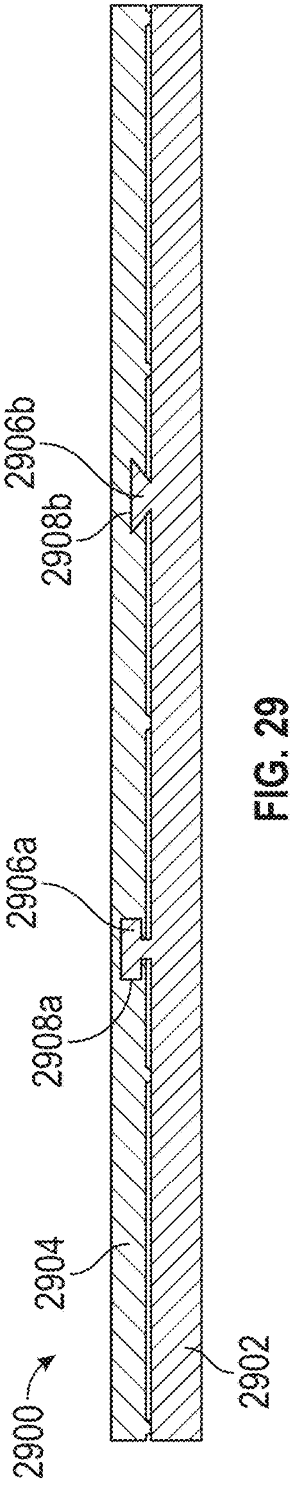
FIG. 29 is a side cross-sectional view of a modular build substrate including a carrier, a build platform, and registration features, in accordance with embodiments of the present technology.

FIG. 29 is a side cross-sectional view of a modular build substrate 2900 including a carrier 2902, a build platform 2904, and registration features, in accordance with embodiments of the present technology. The carrier 2902 and build platform 2904 can be generally similar to the other embodiments described herein (e.g., in connection with FIGS. 4-12). For instance, the carrier 2902 can be a tray, plate, film, sheet, or other generally planar substrate suitable for coupling to and supporting the build platform 2904 during an additive manufacturing process. The build platform 2904 can be a tray, plate, film, sheet, or other generally planar substrate suitable for coupling to and supporting at least one additively manufactured object thereon.

The modular build substrate 2900 can include one or more registration features to align the build platform 2904 to the carrier 2902 in a predetermined position and/or orientation. In some embodiments, the carrier 2902 includes one or more first registration features 2906*a*, 2906*b*, and the build platform 2904 includes one or more second registration features 2908*a*, 2908*b* that each mate with the corresponding first registration feature to affix the position and/or orientation of the build platform 2904 relative to the carrier 2902. For example, the first registration features 2906*a*, 2906*b* can each be a protrusion extending from the carrier 2902 (e.g., a post, pin, bump), and the second registration features 2908*a*, 2908*b* can each be a recess in the build platform 2904 (e.g., a hole, channel, aperture) that receives the corresponding first registration feature. In some embodiments, the build platform 2904 is coupled to the carrier 2902 by aligning the registration features to each other, then sliding the build platform 2904 laterally onto the carrier 2902 (e.g., along the direction into the plane of the page).

The shape of the registration features may be varied as desired. For instance, in the illustrated embodiment, the first registration feature 2906*a* and the second registration feature 2908*a* each have a rectangular shape, whereas the first registration feature 2906*b* and the second registration feature 2908*b* each have a trapezoidal and/or dovetailed shape. Other shapes are also possible, such as a square shape, circular shape, oval shape, triangular shape, T-shape, notched shape, etc. Some or all of the registration features may have the same shape, or some or all of the registration features may have different shapes. Moreover, any suitable number of registration features may be used, such as one, two, three, four, five or more registration features. Optionally, a bayonet fitting mechanism can be incorporated into the carrier 2902 and build platform 2904 to further improve case of use.

Figure 30:
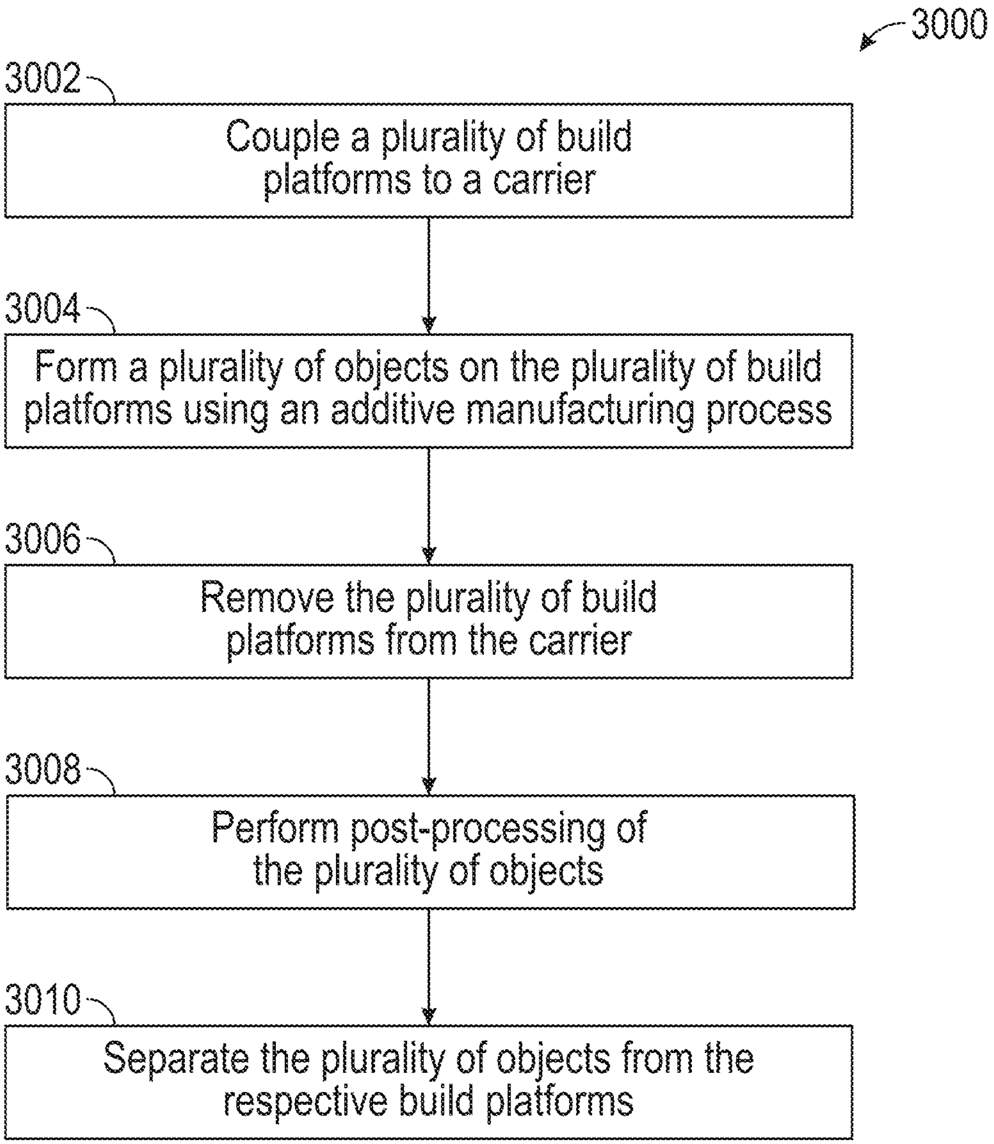
FIG. 30 is a flow diagram illustrating a method for fabricating additively manufactured objects, in accordance with embodiments of the present technology.

FIG. 30 is a flow diagram illustrating a method 3000 for fabricating additively manufactured objects, in accordance with embodiments of the present technology. The method 3000 can be performed by any of the systems and devices described herein, such as any of the embodiments of FIGS. 1-29. In some embodiments, some or all of the processes of the method 3000 are implemented as computer-readable instructions (e.g., program code) that are configured to be executed by one or more processors of a computing device, such as a controller of an additive manufacturing system and/or a post-processing system. The method 3000 can be combined with any of the other methods described herein, such as the method 100 of FIG. 1.

The method 3000 can begin at block 3002 with coupling a plurality of build platforms to a carrier. The build platforms can be modular build platforms that are releasably coupled to the carrier to form a modular build substrate for an additive manufacturing process, as described herein in connection with FIGS. 4-29. For example, the build platforms can be coupled to the carrier via a releasable attachment technique, such as via vacuum, mechanical fixation (e.g., interference fit, snap fit, interlocking features, fasteners, form-fitting inserts, clamps, springs, hinged features), electromagnetic fixation, magnetic fixation, form-fitting inserts, or suitable combinations thereof. When coupled to the carrier, the build platforms can collectively define a build plane for an additive manufacturing process. The build plane can have an area of at least 1000 $cm^2$, 1500 $cm^2$, 2000 $cm^2$, 2500 $cm^2$, 3000 $cm^2$, 3500 $cm^2$, 4000 $cm^2$, 4500 $cm^2$, or 5000 $cm^2$. The build plane can have a maximum vertical deviation that is less than or equal to 500 μm, 400 μm, 300 μm, 200 μm, 100 μm, or 50 μm, and/or within a range from a range from 50 μm to 500 μm, or 500 μm to 1 mm.

At block 3004, the method 3000 can include forming a plurality of objects on the plurality of build platforms using an additive manufacturing process. The objects can be dental appliances, such as aligners, retainers, brackets and wires, whitening trays, mouth guards, night guards, anti-bruxing or anti-grinding devices, tongue thrust devices, palatal expanders, sleep apnea devices, anti-snoring devices, attachment templates, mandibular advancement devices, prefabricated attachment templates, etc. The additive manufacturing process can use any of the additive manufacturing techniques and systems described herein. For instance, the additive manufacturing process can be a lithography-based additive manufacturing process in which the objects are fabricated from a curable material in a layer-by-layer manner. Each build platform can receive and support one or more of the objects during the additive manufacturing process. For instance, a single build platform can receive one, two, three, four, five, 10, 20, or more objects. During the additive manufacturing process, the plurality of build platforms can remain coupled to the carrier, such that the carrier acts as a fixed support for the build platforms and the objects thereon.

At block 3006, the method 3000 can continue with removing the plurality of build platforms from the carrier. The removal can be performed after the additive manufacturing process is complete. In some embodiments, the build platforms are removed manually by a human operator, while in other embodiments, the build platforms are removed automatically (e.g., by a robotic assembly or other automated mechanism). The build platforms can be removed while the carrier remains within the additive manufacturing system, or the carrier can be removed from the additive manufacturing system before removing the build platforms from the carrier.

At block 3008, the method 3000 can include performing post-processing of the plurality of objects. The post-processing can include any of the operations described herein, such as removing residual material from the objects, post-curing the objects, washing the object, trimming support structures from the objects, etc. The objects can remain attached to their respective build platforms during post-processing, such that the build platforms are used to support and/or manipulate the objects during post-processing. In some embodiments, the process of block 3008 involves placing the build platforms with the attached objects into one or more post-processing devices, such as centrifuges, solvent baths, post-curing ovens, furnaces, etc. The individual build platforms can be sufficiently small to fit within the post-curing device(s). For instance, each build platform can have an area no greater than 1000 $cm^2$, 900 $cm^2$, 800 $cm^2$, 700 $cm^2$, 600 $cm^2$, 500 $cm^2$, 400 $cm^2$, 300 $cm^2$, 200 $cm^2$, or 100 $cm^2$.

At block 2710, the method 3000 can include separating the plurality of objects from the respective build platforms. The separation can be performed using physical techniques, such as scraping, peeling, fracturing sacrificial portions of the objects, etc. Optionally, in embodiments where the build platform includes an interface layer between the surface of the build platform and the objects (e.g., as described above in connection with FIG. 12), the separation can be performed by disintegrating, destabilizing, or otherwise removing the interface layer via physical and/or chemical techniques (e.g., scraping, peeling, dissolving, melting, etching). The separated objects can be subjected to additional post-processing and/or prepared for packaging and shipment. In some embodiments, the build platforms are reassembled onto the carrier for reuse in a subsequent additive manufacturing operation.

The method 3000 illustrated in FIG. 30 can be modified in many different ways. For example, the ordering of the processes shown in FIG. 30 can be varied. Some of the processes of the method 3000 can be omitted and/or the method 3000 can include additional processes not shown in FIG. 30. For instance, the method 3000 can further include coupling a prefabricated element to at least one build platform, such that the prefabricated element becomes part of the object(s) formed on that build platform (e.g., as described above in connection with FIGS. 11A-11H).

Figure 31:
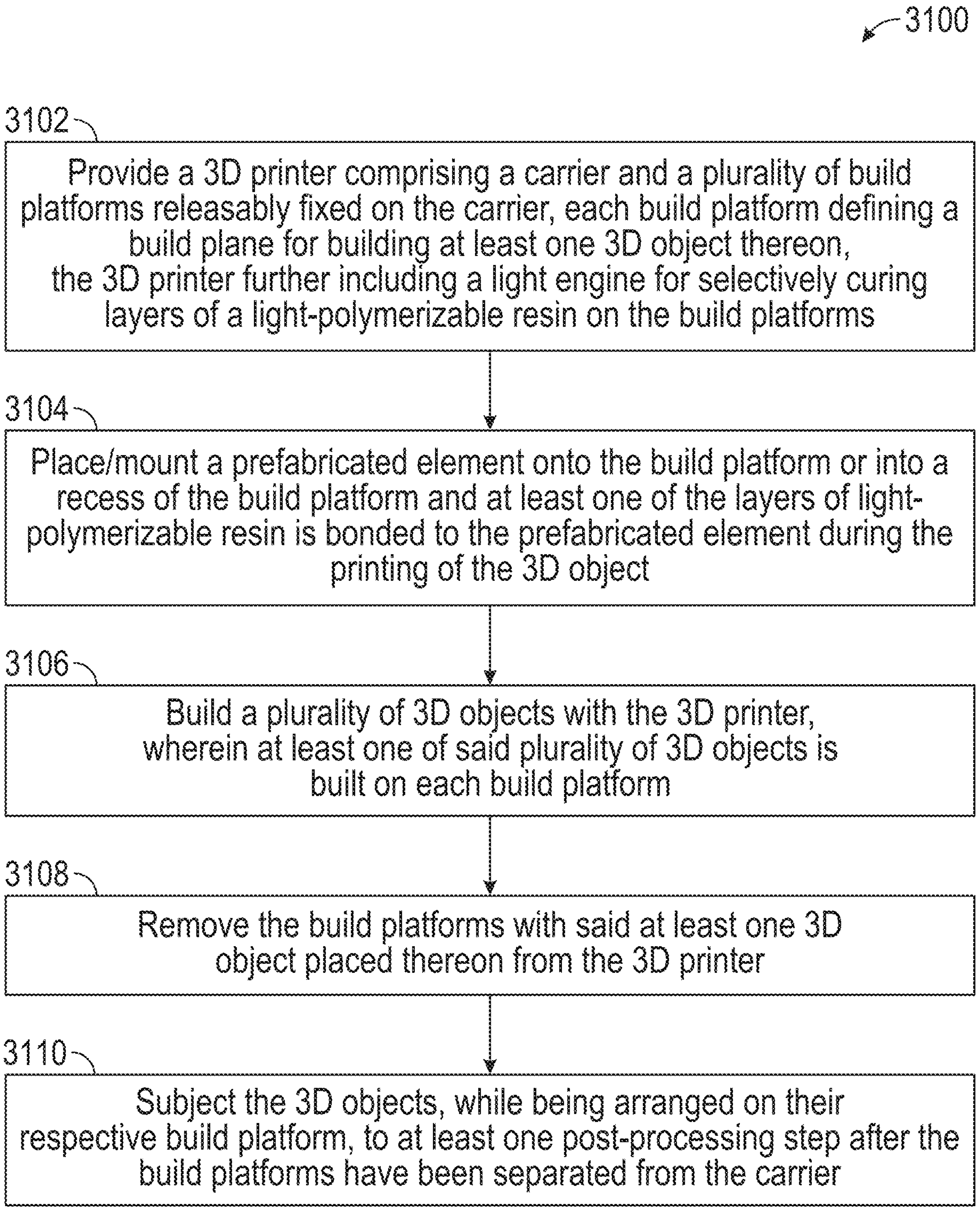
FIG. 31 is a flow diagram illustrating a method for fabricating additively manufactured objects, in accordance with embodiments of the present technology.

FIG. 31 is a flow diagram illustrating a method 3100 for fabricating additively manufactured objects, in accordance with embodiments of the present technology. The method 3100 can be performed by any of the systems and devices described herein, such as any of the embodiments of FIGS. 1-29. In some embodiments, some or all of the processes of the method 3100 are implemented as computer-readable instructions (e.g., program code) that are configured to be executed by one or more processors of a computing device, such as a controller of an additive manufacturing system and/or a post-processing system. The method 3100 can be combined with any of the other methods described herein, such as the method 100 of FIG. 1 and/or the method 3000 of FIG. 30.

The method 3100 can begin at block 3102, in which a 3D printer comprising a carrier and a plurality of build platforms releasably fixed on the carrier is provided. One or more of the build platforms can define a build plane for building at least one 3D object thereon. The 3D printer may include a light engine for selectively curing layers of a light-polymerizable resin on the build platforms.

At block 3104, a prefabricated element can be placed and/or mounted onto the build platform or into a recess of the build platform, and at least one of the layers of light-polymerizable resin is bonded to the prefabricated element during the printing of the 3D object.

At block 3106, a plurality of 3D objects are built with the 3D printer. At least one of said plurality of 3D objects can be built on each build platform.

At block 3108, the build platforms can be removed with said at least one 3D object placed thereon from the 3D printer.

At block 3110, the 3D objects, while being arranged on their respective build platform, can be subjected to at least one post-processing step after the build platforms have been separated from the carrier.

The method 3100 illustrated in FIG. 31 can be modified in many different ways. For example, the ordering of the processes shown in FIG. 31 can be varied. Some of the processes of the method 3100 can be omitted (e.g., the process of block 3104) and/or the method 3100 can include additional processes not shown in FIG. 31.

III. Dental Appliances and Associated Methods

Figure 32A:
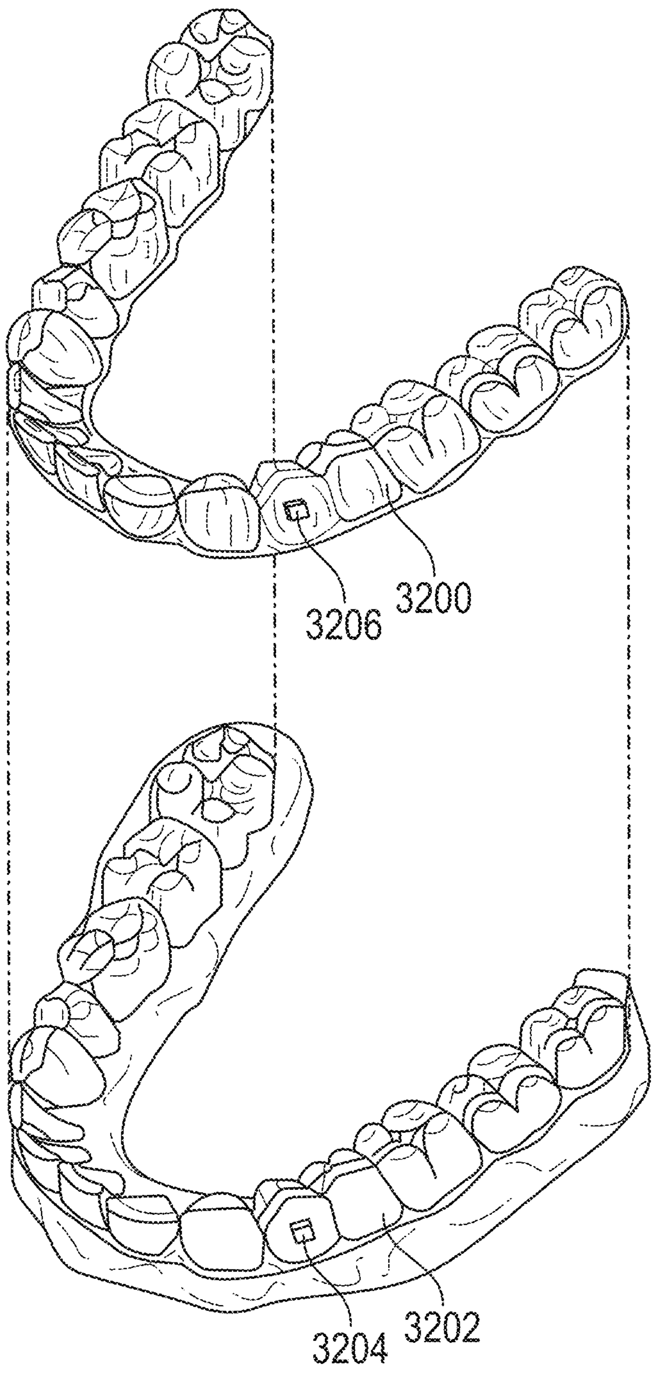
FIG. 32A illustrates a representative example of a tooth repositioning appliance configured in accordance with embodiments of the present technology.

FIG. 32A illustrates a representative example of a tooth repositioning appliance 3200 configured in accordance with embodiments of the present technology. The appliance 3200 can be manufactured using any of the systems, methods, and devices described herein. The appliance 3200 (also referred to herein as an "aligner") can be worn by a patient in order to achieve an incremental repositioning of individual teeth 3202 in the jaw. The appliance 3200 can include a shell (e.g., a continuous polymeric shell or a segmented shell) having teeth-receiving cavities that receive and resiliently reposition the teeth. The appliance 3200 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance.

The appliance 3200 can fit over all teeth present in an upper or lower jaw, or less than all of the teeth. The appliance 3200 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 3200 can be a generic appliance configured to receive the teeth, but not necessarily shaped to match the topography of the patient's teeth. In some cases, only certain teeth received by the appliance 3200 are repositioned by the appliance 3200 while other teeth can provide a base or anchor region for holding the appliance 3200 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In some embodiments, no wires or other means are provided for holding the appliance 3200 in place over the teeth. In some cases, however, it may be desirable or necessary to provide individual attachments 3204 or other anchoring elements on teeth 3202 with corresponding receptacles 3206 or apertures in the appliance 3200 so that the appliance 3200 can apply a selected force on the tooth. Representative examples of appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 32B:
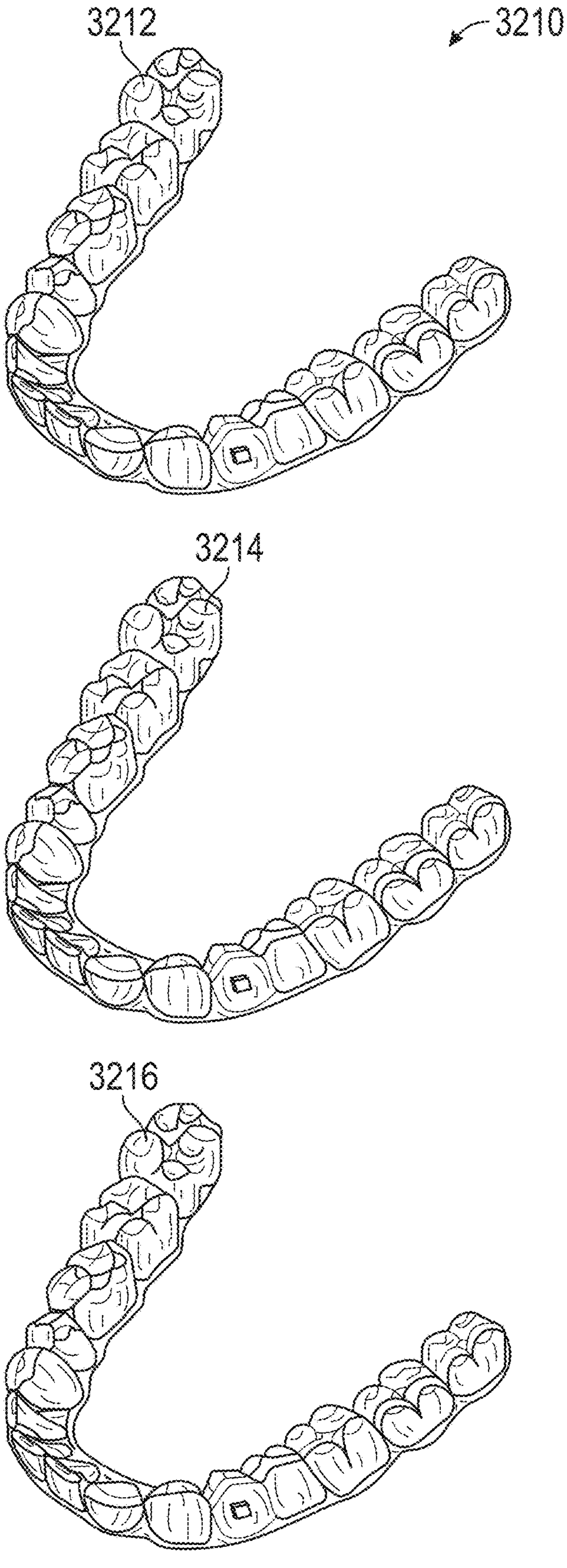
FIG. 32B illustrates a tooth repositioning system including a plurality of appliances, in accordance with embodiments of the present technology.

FIG. 32B illustrates a tooth repositioning system 3210 including a plurality of appliances 3212, 3214, 3216, in accordance with embodiments of the present technology. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 3210 can include a first appliance 3212 corresponding to an initial tooth arrangement, one or more intermediate appliances 3214 corresponding to one or more intermediate arrangements, and a final appliance 3216 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 32C:
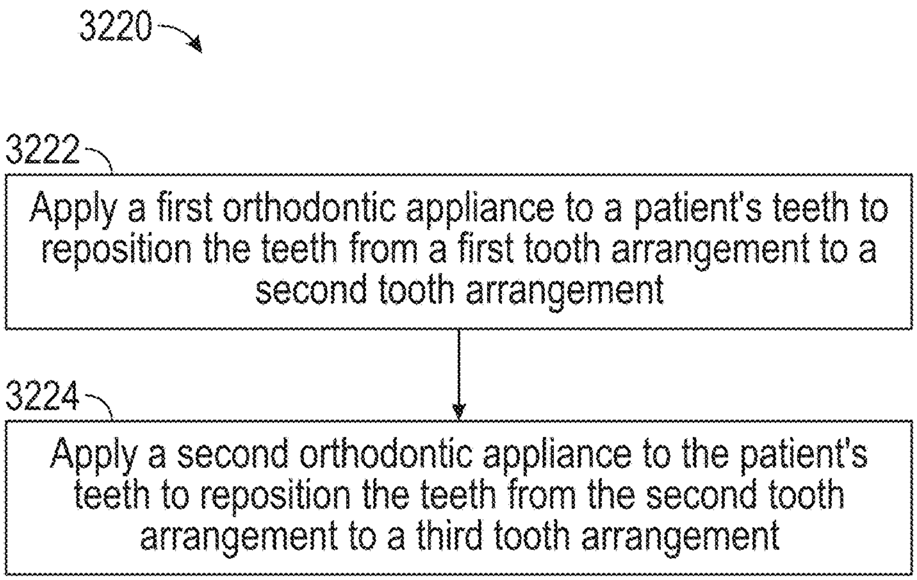
FIG. 32C illustrates a method of orthodontic treatment using a plurality of appliances, in accordance with embodiments of the present technology.

FIG. 32C illustrates a method 3220 of orthodontic treatment using a plurality of appliances, in accordance with embodiments of the present technology. The method 3220 can be practiced using any of the appliances or appliance sets described herein. In block 3222, a first orthodontic appliance is applied to a patient's teeth in order to reposition the teeth from a first tooth arrangement to a second tooth arrangement. In block 3224, a second orthodontic appliance is applied to the patient's teeth in order to reposition the teeth from the second tooth arrangement to a third tooth arrangement. The method 3220 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 33:
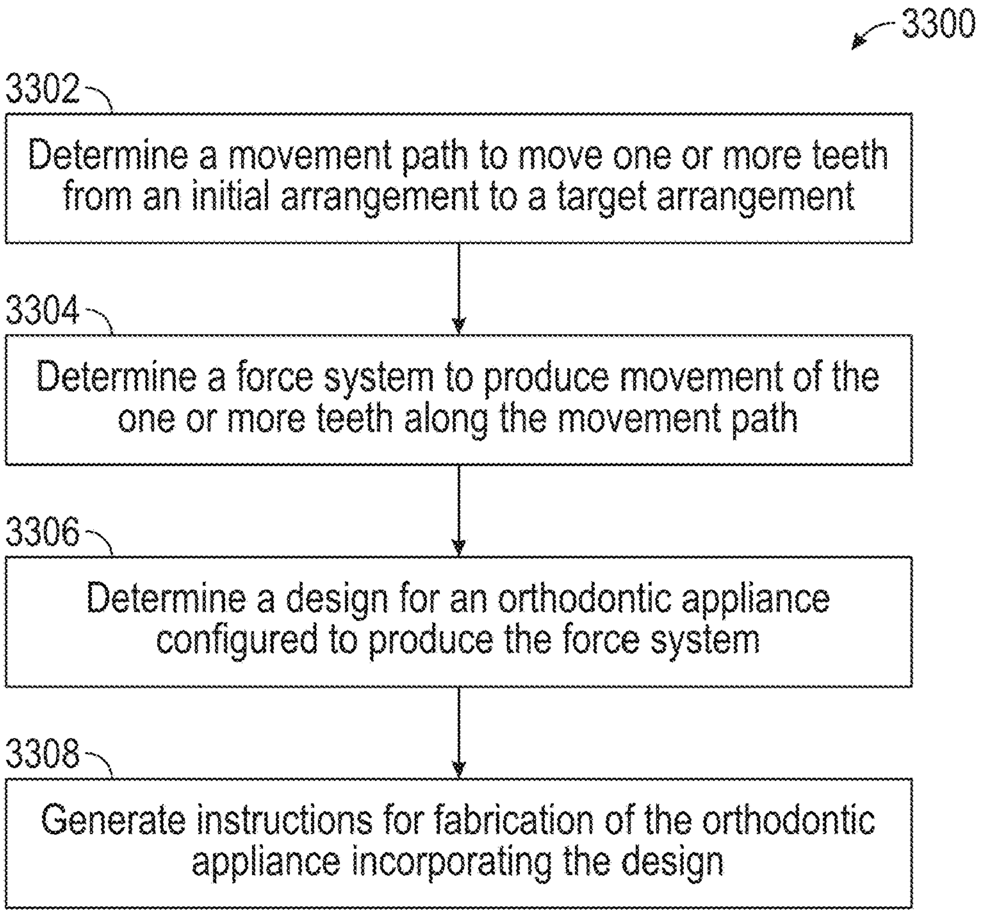
FIG. 33 illustrates a method for designing an orthodontic appliance, in accordance with embodiments of the present technology.

FIG. 33 illustrates a method 3300 for designing an orthodontic appliance, in accordance with embodiments of the present technology. The method 3300 can be applied to any embodiment of the orthodontic appliances described herein. Some or all of the steps of the method 3300 can be performed by any suitable data processing system or device, e.g., one or more processors configured with suitable instructions.

In block 3302, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 3304, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, block 3304 can involve determining a particular type of force to be applied (e.g., extrusive force, intrusive force, translational force, rotational force, tipping force, torquing force, etc.) without calculating the specific magnitude and/or direction of the force.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 3306, a design for an orthodontic appliance configured to produce the force system is determined. The design can include the appliance geometry, material composition and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 3308, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 3300 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 3300 may be performed with any suitable fabrication system or device, such as the embodiments described herein. Some of the steps may be optional, e.g., the process of block 3304 can be omitted, such that the orthodontic appliance is designed based on the desired tooth movements and/or determined tooth movement path, rather than based on a force system. Moreover, the order of the steps can be varied as desired.

Figure 34:
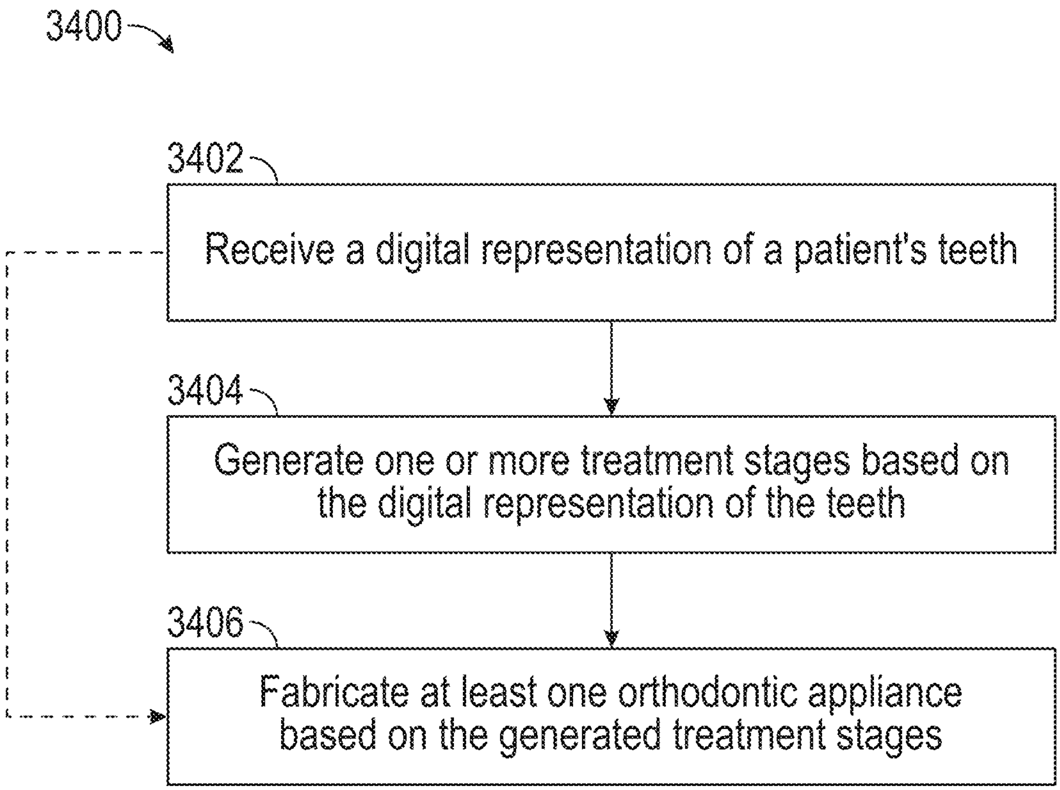
FIG. 34 illustrates a method for digitally planning an orthodontic treatment and/or design or fabrication of an appliance, in accordance with embodiments of the present technology.

FIG. 34 illustrates a method 3400 for digitally planning an orthodontic treatment and/or design or fabrication of an appliance, in accordance with embodiments. The method 3400 can be applied to any of the treatment procedures described herein and can be performed by any suitable data processing system.

In block 3402, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 3404, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 3406, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 34, design and/or fabrication of an orthodontic appliance, and perhaps a particular orthodontic treatment, may include use of a representation of the patient's teeth (e.g., including receiving a digital representation of the patient's teeth (block 3402)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537,406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment placement devices, e.g., appliances used to position prefabricated attachments on a person's teeth in accordance with one or more aspects of a treatment plan. Examples of attachment placement devices (also known as "attachment placement templates" or "attachment fabrication templates") can be found at least in: U.S. application Ser. No. 17/249,218, entitled "Flexible 3D Printed Orthodontic Device," filed Feb. 24, 2021; U.S. application Ser.

No. 16/366,686, entitled "Dental Attachment Placement Structure," filed Mar. 27, 2019; U.S. application Ser. No. 15/674,662, entitled "Devices and Systems for Creation of Attachments," filed Aug. 11, 2017; U.S. Pat. No. 11,103, 330, entitled "Dental Attachment Placement Structure," filed Jun. 14, 2017; U.S. application Ser. No. 14/963,527, entitled "Dental Attachment Placement Structure," filed Dec. 9, 2015; U.S. application Ser. No. 14/939,246, entitled "Dental Attachment Placement Structure," filed Nov. 12, 2015; U.S. application Ser. No. 14/939,252, entitled "Dental Attachment Formation Structures," filed Nov. 12, 2015; and U.S. Pat. No. 9,700,385, entitled "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled "Releasable Palatal Expanders," filed Apr. 10, 2019; U.S. application Ser. No. 16/022,552, entitled "Devices, Systems, and Methods for Dental Arch Expansion," filed Jun. 28, 2018; U.S. Pat. No. 11,045,283, entitled "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled "Methods and Apparatuses for Customizing a Rapid Palatal Expander," filed Dec. 4, 2017; and U.S. Pat. No. 7,192,273, entitled "System and Method for Palatal Expansion," filed Aug. 7, 2003; all of which are incorporated by reference herein in their entirety.

EXAMPLES

The following examples are included to further describe some aspects of the present technology, and should not be used to limit the scope of the technology.

Example 1. An assembly for supporting 3D objects during an additive manufacturing process, the assembly comprising:

- a plurality of build platforms, each build platform configured to support one or more 3D objects during the additive manufacturing process;
- a carrier configured to support the plurality of build platforms; and
- an attachment mechanism configured to releasably couple the plurality of build platforms to the carrier during the additive manufacturing process such that the plurality of build platforms collectively form a build plane having a vertical deviation no greater than 500 μm.

Example 2. The assembly of Example 1, wherein each build platform comprises:

- an upper surface configured to support the one or more 3D objects,
- a lower surface opposite the upper surface, and
- one or more protrusions formed on the lower surface such that when the build platform is releasably coupled to the carrier, a gap is formed between the lower surface of the build platform and an upper surface of the carrier.

Example 3. The assembly of Example 2, wherein the one or more protrusions each have a height within a range from 0.1 mm to 1 mm.

Example 4. The assembly of any one of Examples 1 to 3, wherein the attachment mechanism comprises, for each build platform:

- a first coupling device at or proximate to a first side of the build platform, and
- a second coupling device at or proximate to a second side of the build platform.

Example 5. The assembly of Example 4, wherein the first coupling device uses a different type of coupling than the second coupling device.

Example 6. The assembly of Example 5, wherein the first coupling device is a flexible coupling device and the second coupling device is a rigid coupling device.

Example 7. The assembly of Example 5 or 6, wherein the first coupling device comprises a spring material and the second coupling device does not comprise a spring material.

Example 8. The assembly of Example 4, wherein the first coupling device uses the same type of coupling as the second coupling device.

Example 9. The assembly of any one of Examples 1 to 8, wherein the attachment mechanism comprises a spring clip configured to releasably couple to a build platform of the plurality of build platforms.

Example 10. The assembly of Example 9, wherein the spring clip is configured to releasably couple to an external portion of the build platform.

Example 11. The assembly of Example 9, wherein the spring clip is configured to releasably couple to an internal portion of the build platform.

Example 12. The assembly of any one of Examples 9 to 11, wherein the spring clip is configured to releasably couple to a recess formed in the build platform.

Example 13. The assembly of Example 12, wherein the recess is formed in a lower surface of the build platform.

Example 14. The assembly of any one of Examples 1 to 13, wherein the attachment mechanism comprises a rotatable clip configured to releasably couple to a build platform of the plurality of build platforms.

Example 15. The assembly of Example 14, wherein the rotatable clip is rotatable between a closed configuration and an open configuration.

Example 16. The assembly of Example 15, wherein:

- when in the closed configuration, the rotatable clip contacts the build platform, and
- when in the open configuration, the rotatable clip is spaced apart from the build platform.

Example 17. The assembly of any one of Examples 1 to 16, wherein the attachment mechanism comprises a first magnet configured to releasably couple to a second magnet of a build platform of the plurality of build platforms.

Example 18. The assembly of any one of Examples 1 to 17, wherein the carrier comprises a first registration feature, a build platform of the plurality of build platforms comprises a second registration feature, and the first registration feature is configured to engage the second registration feature to align the build platform on the carrier in a fixed position and orientation.

Example 19. The assembly of any one of Examples 1 to 18, wherein the build plane is a single continuous build plane.

Example 20. The assembly of any one of Examples 1 to 18, wherein the build plane comprises a plurality of discrete regions.

Example 21. The assembly of any one of Examples 1 to 20, wherein the build plane has a total surface area of at least 1000 $cm^2$.

Example 22. The assembly of any one of Examples 1 to 21, wherein the additive manufacturing process comprises building up the one or more 3D objects of each build platform from a plurality of layers of a curable material.

Example 23. The assembly of any one of Examples 1 to 22, wherein the carrier includes or is thermally coupled to a heat source.

Example 24. The assembly of Example 23, wherein the heat source is configured to heat the build plane to a temperature within a range from 30° C. to 200° C.

Example 25. The assembly of any one of Examples 1 to 24, wherein the one or more 3D objects comprise one or more dental appliances.

Example 26. A system for manufacturing 3D objects, the system comprising:

- the assembly of any one of Examples 1 to 25; and
- a printer assembly configured to receive the assembly, wherein the printer assembly comprises:
  - a source of a curable material, and
  - an energy source configured to output energy toward the curable material to form the one or more 3D objects on each build platform of the plurality of build platforms of the assembly according to an additive manufacturing process.

Example 27. The system of Example 26, further comprising a stationary base, wherein the carrier of the assembly is releasably coupled to the stationary base.

Example 28. The system of Example 26 or 27, wherein the curable material comprises a polymerizable resin.

Example 29. The system of any one of Examples 26 to 28, wherein the printer assembly comprises a carrier film configured to convey a layer of the curable material toward the assembly.

Example 30. The system of Example 29, wherein the printer assembly is configured to move relative to the assembly while the energy source outputs energy toward the layer of curable material.

Example 31. The system of any one of Examples 26 to 28, wherein the source of the curable material comprises a reservoir of the curable material, and the assembly is positioned within the reservoir.

Example 32. The system of any one of Examples 26 to 31, further comprising at least one post-processing device configured to perform at least one post-processing operation on the one or more 3D objects of least one build platform while the one or more 3D objects remain on the at least one build platform and while the at least one build platform is separated from the carrier.

Example 33. The system of Example 32, wherein the at least one post-processing device comprises one or more of a centrifuge, a solvent bath, or a post-curing oven.

Example 34. A method comprising:

- coupling a plurality of build platforms to a carrier to form a build plane having a vertical deviation no greater than 500 μm;
- forming a plurality of 3D objects on the plurality of build platforms using an additive manufacturing process, wherein each build platform receives one or more 3D objects thereon; and
- removing the plurality of build platforms from the carrier after the additive manufacturing process.

Example 35. The method of Example 34, wherein each build platform comprises:

- an upper surface configured to support the one or more 3D objects,
- a lower surface opposite the upper surface, and
- one or more protrusions formed on the lower surface such that when the build platform is coupled to the carrier, a gap is formed between the lower surface of the build platform and an upper surface of the carrier.

Example 36. The method of Example 35, wherein the one or more protrusions each have a height within a range from 0.1 mm to 1 mm.

Example 37. The method of any one of Examples 34 to 36, wherein each build platform is coupled to the carrier by:

- coupling a first side of the build platform to the carrier via a first coupling device, and
- coupling a second side of the build platform to the carrier via a second coupling device.

Example 38. The method of Example 37, wherein the first coupling device uses a different type of coupling than the second coupling device.

Example 39. The method of Example 38, wherein the first coupling device is a flexible coupling device and the second coupling device is a rigid coupling device.

Example 40. The method of Example 38 or 39, wherein the first coupling device comprises a spring material and the second coupling device does not comprise a spring material.

Example 41. The method of Example 37, wherein the first coupling device uses the same type of coupling as the second coupling device.

Example 42. The method of any one of Examples 34 to 41, wherein coupling the plurality of build platforms to the carrier comprises engaging a build platform of the plurality of build platforms with a spring clip.

Example 43. The method of Example 42, wherein the spring clip engages an external portion of the build platform.

Example 44. The method of Example 42, wherein the spring clip engages an internal portion of the build platform.

Example 45. The method of any one of Examples 42 to 44, wherein the spring clip engages a recess formed in the build platform.

Example 46. The method of Example 45, wherein the recess is formed in a lower surface of the build platform.

Example 47. The method of any one of Examples 34 to 46, wherein coupling the plurality of build platforms to the carrier comprises engaging a build platform of the plurality of build platforms with a rotatable clip.

Example 48. The method of Example 47, wherein the rotatable clip is rotatable between a closed configuration and an open configuration.

Example 49. The method of Example 48, wherein:

- when in the closed configuration, the rotatable clip engages the build platform, and
- when in the open configuration, the rotatable clip is disengaged from the build platform.

Example 50. The method of any one of Examples 34 to 49, wherein coupling the plurality of build platforms to the carrier comprises engaging a first magnet of the carrier with a second magnet of a build platform of the plurality of build platforms.

Example 51. The method of any one of Examples 34 to 50, wherein coupling the plurality of build platforms to the carrier comprises aligning a build platform of the plurality of build platforms to the carrier using a first registration feature on the build platform and a second registration feature on the carrier.

Example 52. The method of any one of Examples 34 to 51, wherein the build plane is a single continuous build plane.

Example 53. The method of any one of Examples 34 to 51, wherein the build plane comprises a plurality of discrete regions.

Example 54. The method of any one of Examples 34 to 53, wherein the build plane has a total surface area of at least 1000 $cm^2$.

Example 55. The method of any one of Examples 34 to 54, wherein the additive manufacturing process comprises building up the one or more 3D objects of each build platform from a plurality of layers of a curable material.

Example 56. The method of any one of Examples 34 to 55, further comprising heating the build plane during the additive manufacturing process.

Example 57. The method of Example 56, wherein the build plane is heated to a temperature within a range from 30° C. to 200° C.

Example 58. The method of any one of Examples 34 to 57, further comprising performing post-processing of the one or more 3D objects of at least one build platform while the one or more 3D objects remain on the at least one build platform.

Example 59. The method of Example 58, wherein the post-processing comprises one or more of removing residual curable material from the one or more 3D objects, washing the one or more 3D objects in a solvent, or post-curing the one or more 3D objects.

Example 60. The method of Example 58 or 59, wherein performing the post-processing comprises placing the at least one build platform with the one or more 3D objects into a centrifuge, solvent bath, or post-curing oven.

Example 61. The method of any one of Examples 58 to 60, further comprising separating the one or more 3D objects from the at least one build platform after the post-processing.

Example 62. The method of any one of Examples 34 to 61, wherein the one or more 3D objects comprise one or more dental appliances.

CONCLUSION

Although many of the embodiments are described above with respect to systems, devices, and methods for manufacturing dental appliances, the technology is applicable to other applications and/or other approaches, such as manufacturing of other types of objects. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-34.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An assembly for supporting 3D objects during an additive manufacturing process, the assembly comprising:

a plurality of build platforms, each build platform configured to support one or more 3D objects during the additive manufacturing process;

a carrier configured to support the plurality of build platforms; and an attachment mechanism configured to releasably couple the plurality of build platforms to the carrier during the additive manufacturing process such that the plurality of build platforms collectively form a build plane having a vertical deviation no greater than 500 μm.

2. The assembly of claim 1, wherein each build platform comprises:

an upper surface configured to support the one or more 3D objects, a lower surface opposite the upper surface, and one or more protrusions formed on the lower surface such that when the build platform is releasably coupled to the carrier, a gap is formed between the lower surface of the build platform and an upper surface of the carrier.

3. The assembly of claim 1, wherein the attachment mechanism comprises, for each build platform:

a first coupling device at or proximate to a first side of the build platform, and a second coupling device at or proximate to a second side of the build platform.

4. The assembly of claim 3, wherein the first coupling device uses a different type of coupling than the second coupling device.

5. The assembly of claim 4, wherein the first coupling device is a flexible coupling device and the second coupling device is a rigid coupling device.

6. The assembly of claim 4, wherein the first coupling device comprises a spring material and the second coupling device does not comprise a spring material.

7. The assembly of claim 1, wherein the attachment mechanism comprises a spring clip configured to releasably couple to a build platform of the plurality of build platforms.

8. The assembly of claim 7, wherein the spring clip is configured to releasably couple to an external portion of the build platform.

9. The assembly of claim 7, wherein the spring clip is configured to releasably couple to an internal portion of the build platform.

10. The assembly of claim 7, wherein the spring clip is configured to releasably couple to a recess formed in the build platform.

11. The assembly of claim 10, wherein the recess is formed in a lower surface of the build platform.

12. The assembly of claim 1, wherein the attachment mechanism comprises a rotatable clip configured to releasably couple to a build platform of the plurality of build platforms.

13. The assembly of claim 12, wherein:

the rotatable clip is rotatable between a closed configuration and an open configuration, when in the closed configuration, the rotatable clip contacts the build platform, and when in the open configuration, the rotatable clip is spaced apart from the build platform.

14. The assembly of claim 1, wherein the build plane is a single continuous build plane.

15. The assembly of claim 1, wherein the build plane comprises a plurality of discrete regions.

16. The assembly of claim 1, wherein the build plane has a total surface area of at least 1000 $cm^2$.

17. The assembly of claim 1, wherein the additive manufacturing process comprises building up the one or more 3D objects of each build platform from a plurality of layers of a curable material.

18. The assembly of claim 1, wherein the carrier includes or is thermally coupled to a heat source.

19. The assembly of claim 18, wherein the heat source is configured to heat the build plane to a temperature within a range from 30° C. to 200° C.

20. The assembly of claim 1, wherein the one or more 3D objects comprise one or more dental appliances.

* * * * *